(12) United States Patent
Kanai

(10) Patent No.: US 7,509,576 B2
(45) Date of Patent: Mar. 24, 2009

(54) INFORMATION PROCESSING SYSTEM AND METHOD, PROGRAM, AND RECORDING MEDIUM

(75) Inventor: Takeshi Kanai, Saitama (JP)

(73) Assignee: Sony Corporation, Tokyo (JP)

(*) Notice: Subject to any disclaimer, the term of this patent is extended or adjusted under 35 U.S.C. 154(b) by 246 days.

(21) Appl. No.: 10/903,104

(22) Filed: Jul. 30, 2004

(65) Prior Publication Data

US 2005/0066267 A1 Mar. 24, 2005

(30) Foreign Application Priority Data

Aug. 1, 2003 (JP) ............................ P2003-284717

(51) Int. Cl.
*G06F 17/00* (2006.01)
*G06F 17/28* (2006.01)

(52) U.S. Cl. .................. 715/239; 715/200; 715/204; 715/234; 715/248; 715/249

(58) Field of Classification Search .............. 715/513, 715/522, 523, 200, 204, 234, 239, 243, 248–249
See application file for complete search history.

(56) References Cited

U.S. PATENT DOCUMENTS

| 6,209,124 | B1* | 3/2001 | Vermeire et al. ............ 717/114 |
| 6,925,595 | B1* | 8/2005 | Whitledge et al. ........... 715/513 |
| 2002/0029232 | A1* | 3/2002 | Bobrow et al. .............. 707/517 |
| 2002/0116371 | A1* | 8/2002 | Dodds et al. .................... 707/3 |
| 2003/0046317 | A1* | 3/2003 | Cseri et al. ................... 707/513 |
| 2003/0046370 | A1* | 3/2003 | Courtney ..................... 709/220 |
| 2003/0074279 | A1* | 4/2003 | Viswanath et al. ............ 705/27 |
| 2003/0088639 | A1* | 5/2003 | Lentini et al. ................ 709/217 |
| 2003/0200507 | A1* | 10/2003 | Stern et al. .................. 715/517 |
| 2004/0015827 | A1* | 1/2004 | Nicolle et al. ............... 717/104 |

(Continued)

FOREIGN PATENT DOCUMENTS

JP 63-250771 10/1988

(Continued)

OTHER PUBLICATIONS

Wenyue Du, Mong Li Lee, and Tok Wang Ling, "XML Structures for Relational Data", Web Information System Engineering 2001, Preceedings of the Second International Conference on vol. 1, Dec. 3-6, 2001, pp. 151-160.*

*Primary Examiner*—Rachna S Desai
*Assistant Examiner*—Chau Nguyen
(74) *Attorney, Agent, or Firm*—Finnegan, Henderson, Farabow, Garrett & Dunner, L.L.P.

(57) ABSTRACT

Data for an electronic book is to be formulated readily. Such data for the electronic book, supplied by a publishing company, is data by variable formats, and hence are converted by an XML converter 21 into data of the XML format. A data converter 22 converts the data of the XML format, obtained by conversion by the XML converter 21, into data of the type that may be distributed to the user, while adding data designed for facilitating the handling as the electronic book. A copyright protection processing unit 23 adds the copyright information to the formulated data and encrypts the data as necessary. A distributing unit 24 holds the data for distribution and distributes the data it holds responsive to a user's request. An apparatus for formulating data for an electronic book is also provided.

12 Claims, 36 Drawing Sheets

U.S. PATENT DOCUMENTS

| | | | |
|---|---|---|---|
| 2004/0024812 A1* | 2/2004 | Park et al. | 709/203 |
| 2004/0093337 A1* | 5/2004 | Shen et al. | 707/100 |
| 2004/0143791 A1* | 7/2004 | Ito et al. | 715/513 |
| 2004/0181537 A1* | 9/2004 | Chawla et al. | 707/100 |
| 2004/0189703 A1* | 9/2004 | Zhang et al. | 345/762 |
| 2004/0199876 A1* | 10/2004 | Ethier et al. | 715/523 |
| 2004/0210599 A1* | 10/2004 | Friedman et al. | 707/102 |
| 2005/0216492 A1* | 9/2005 | Singhal et al. | 707/100 |

FOREIGN PATENT DOCUMENTS

| | | |
|---|---|---|
| JP | 04-092960 | 3/1992 |
| JP | 08-227420 | 9/1996 |
| JP | 2000-76338 | 3/2000 |
| JP | 2001-052016 | 2/2001 |
| JP | 2002-197088 | 7/2002 |
| JP | 2002-111650 | 12/2002 |
| JP | 2004-506987 | 3/2004 |
| JP | 2004-118478 | 4/2004 |
| JP | 2005-004263 | 1/2005 |
| WO | WO 02/15516 | 2/2002 |

* cited by examiner

```
1  <?xml version="1.0" ?>
2  <Info version="0.9" >
3   <BookInfo>
4    <Title reading="takeda singen 2 (pronounciation)">takeda singen, hayashino-maki (title itself)</Title>
5    <Author reading="densi taro (pronounciation)">densi taro (author itself)</Author>
6    <BookID>CBJP0010123450I0</BookID>
7    <Publisher reading="densi shuppan (pronounciation)">densi shuppan (publisher itself)</Publisher>
8    <Label reading="densi rekishi bunko (pronounciation)">densi rekishi bunko (label itself)</Label>
9    <Category>novel</Category>
10   <Classification></Classification>
11   <FreeText>
12   (the summary of the contents)
13   </FreeText>
14  </BookInfo>
15  <DocInfo>
16   <Language> ja </Language>
17   <Creator>(the name of the creator of the contents and the name of the creating studio)</Creator>
18   <CreationDate> 2003-02-20 </CreationDate>
19   <Producer> e-Book Creator </Producer>
20   <Page> 300 </Page>
21  </DocInfo>
22  <Keyword>(the language used when the user retrieves the contents)</Keyword>
23 </Info>
24
```

FIG. 9

```
1    <Page objid="100" pagestyle="honbun">
2    <ImageBlock  objid="101"  x0="0"  y0="0"  x1="600"  y1="800"
3    xsize="600" ysize="800" blockstyle="image" refobj="201"/>
4    </Page>
```

```
1   <Page objid="110" pagestyle="honbun">
2   <TextBlock objid="111" textstyle="tategaki" blockstyle="textblock">
3   <P>
4     I am a cat.  I do not yet have a name.
5   </P><CR/>
6   <P>
7     I do not have an idea at all where I was born.  I remember that I cried mew mew in a dark humid place.
8   I watched a thing called a human being for the first time.  Besides, he was included in the family of
9   students which is worst in human beings when I heard it later.  It is said that the student sometimes
10  catches and boils us, and consumes us.  However, I did not have the thought in those days, and I was not
11  particularly scared.  But there was somewhat the feeling of rising when I was placed on his palm, and lifted
12  upward.  I saw the so-called human being for the first time when I calmed down on his palm a little, and
13  watched the face of the student.  The feeling that I thought he is strange at the time is still left.  Primarily,
14  the face which should have hair and should be decorated is slippery, and it is totally a kettle.  I encountered
15  cats considerably afterwards, but have never come across such a cripple before.  By the way, the middle of
16  the face projects too much.  And it sometimes blows smoke from the hole.  I was suffocated by smoke and
17  weakened really.  I finally knew these days that this is cigarette that a human being smokes.
18  </P><CR/>
19  </TextBlock>
20  </Page>
```

FIG. 13

I am a cat. I do not yet have a name. I do not have an idea at all where I was born. I remember that I cried mew mew in a dark humid place. I watched a thing called a human being for the first time. Besides, he was included in the family of students which is worst in human beings when I heard it later. It is said that the student sometimes catches and boils us, and consumes us. However, I did not have the thought in those days, and I was not particularly scared. But there was somewhat the feeling of rising when I was placed on his palm, and lifted upward. I saw the so-called human being for the first time when I calmed down on his palm a little, and watched the face of the student. The feeling that I thought he is strange at the time is still left. Primarily, the face which should have hair and should be decorated is slippery, and it is totally a kettle. I encountered cats considerably afterwards, but have never come across such a cripple before. By the way, the middle of the face projects too much. And it sometimes blows smoke from the hole. I was suffocated by smoke and weakened really. I finally knew these days that this is cigarette that a human being smokes.

FIG. 14

```
1  <Page objid="120" pagestyle="honbun">
2  <Blockspace y="30"/>
3  <TextBlock objid="121" textstyle="ChapTitle" blockstyle="block1">
4  <P>
5  今日の天気
6  </P>
7  </TextBlock>
8  <BlockSpace x="20"/>
9  <ImageBlock objid="122" x0="0" y0="0" x1="300" y1="100" xsize="300" ysize="100"
10 blockstyle="image2" refobj="202"/>
11 </Page>
```

FIG. 15

```
1   <Main>
2     <Page objid="101"...>
3     </Page>
4     <Page objid="102"...>
5     </Page>
6     <Page objid="103"...>
7     </Page>
8   </Main>
9   <Solo>
10    <Pages objid="1001">
11      <Page objid="201"...>
12      </Page>
13      <Page objid="202"...>
14      </Page>
15      <Page objid="203"...>
16      </Page>
17    </Pages>
18    <Pages objid="1002">
19      <Page objid="211"...>
20      </Page>
21      <Page objid="212"...>
22      </Page>
23      <Page objid="213"...>
24      </Page>
25    </Pages>
26  </Solo>
```

FIG. 18

```
1   <PageStyle objid="5202" stylelabel="Honbun"
2   evenfooterid="0"
3   evenheaderid="0"
4   oddfooterid="0"
5   oddheaderid="0"
6   pageposition="lower"
7   setemptyview="empty"
8   topmargin="20"
9   headheight="20"
10  headsep="0"
11  oddsidemargin="100"
12  evensidemargin="100"
13  textheight="710"
14  textwidth="400"
15  footspace="50"
16  footheight="0"
17  layout="TbRl"/>
```

FIG. 19

```
1   <TextStyle objid="5001" stylelabel="tategaki"
2     fontsize="240"
3     fontescapement="2700"
4     fontorientation="2700"
5     fontfacename="MingDynasty"
6     textcolor="0x00000000"
7     wordspace="20"
8     letterspace="0"
9     charaspace="0"
10    baselineskip="360"
11    linespace="40"
12  />
```

FIG. 20

```
1   <BlockStyle objid="5101" stylelabel="textblock"
2     blockheight="300"
3     blockrule="vert-fixed"
4     layout="TbRl"
5     topskip="2"
6     sidemargin="1"
7     footskip="1"/>
```

FIG. 21

| PageTree | Page | Header | Footer | PageATTRIBUTE |
|---|---|---|---|---|
| Block | BlockATTRIBUTE | MiniPage | BlockList | Text |
| TextATTRIBUTE | Image | Canvas | PARAGRAPH-ATTRIBUTE | Image DATA |
| Button | Window | PopUpWin | Sound | Sound DATA |
| Font | Object INFORMATION | BOOK INFORMATION | TABLE-OF-CONTENTS INFORMATION | |

FIG. 23

I am a cat. I do not yet have a name.

I do not have an idea at all where I was born. I remember that I cried mew mew in a dark humid place. I watched a thing called a human being for the first time. Besides, he was included in the family of students which is worst in human beings when I heard it later. It is said that the student sometimes catches and boils us, and consumes us. However, I did not have the thought in those days, and I was not particularly scared. But there was somewhat the feeling of rising when I was placed on his palm, and lifted upward. I saw the so-called human being for the first time when I calmed down on his palm a little, and watched the face of the student. The feeling that I thought he is strange at the time is still left. Primarily, the face which should have hair and should be decorated is slippery, and it is totally a kettle. I encountered cats considerably afterwards, but have never come across such a cripple before. By the way, the middle of the face projects too much. And it sometimes blows smoke from the hole. I was suffocated by smoke and weakened really. I finally knew these days that this is cigarette that a human being smokes.

FIG. 29

I am a cat. I do not yet have a name. I do not have an idea at all where I was born. I remember that I cried mew mew in a dark humid place. I watched a thing called a human being for the first time. Besides, he was included in the family of students which is worst in human beings when I heard it later. It is said that the student sometimes catches and boils us, and consumes us. However, I did not have the thought in those days, and I was not particularly scared. But there was somewhat the feeling of rising when I was placed on his palm, and lifted upward. I saw the so-called human being for the first time when I calmed down on his palm a little, and watched the face of the student. The feeling that I thought he is strange at the time is still left. Primarily, the face which should have hair and should be decorated is slippery, and it is totally a kettle. I encountered cats considerably afterwards, but have never come across such a cripple before. By the way, the middle of the face projects too much. And it sometimes blows smoke from the hole. I was suffocated by smoke and weakened really. I finally knew these days that this is cigarette that a human being smokes.

FIG. 30

INFORMATION PROCESSING SYSTEM AND METHOD, PROGRAM, AND RECORDING MEDIUM

BACKGROUND OF THE INVENTION

1. Field of the Invention

This invention relates to an information processing system, an information processing method, a program and a recording medium. More particularly, it relates to an information processing system, an information processing method, a program and a recording medium, suitable for handling a book in an electronic form (electronic book).

2. Description of Related Art

Such electronic book, formed by text data, is coming into widespread use. With the electronic book, the information generally recorded by primers (printed words) in a paper book is displayed as the text data information by a preset terminal device for the electronic book, as if the page of the paper book is in a spread state. The electronic book is displayed as in a paper book, spread and folded page by page, by the one-page text (image) being slid and displayed by acting on a preset button.

With the conventional terminal device for the electronic book, it has been proposed (e.g. in Patent Publication 1), for easy-to-read display, to partition the text data for a book in accordance with preset conditions stated in a file pertinent to partitioning, within a scope of the maximum number of letters/characters displayable at a time on a display, and to display each partitioning unit of the text data sequentially on a display unit (see for example the Patent publication 1).

Such a method has also been proposed which enables a conventional terminal apparatus for an electronic book or data handled by the terminal apparatus to be produced extremely readily (see for example the Patent publication 2).

[Patent publication 1] Japanese Laid-Open Patent Publication 2002-197088

[Patent publication 2] Japanese Laid-Open Patent Publication 2001-52016

The terminal device for an electronic book is designed to a size portable by a user. Hence, a limitation has been imposed on the size of the display of the terminal device which is designed for demonstrating the text data. This size is not necessarily optimum for users. For example, even though the same letter/character is displayed to the same size in the same area, some users may find the letter/character easy to read, while others may not.

Thus, the technique disclosed in the aforementioned Patent Publication 1 has been proposed in order to make text data to be easy to read in a limited display area. However, in the Patent Publication 1, in which the text data for a book is partitioned in accordance with preset conditions as stated in the file pertinent to partitioning, within a scope of the maximum number of letters/characters displayable at a time on a display, and to sequentially display each partitioning unit of the text data on a display unit, the size of the letter/character is not necessarily optimum.

For example, a user with good eyesight may find the text easy-to-read with the given size of the letter/character, while another user with poor eyesight may find the text easy-to-read with the size of the letter/character larger than the given size. That is, a problem persists that it is not possible to form the display to the size of the letter/character desirable for the user.

On the other hand, the display with the maximum number of letters/characters displayable on the display unit may be acceptable for text data of e.g. a novel, made up solely by an array of letters/characters, while it may not be acceptable for data also including still images and which is featured by the layout of the entire contents, as a newspaper or a magazine, or data made up solely by an array of letters/characters but which is featured by the layout itself, such as a script in which paragraph change is desirably made from one spoken speech to another.

The same may be said of the Patent Publication 2. The data structure, disclosed in the Patent Publication 2, may be acceptable for e.g. an image, however, it is not so with the text, because the layout may be changed, or the size cannot be enlarged or contracted in a manner desirable for the user.

That is, if the layout itself of the still images and the text is also supplied to the user, the contents may be rendered more pleasant for the user, while it is possible to make much of the intention of the author of the contents. However, this desirable condition has not been met with the method disclosed in the aforementioned Patent Publication 1 or 2.

SUMMARY OF THE INVENTION

In view of the above-depicted status of the art, it is a principal object of the present invention to provide letters/characters and images of a size optimum for a user, to enable the contents to be displayed in a manner which reflects the intention of the copyright owner, such as the layout, and to allow simplified construction of a data structure which may be handled by a user with a feeling as if he/she is handling a paper book.

An information processing system according to the present invention comprises first conversion means for converting contents data, as supplied, into contents data of an XML system, second conversion means for converting the contents data, converted by the first conversion means, into contents data of the binary system, as data for an electronic book, and distribution means for distributing the contents data converted by the second conversion means.

The second conversion means is able to convert the contents data into an object.

The second conversion means is able to convert the supplied object into contents data formed by a relevant object out of a PageTree object for managing the object, forming the as-converted contents data, in accordance with a tree structure, a Pageobject, formed for each page of the electronic book, and stating the contents of the page, a Blockobject for managing an area within the page managed by the Pageobject, a Textobject for managing the text stated in the area managed by the Blockobject, an Imageobject for managing an image stated in the area managed by the Blockobject, a Pageattribute object stating the attributes of the Pageobject, a Blockattribute object stating the attributes of the Blockobject, a Textattribute object stating the attributes of the Textobject, and an Imageattribute object stating the attributes of the Imageobject.

The information processing system may further comprise copyright protection means for executing the processing pertinent to copyright protection on the contents data converted by the second conversion means.

An information processing method for an information processing apparatus including means for exchanging contents data, according to the present invention, comprises a first conversion step of converting contents data, as supplied, into contents data of an XML system, a second conversion step of converting the contents data, converted by the processing of the first conversion step, into contents data of the binary system, as data for an electronic book, and a distribution step of controlling the distribution of the contents data converted by the processing of the second conversion step.

A program according to the present invention allows a computer, controlling the information processing apparatus, including means for exchanging contents data, to execute a first conversion step of converting contents data, as supplied, into contents data of an XML system, a second conversion step of converting the contents data, converted by the processing of the first conversion step, into contents data of the binary system, as data for an electronic book, and a distribution step of controlling the distribution of the contents data converted by the processing of the second conversion step.

A recording medium according to the present invention has the aforementioned program stored therein.

With the information processing system, information processing method and the program, according to the present invention, the contents data, supplied by data of variable formats, are unified to contents data of the XML form, which data is then converted into contents data of the binary form and distributed.

According to the present invention, the data for the electronic book may be prepared. With the so prepared data, the contents may be browsed at a preset terminal.

According to the present invention, the format for an electronic book is turned into an object, whereby new contents may readily be added without substantially changing the pre-existing contents. Since new contents may readily be added, the user is able to formulate an own scrapbook with the same format as that of the purchased electronic book.

According to the present invention, the letter/character of the contents as the electronic book may be of an enlarged size for browsing. Even if the layout is marred by enlarging the size of the letter/character, it is possible to prevent such a situation in which the apparent page partition is unknown and page feed at once results in failure in arriving at an expected page. Moreover, linear page feed is also possible.

In the following, certain desirable embodiments of the invention are now explained. The relationship of correspondence between the specified inventive matter stated in the claims and concrete embodiments of the invention is also explained. This description is intended for confirming that the specified embodiments supporting the invention stated in the claims are clarified in the desirable embodiments of the invention. That is, even if there is such a concrete embodiment stated as the embodiment of the invention but not stated as corresponding to the specified inventive matter, it does not mean that this concrete embodiment does not correspond to the specified inventive matter. If conversely a specified embodiment is stated herein as corresponding to specified inventive matter, it does not mean that such specified embodiment does not correspond to other specified inventive matter.

Moreover, such description does not mean that the invention corresponding to the specified embodiment stated in the present invention is unexceptionally stated in the claims. In other words, such description does not exclude the invention corresponding to the specified embodiment of the invention but not stated in the claims, that is, the invention(s) possibly added in future by divisional application, correction or internal priority.

The information processing system of the present invention (for example, the data formulating device 2 shown in FIG. 2) includes first conversion means for converting contents data, as supplied, into contents data of an XML system (such as an XML converter 21 of FIG. 2), second conversion means for converting the contents data, converted by the first conversion means, into contents data of the binary system, as data for an electronic book (such as a data converter 22 of FIG. 2) and distribution means for distributing the contents data converted by the second conversion means (such as a distributor 24 of FIG. 2).

The information processing system may further include copyright protection means for executing the processing pertinent to copyright protection on the contents data converted by the second conversion means (such as copyright protection processing unit 23 of FIG. 2).

BRIEF DESCRIPTION OF THE DRAWINGS

FIG. 9 illustrates data contents.

FIG. 13 illustrates data contents.

FIG. 14 illustrates an area.

FIG. 15 illustrates data contents.

FIG. 18 illustrates data contents.

FIG. 19 illustrates data contents.

FIG. 20 illustrates data contents.

FIG. 21 illustrates data contents.

FIG. 23 illustrates objects.

FIG. 29 illustrates the selection of an article.

FIG. 30 illustrates the selection of an article.

DESCRIPTION OF THE PREFERRED EMBODIMENTS

Figure 1:
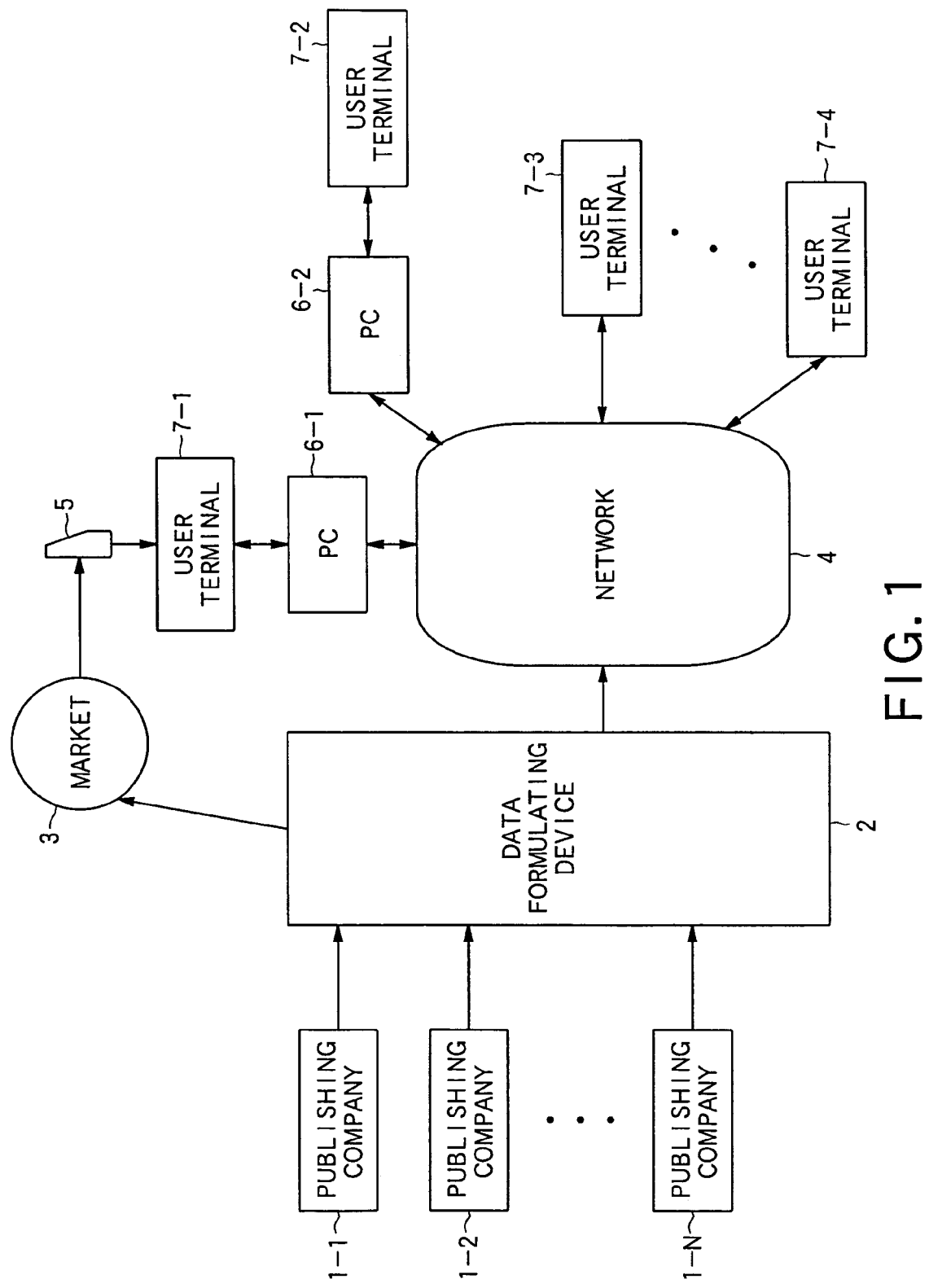
FIG. 1 shows the structure of an embodiment of an information processing system according to the present invention.

Referring now to the drawings, certain preferred embodiments of the present invention are explained in detail. FIG. 1 shows a system for handling a book rendered into digital data.

The book rendered into digital data is made up by a text, images or the combination thereof that may be browsed at a preset user side terminal.

Currently, a book of a paper medium (paper book) is in general circulation. Such paper book is produced and published by publishing companies 1-1 to 1-N. It is now assumed that the publishing companies 1-1 to 1-N, publishing paper books, also publish books rendered into digital data (sometimes referred to below as electronic books).

If, in the following explanation, it is unnecessary to distinguish the publishing companies 1-1 to 1-N from each other, these companies are collectively referred to as publishing company 1. The singular expression is also used from time to time for other plural entities.

The data from each publishing company 1 are sent to a data formulating device 2. The publishing company 1 forms data for electronic books in a data format handled by an own company to send the data to the data formulating device 2. For this reason, the data supplied from each publishing company 1 are not necessarily the data of the same format. Consequently, the data formulating device 2 mainly converts the different data formats into the same data format.

Among the data formats, supplied from each publishing company 1, there are, for example, the HTML (Hyper Text Markup Language), PDF (Portable Document Format: file system handled by the software Acrobat of Adobe Systems Inc.) and the Open eBook specifications. That is, the data of the electronic books, supplied by each publishing company 1, are likely to be not data of the same format. Hence, data are converted by the data formulating device 2.

The data formulated by the data formulating device 2 are supplied (distributed) to the user via a market 3 or over a network 4. It is assumed that the package medium 5 is supplied via the market 3 to the user. The package medium 5 is a storage medium, such as MemoryStick (trademark), which may be handled by a user's terminal.

The network 4 is e.g. the Internet. The network structure may be wired or wireless and may be formed e.g. by WAN (World Area Network) or by LAN (Local Area Network). The publishing company 1 and the data formulating device 2 may also exchange data over the network 4, in a manner not shown in FIG. 1. Moreover, the data may be exchanged between the publishing company 1 and the data formulating device 2 over the network or by recording the data on a preset recording medium and exchanging the data via mail. That is, the data exchange configuration may be arbitrary.

To the network 4 may be connected personal computers (PCs) 6-1, 6-2, to which may be connected user terminals 7-1, 7-2. On the other hand, user terminals 7-3 and 7-4 are directly connected to the network 4.

The PC 6 usually has the functions of exchanging data over the network 4 with another device, herein the data formulating device 2. If the PC 6 is used, data from the data formulating device 2 is received by the PC 6 so as to be supplied via this PC 6 to a user terminal 7 for storage therein.

If the PC 6 is not used, data is directly supplied from the data formulating device 2 to the user terminal 7 for storage therein.

The user terminal 7 may be configured to exchange data solely via a route comprising the data formulating device 2 and the PC 6, or solely via a route not comprising the PC 6. Of course, both the route comprising the PC 6 and the route not comprising the PC 6 may be selectable by the user.

The user terminal 7 is configured to be supplied with data from the data formulating device 2 in a state in which the data has been recorded on the package medium 5. The structure of e.g. the user terminal 7 will be explained in detail subsequently.

Figure 2:
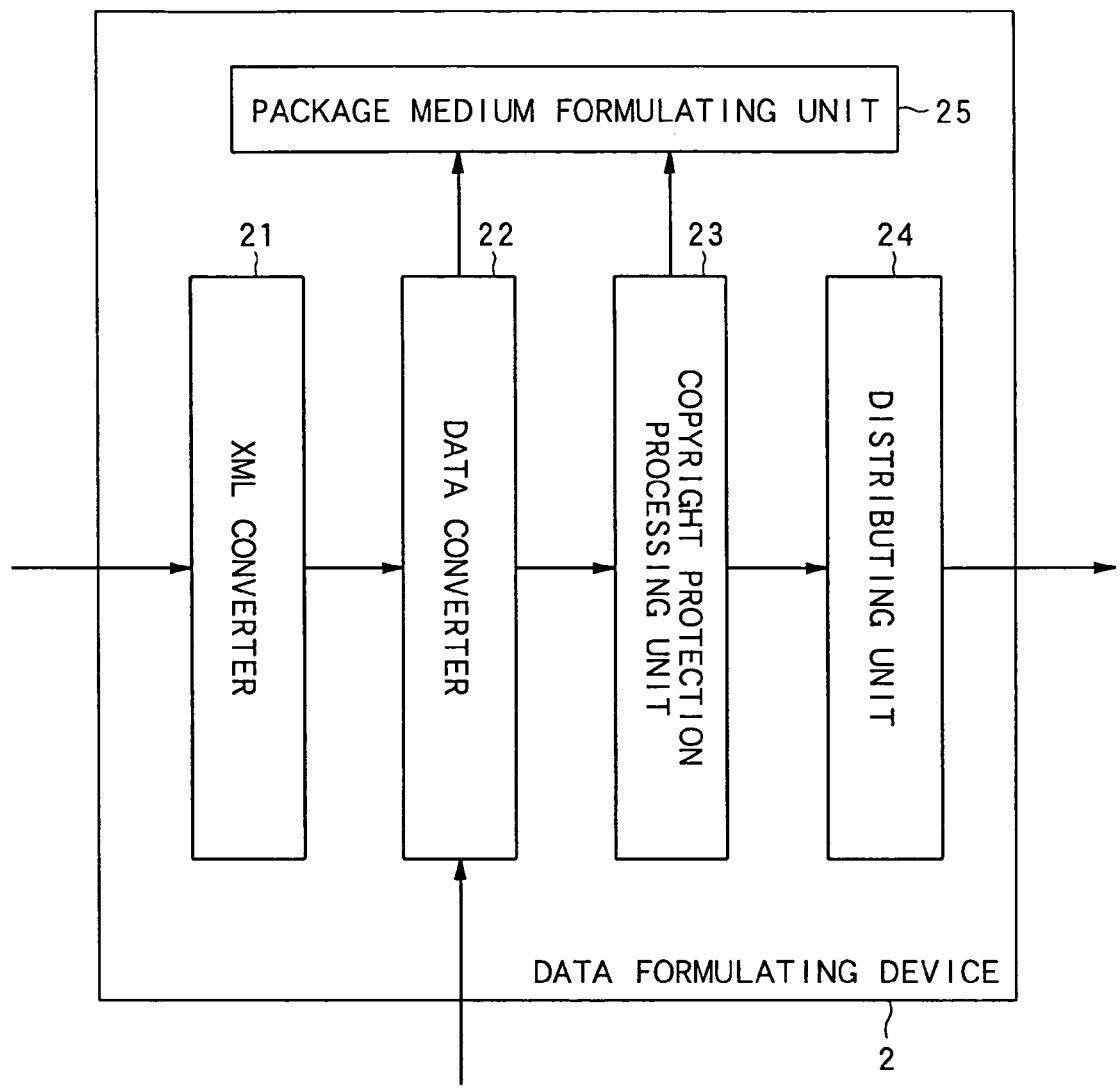
FIG. 2 is a functional block diagram of a data formulating apparatus.

FIG. 2 depicts a functional block diagram showing the functions of the data formulating device 2. The data formulating device 2 is made up by an XML (eXtensible Markup Language) converter 21, a data converter 22, a copyright protection processing unit 23, a distributing unit 24 and a package medium formulating unit 25.

The XML converter 21 converts data of variable formats into data of the XML format. The data converted by the XML converter 21 are supplied to the data converter 22, which data converter 22 converts the data of the XML format, supplied thereto, into data of the format distributed as an electronic book (binary data). In making this conversion, the data converter 22 converts the data into contents data formed by objects.

The data converter 22 is also directly supplied with the data of the XML format from the publishing company 1. That is, since the data of the XML format does not have to be processed by the XML converter 21, the data may directly be supplied from the publishing company 1 to the data converter 22 without the intermediary of the XML converter 21.

The data converted by the data converter 22 are supplied to the copyright protection processing unit 23. This copyright protection processing unit 23 performs the processing of protecting the copyright pertinent to the electronic book and, more specifically, encrypts the supplied data or embeds copyright data. This processing by the copyright protection processing unit 23 only needs to be carried out in case of necessity and does not have to be carried out for data distributed free of charge and which is not in need of copyright protection.

To this information processing system, the technique of contents distribution, as disclosed for example in the Japanese Patent Application 2003-163968, previously filed in the name of the present Assignee, may be applied. In case this technique is applied, the copyright protection processing unit 23 encrypts the data converted by the data converter 22 to form encrypted contents, and appends a header part, composed of the contents identification information, digital right management information, license identification information, a validation key block EKB and an encrypted key block, to the encrypted contents, to formulate a contents file.

The data output from the copyright protection processing unit 23 is distributed by the distributing unit 24. This distributing unit 24 includes an internal or external storage unit, not shown. The data supplied is stored in the storage unit and the stored data is read out as necessary (responsive to requests from the PC 6 or the user terminal 7) for distribution over the network 4.

The package medium formulating unit 25 causes data of the electronic book to be stored in the package medium 5 to formulate the package medium 5 offered to the market 4. The data recorded on the package medium 5 is one or both of data supplied from the data converter 22 and data supplied from the copyright protection processing unit 23.

Only data supplied from the data converter 22 are recorded on the package medium 5 distributed free of charge for e.g. advertisement. Only data from the copyright protection processing unit 23 are recorded on the package medium 5 distributed only to specified users (users who purchased the package medium) for sale. Even if the package medium is distributed for sale, data from the data converter 22 and data from the copyright protection processing unit 23 may be recorded in the first 100 pages and in the remaining pages, respectively.

Here, the data formulating device 2 is shown and explained as being a sole device which is the data formulating device. It is however possible that the data formulating device 2 is made up of different inner device parts, with the data formulating device 2 being a system formed by plural devices.

For example, if each part is constructed as a server, the respective servers of the parts are interconnected over a preset network, thereby enabling reciprocal exchange of data. In case each part is formed as a server, the publishing company 1 is connected to a server forming the XML converter 21 and to the data converter 22 when the company is providing data other than the XML data and the XML data, respectively.

In case the publishing company is connected to different destinations, the billed amount may be varied, depending on the particular destination. It is noted that each part of the data formulating device does not have to be constructed as a sole server, such that an arrangement may be made as shown in FIG. 2.

In this case, the data formulating device 2 is distinct from the publishing company 1. If such services are rendered, a supervisor of the data formulating device 2 collects charges in some form or other. First of all, the publishing company 1 is thought of as a party from whom the charges are collected. In case the charges are collected (assessed) from the publishing company 1, the charges assessed in case the conversion by the XML converter 21 has been needed may be varied from those otherwise.

By so doing, the chances for connection not mediated by the XML converter 21, possibly with a low assessed amount, that is, connection supplying XML data to the data converter 22 as the destination of connection, are felt to be increased. If, with increase in the chances for such connection, the XML converter 21 is thought to be unnecessary, the XML converter 21 may be deleted from the structure, thereby decreasing the expenses otherwise incurred in the maintenance of the data formulating device 2.

In this manner, that is, as the publishing company 1 comes to formulate data in the XML format, the mainstream of the data for electronic books is the XML format data, whereby it is thought to be possible to differentiate the publishing company handling data for electronic books as data other than the XML data and a company supplied with the data from the publishing company from the publishing company handling data for electronic books as XML data and a company supplied with the data from the publishing company.

Figure 3:
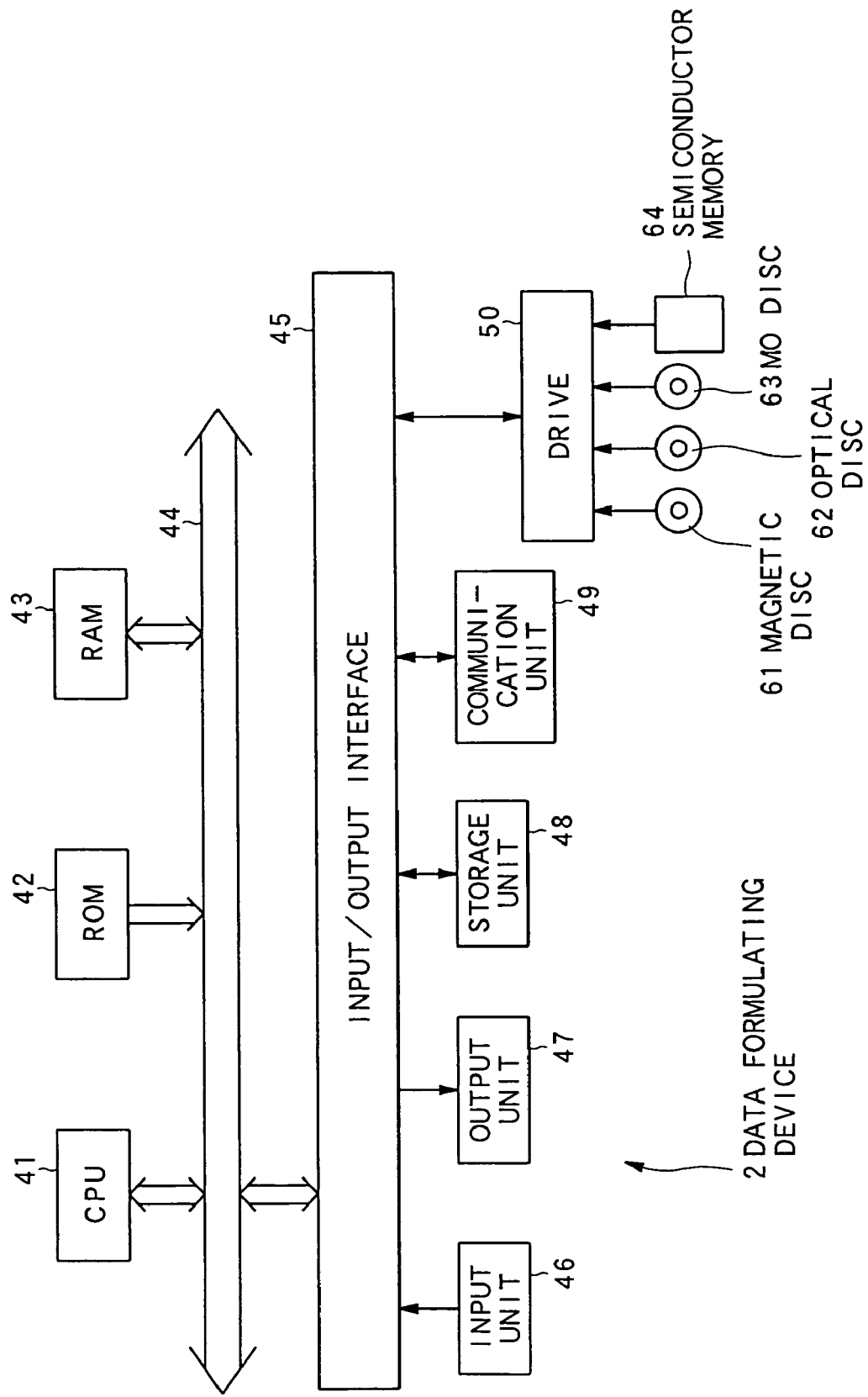
FIG. 3 shows an illustrative inner structure of the data formulating apparatus.

In case the data formulating device 2 is formed by one or more devices, the device forming the data formulating device 2 may be formed by e.g. a personal computer. FIG. 3 shows an inner structure of the data formulating device 2 formed by the personal computer.

A CPU (central processing unit) 41 of the data formulating device 2, shown in FIG. 3, executes various processing operations in accordance with a program stored in a ROM (read-only memory) 42. In a RAM (random access memory) 43, there are stored data and programs necessary for the CPU 41 to carry out a variety of processing operations. To an input/output interface 45, an input unit 46, made up by e.g. a keyboard or a mouse, is connected, and signals sent to the input unit 46 are output to the CPU 41. To the input/output interface 45, there is also connected an output unit 47, made up by e.g. a display or a loudspeaker.

To the input/output interface 45, there are also connected a storage unit 48, formed e.g. by a hard disc, and a communication unit 49, exchanging data with other devices, such as the user terminal 7, over a network, such as the Internet. A drive 50 is used for reading out or writing data for a recording medium, such as a magnetic disc 61, an optical disc 62, a magneto-optical disc 63 or a semiconductor memory 64.

The relationship of correspondence between the functional block diagram of the data formulating device 2 shown in FIG. 2 and an illustrative inner structure of the data formulating device 2 shown in FIG. 3 is shown. The XML converter 21 is implemented by the CPU 41 executing the processing corresponding to a program stored in the RAM 43 (or in the ROM 42). In similar manner, the XML converter 21 and the copyright protection processing unit 23 are implemented by the CPU 41 executing the processing corresponding to a program stored in the RAM 43.

The copyright information, as needed by the copyright protection processing unit 23, is stored in the storage unit 48.

The data from the publishing company 1 are supplied via communication unit 49. Or, the data are supplied by being recorded on a recording medium, such as magnetic disc 61, optical disc 62, magneto-optical disc 63 or semiconductor memory 64 and by being read-in from the drive 50.

The distributing unit 24 is formed by the storage unit 48 and the communication unit 49. The data of the electronic book, distributed to the user, are stored in the storage unit 48, and are read out as necessary and distributed by the communication unit 49. Of course, this processing is controlled by the CPU 41.

The package medium formulating unit 25 is formed by the drive 50. The recording medium (package medium 5), such as the magnetic disc 61, is inserted into the drive 50, and data stored in the storage unit 48 is recorded on the recording medium, whereby the package medium 5 having the data of the electronic book stored therein, is formulated. Of course, plural drives 50 are needed for mass production. It is also desired that data can be written simultaneously on plural package mediums.

Since the data formulating device 2 does not have to be constructed by a sole device, the device configured as shown in FIG. 3 may be constructed as a server having only the function as e.g. the XML converter 21.

Meanwhile, if the electronic book is distributed (sold) as the package medium 5, the formulation of the electronic book is not time-consuming, in a manner different form that of the paper book. Stated differently, the time needed for recording the data of the electronic book on the package medium 5 is shorter than the time needed in producing the same book as a paper book. In light of this, the package medium formulating unit 25 may be installed as a dedicated terminal at a store.

When the package medium formulating unit is installed at a store, the user may act on the terminal and select a desired electronic book. This connects the terminal to the distributing unit 24, over the network 4, such that the information of the electronic book he/she has desired is transmitted and, based on the so transmitted information, the data of the corresponding electronic book are sent to the terminal. The terminal then records the so transmitted data on the recording medium.

Of course, the data of the electronic book may be stored in the terminal provided at the bookstore and recorded on a recording medium. However, if the terminal is connected to the data formulating device 2, and data is transmitted from the distributing unit 24, the data of the electronic book may unequivocally be managed by the data formulating device 2, thus assuring facilitated processing pertinent to data update processing, such as addition of new data or deletion of old data.

Moreover, if the data is managed only on the side of the data formulating device 2, statistics may be taken more readily as to e.g. salable books and non-salable books.

When e.g. a terminal is installed on a bookstore, the time as from the time when the user began his/her operations before the terminal until acquisition of the recording medium having the data of the desired electronic book recorded thereon is thought to be tolerable for the user. Hence, such terminal or system is felt to be accepted by the consuming public, so that the company manufacturing the terminal is able to make a profit.

In light of the above, the publishing company 1 may get rid of the risk of carrying an inventory. In the case of a paper medium, the book, if not sold, is disposed of, so that paper is consumed to no purpose, thus incurring wasteful expenses on the part of the publishing company 1. If, as a result of the above processing, the package medium 5 becomes a good seller, it is possible to prevent the recording medium itself from being wastefully consumed.

Moreover, if a non-volatile recording medium is used as the package medium 5, the package medium 5, having data recorded thereon from the outset, is put on sale at the store just like the paper books, the package medium 5 is not salable and recovered, the recording medium itself may be re-used, thus reducing the risk and the cost incurred.

It is here assumed that the data of the electronic book are supplied from the publishing company 1. However, the data of the electronic book need not necessarily be supplied only from the publishing company 1. For example, such a scheme may be provided in which an author directly transmits data to the data formulating device 2. By so doing, in so-called 'voluntary publishing' in which an author publishes a book with his or her own fund, the cost for paper and for publishing may be dispensed with in case the publishing is not in the form of paper medium but is in the form of an electronic book. Moreover, since there is no risk of carrying the inventory, the cost incurred is limited to that for the sold books.

That is, the author is able to reduce the cost incurred in publishing, while the party supervising the data formulating device 2 is able to make profit from customers other than the publishing company 1. On the other hand, the user is able to purchase an unpublished work of an unrenowned author or a work of a famous author which was not put to sale from the contrary judgment of the publisher, such that the user is able to make selection from a wide gamut of works and authors.

Figure 4:
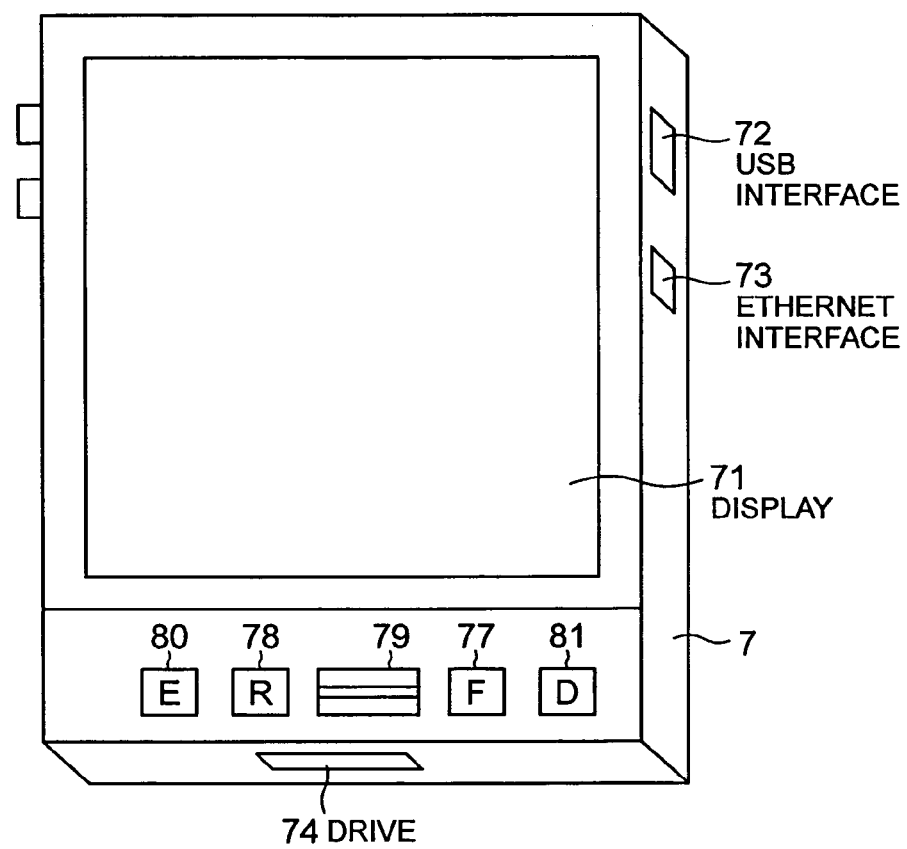
FIG. 4 shows the appearance of a user terminal.

The user terminal 7, processing the data of the electronic book, prepared by the data formulating device 2, and providing the book constructed by the text and the image to the user, is hereinafter explained. FIG. 4 shows the appearance of the user terminal 7. The user terminal 7 includes a display 71 for displaying the text or the image as the electronic book. The text or the image as the electronic book is sometimes referred to below as contents. On a lateral side of the user terminal, relative to the surface having the display 71, there is provided, first of all, a USB (Universal Serial Bus) interface 72.

This USB interface 72 is connected to the PC 6 (FIG. 1) in order to take charge of data exchange. The user terminal 7 includes not only the USB interface 72 but also an Ethernet (R) interface 73 for connection to the Ethernet (R). The Ethernet (R) interface 73 is provided for exchanging data with the data formulating device 2 over the network 4 (FIG. 1).

It is sufficient if the Ethernet (R) interface 73 has the function of connecting to the network 4, over a wired or wireless route, and the function of exchanging data with the data formulating device 2.

The user terminal 7 has a drive 74 on its lateral surface. In this drive 74 is inserted the package medium 5. The drive 74 is configured for reading out the data of the electronic book from the package medium 5.

The user terminal 7 has two buttons, namely a feed button 75 and a return button 76, on its lateral side. The feed button 75 and the return button 76 are acted upon when scrolling the contents demonstrated on the display 71. As a button having the role similar to that of the feed button 75, a feed button 77 is provided below the display 71. As a button having the role similar to that of the return button 76, a return button 78 is provided below the display 71.

These buttons, having similar functions, are provided in this manner at different portions in light of user friendliness. The USB interface 72, Ethernet (R) interface 73 and the drive 74 do not necessarily have to be provided on the lateral side of the user terminal 7, as shown in FIG. 4, and may be provided at any suitable location. However, the feed button 75 and the return button 76 are desirably provided at an easy-to-handle location when the user holds the user terminal 7 in his/her hand.

On the lower side of the display 71 of the user terminal 7, a jog dial (trademark) is provided between the feed button 77 and the return button 78. Similarly to the feed button 77 and the return button 78, this jog dial 79 is acted upon e.g. in scrolling the contents demonstrated on the display 71. Meanwhile, the jog dial 79 may be configured not only for being acted upon in the horizontal direction relative to the display 71 (in the up-and-down direction in the drawing) but for being pushed down in the vertical direction. In such case, the pushing-down processing may command e.g. a decision.

The user terminal 7 further includes an enlarge button 80 and a decision button 81 below the display 71. The enlarge button 80 is acted upon when it is desired to enlarge the size of a letter demonstrated on the display 71. The decision button 81 is acted upon when deciding on optional selection, such as selection of an area to be scrapped, as will be explained subsequently.

Meanwhile, in the structure of the user terminal 7, shown in FIG. 4, there is provided only the enlarge button 80. However, a contract button may also be provided. If only the enlarge button 80 is provided, as shown in FIG. 4, setting is so made that, when the enlarge button 80 is acted upon a preset number of times, reversion is made from the enlarge processing to the 100% display.

The user terminal 7 is provided with these plural buttons. The structure shown in FIG. 4 is merely illustrative and is not intended for limiting the invention. That is, buttons other than those shown in FIG. 4 may be provided, or may be deleted if unneeded (such as by common use with other buttons). The locations of the buttons are not limited to those shown in FIG. 4 and may be changed if desired.

Figure 5:
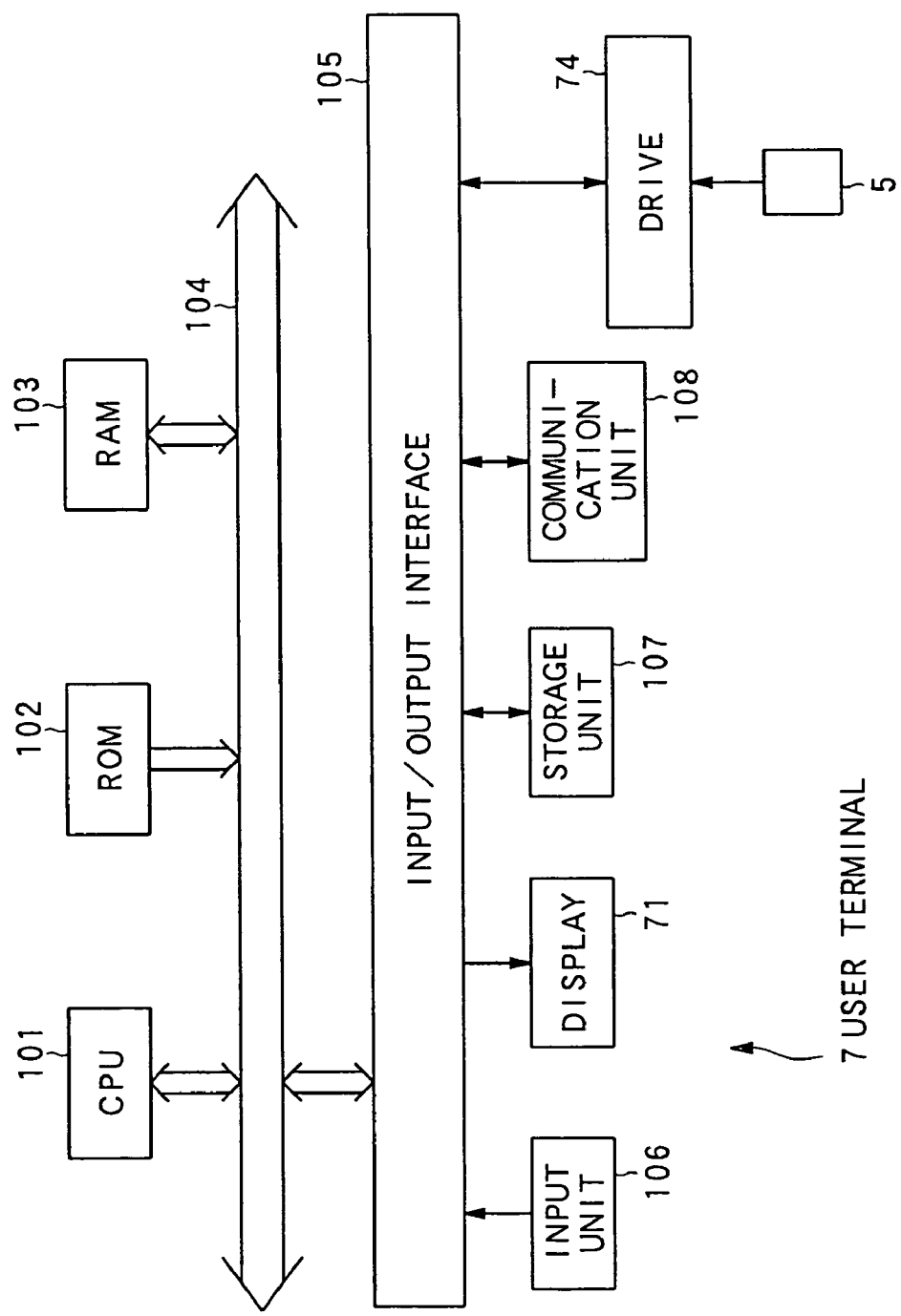
FIG. 5 shows an illustrative inner structure of the user terminal.

FIG. 5 shows an illustrative inner structure of the user terminal 7. A CPU 101 of the user terminal 7, shown in FIG. 5, executes a variety of processing operations in accordance with a program stored in the ROM 102. In a RAM 103, there are stored data or programs needed for the CPU 101 to execute a variety of processing operations. An input/output interface 105 is connected to an input unit 106 for outputting signals entered to the input unit 106 to the CPU 101.

The input unit 106 is made up by the feed button 75, return button 76, feed button 77, return button 78, jog dial 79, enlarge button 80 and the decision button 81.

To the input/output interface 105, there is also connected the display 71. To the input/output interface 105, there are further connected a storage unit 107, formed by e.g. a hard disc, and a communication unit 108 for exchanging data with other devices, such as the data formulating device 2. In this case, the communication unit 108 is made up by the USB interface 72 and the Ethernet (R) interface 73.

The drive 74 is used for reading out data from a recording medium as the package medium 5 or writing data thereon as necessary.

The data provided by the data formulating device 2 and received by the communication unit 108 are stored in the storage unit 107, and the text or images, corresponding to the stored data, are demonstrated on the display 71. Or, the data recorded in the package medium 5 set on the drive 74 is read out and the text or images, corresponding to the stored data, are demonstrated on the display 71. In the following explanation, the text or images demonstrated on the display 71 are sometimes referred to as contents and data relevant to the contents are sometimes referred to as contents data.

Figure 6:
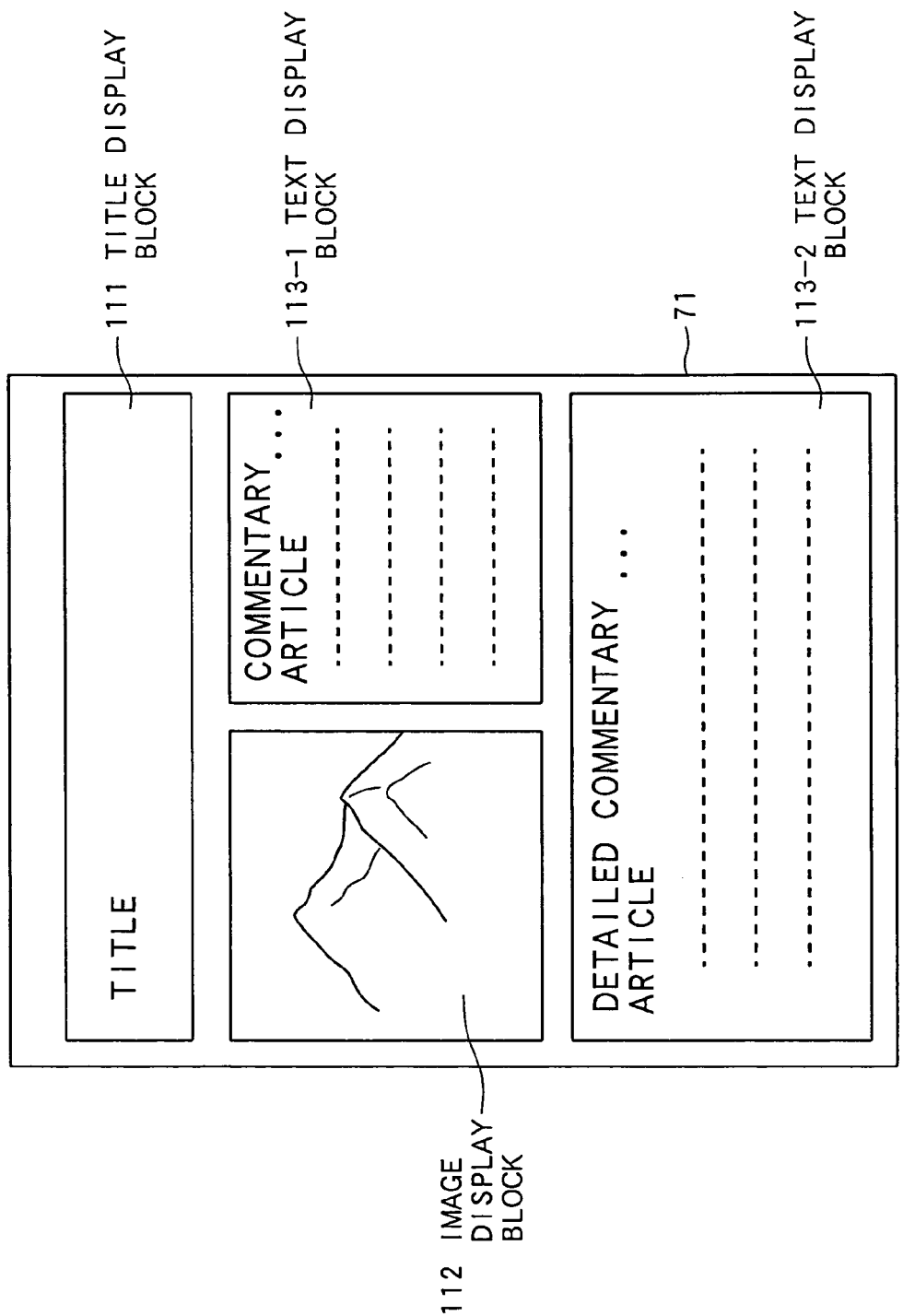
FIG. 6 shows a typical image demonstrated on a display unit.

FIG. 6 shows typical contents demonstrated on the display 71. In the case of FIG. 6, a title indicating block 111, indicating the titles of the contents, is displayed in an upper part of the display 71. On the left and right sides of the lower part of the title indicating block 111, there is demonstrated an image display block 112, demonstrating an image, and a text display block 113-1, demonstrating the text, respectively.

In a lower part of the display 71, there is displayed a text display block 113-2 for displaying the text. In the following description, the title indicating block 111, image display block 112 and the text display blocks 113-1, 113-2 are sometimes referred to simply as blocks.

The contents demonstrated in the display 71 shown in FIG. 6 are merely illustrative and are not meant for limitation. That is, the layout, for example, is changed with the contents. Moreover, although the title indicating block 111, displaying the titles, is retained to be displayed, for convenience in explanation, the title indicating block 111 is not demonstrated for contents devoid of the titles. Even if the title is demonstrated, the title demonstrating position is not limited to an upper part of the display 71.

By the way, the display blocks 111 to 113 are not the areas as set in the display 71 in advance. Stated differently, the block termed the title indicating block 111 is not pre-set and is added for explanation sake. The display position or contents of these blocks are determined on the basis of data stored in the storage unit 107 or data recorded in the package medium 5, as mentioned previously.

Thus, if the contents, such as a novel, are displayed, only the text is displayed in the display 71. In such case, the text display block 113 is provided on the display 71, and the text is displayed within the text display block 113 thus provided (that is, secured as an area).

The sorts of the contents (books) are now additionally explained. First, there is a sort of books, such as cartoon, composed of images and the text, in which the frame-based layout must be in keeping with the author's intention, that is, in which change in the layout leads to changes in the contents. This sort of the book must be set so that, even if it is enlarged, the layout is not changed.

In the present embodiment, the book having such feature (for example, the book such as cartoon) is treated as an image (IMAGE). Hence, the book such as a cartoon is treated as the image display block 112, and demonstrated on the display 71.

There is a sort of books, composed only of the text, such as a novel. Such book is composed only of the text, so that, if the text (letters or characters) is enlarged or contracted in size, such change in size is allowed if the array of the string of the letters or characters is not changed, that is, if the string of characters 'あいう' (uttered as "aiu") remains unchanged.

The formed only by the text, such as a novel, is treated in the present embodiment as text data. Hence, the sort of the book, exemplified by a novel, is treated as the text display block 113, and demonstrated on the display 71.

There is also a sort of the book, composed of the text and images, such as a magazine. As in the case of the novel, if the text is enlarged or contracted in size, such change in size is allowed, if only the array of the string of characters remains unchanged. In similar manner, if the image is enlarged or contracted in size, such change in size is allowed, if e.g. the proportion of the image remains unchanged.

The text or the image is desirably not changed in the layout. However, even if the layout is changed by processing such as enlargement or contraction, there is only little risk of the contents being changed as in the case of the cartoon, Hence, the layout may possibly be changed. However, a preset text, for example, is desirably followed by an image pertinent to the contents of the text. From this perspective, it is desirable that, even if the layout is changed, the layout as the sequence of browsing by the user is not changed.

The books treated are of variable features, as described above. A feature of the present invention is that, even if the contents are subjected to e.g. enlargement processing, such processing is not such as to mar the layout intended by the contents producer. The contents data of the contents, having this feature, are hereinafter explained. The contents data are prepared by the data formulating device 2.

The data structure after conversion by the XML converter 21 of the data provided by the publishing company 1, in other words, the data structure of the data of the XML format, supplied to the data converter 22, is now explained.

For ultimately preparing the contents data, distributed to the user terminal 6 of the user, source data of the XML format are first formulated. These source data are made up by a bibliological information part 131, a stream data part 132, and an object data part 133. In the bibliological information part 131, the information on the contents is stated.

In the stream data part 132, data indicating the substance and the flow of the main text of the contents are stated. The substance of the main text of the contents is the main text in the case of as novel. Thus, in the stream data part 132, the text data of the main text, and the flow of the main text, that is, the information on the sequence, are stated.

In the object data part 133, the images, speech and the other information are stated. The other information includes e.g. the layout information. In the object data part 133, the information representing the added-value type information for data stated in the stream data part 132 is stated.

By separating the stream data part 132 and the object data part 133 from each other, the contents data for the electronic book, having the text information as a main information source, may be converted readily. Moreover, since the layout information, changed from one display device to another, may be edited discretely, that is, independently from the letter/character information, the editing operations may be facilitated. In this case, the letter/character information may be used common. Meanwhile, although the contents are stated herein to be displayed on the user terminal 7, the display device may encompass other display devices, such as a display for the PC 6 or the PDA (personal digital assistant). In such case, the letter/character information may be used common.

By the layout information changed from one display device to another is herein meant that the display of the PC 6, not shown, and the display 71 of the user terminal 7, differ in size from each other and hence the data volume, in terms of the number of letters or characters or the image size, displayed at a time, also differ from each other, so that, if the display is made with the same data, the layout tends to be marred, and consequently the layout information needs to be changed from one contents displaying device to another.

In the present embodiment, in which the stream data part 132 and the object data part 133 are separated from each other, as described above, and the data handled are those as now explained, the processing of editing the layout information, for example, may be carried out extremely readily.

Figure 8:
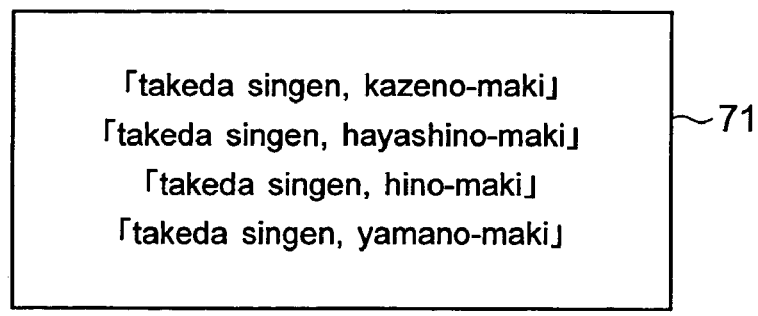
FIG. 8 shows another example of an image demonstrated on a display unit.

The data stated in the bibliological information part 131 are now explained. FIG. 8 shows typical display of a list of titles on the display 71 of the user terminal 7, obtained on replay of data stated in the bibliological information part 131. In the typical display, shown in FIG. 8, '武田信玄 風の巻', uttered as takeda singen (name of a lord of the warring states period of Japan), kazeno-maki (volume of wind), '武田信玄、林の巻', uttered as takeda singen, hayashino-maki (volume of wood), 武田信玄、火の巻", uttered as takeda singen, hino-maki (volume of fire), 武田信玄、山の巻", uttered as takeda singen, yamano-maki (volume of mountain), are displayed in this order.

In this case, the book is a series of books called ''武田信玄', with the fist volume being the kazeno maki (volume of wind), hayashino-maki, (volume of wood), hino-maki (volume of fire) and yamano-maki (volume of mountain). Such array reminds a user, who is a Japanese, of the term '風林火山' (wind-wood- fire-mountain). Moreover, the user then understands that the '風の巻" must be followed by the '林の巻" and hence realizes the sequence of the volumes even in the absence of "volume 1", "volume 2" and so forth.

However, if these titles are to be rearrayed and correctly displayed at the user terminal 7 based on such ideological information, such ideological information needs to be entered from the outset at the user terminal 7. It is however impossible to provide and input all necessary information from the outset.

In general, such re-arraying of e.g. the titles is carried out in the order of the table of 50 Japanese syllables. Such re-arraying in the order of the table of 50 syllables may be made using e.g. the character codes, and hence the re-arraying functions may be realized by the functions innate to the user terminal 7, without the necessity of providing and inputting the necessary information at the outset.

However, in re-arraying the tiles of the series of books entitled ''武田信玄", shown in FIG. 8, such re-arraying is not possible if reliance is made on this title '武田信玄'. An attempt for re-arraying is then made based on the "風" (wind), "林" (wood), "火" (fire) and "山" (mountain). However, if such re-arraying is made by e.g. the letter or character code, the correct sequence of '風林火山' can not necessarily be attained.

If the re-arraying is not done correctly, the title arraying sequence is awkward for the user. Such is to be prevented from occurring. Thus, in the present embodiment, there is provided an attribute [reading] such that only the results of the correct arraying can be supplied to the user at all times. The attribute [reading] is attached to what may become the subject of sorting. Shown below are exemplary data provided with the attribute of [reading] so that the display shown in FIG. 8 may be obtained:

<Title reading="タケダシンゲン (uttered as "takeda singen") 1"> '武田信玄、風の巻'</Title>

<Title reading="タケダシンゲン 2"> '武田信玄、林の巻'</Title>

<Title reading="タケダシンゲン 3"> '武田信玄 火の巻'</Title>

<Title reading="タケダシンゲン 4"> '武田信玄 山の巻'</Title>

It is shown for example that the title, provided with the attribute <Title reading="タケダシンゲン 1" is the '武田信玄 風の巻'. It is also shown that the title is stated for the "1"st time when the books having the reading "タケダシ ンゲン" are re-arrayed. The reason the 'reading' information "タケダシンゲン" is contained in the <Title reading="タケダシンゲン 1"> is that the reading information is used as the information for re-arraying with other books (other titles).

The <Title reading="タケダシンゲン 1"> is used on the user terminal 7 as the information for discriminating the contents data or as the information for re-arraying contents data in accordance with a preset rule. The next following information "'武田信玄 風の巻' is used (provided) for the user to discriminate the contents data. That is, the data of the attribute [reading] is made up by the information used by the user terminal 7 and the information actually supplied to the user.

The data pertinent to the attribute [reading] may be included in the data supplied from the publishing company 1, that is, added by the publishing company 1 or the author of the contents, or added by the data formulating device 2.

FIG. 9 shows exemplary data stated in the bibliological information part 131 and which include data provided with the attribute [reading]. In FIG. 9, data are encircled with a line and a numerical figure is affixed on the outer side of the line. However, the line and the numerical figure are added for explanation and are not affixed to the data. In the following explanation, similar descriptions (drawing) are meant to have the same meaning.

In the <?xml version> of the first line and in the <Info version> of the second line, the version of the corresponding format is stated. The <BookInfo> of the third line indicates that the bibliological information is stated in the ensuing passage. The <title reading> of the fourth line states the title of the contents and the <Author reading> of the fifth line states the name of the author of the contents.

In the <BookID> of the sixth line is stated the information as the sole information based on which the contents may be discriminated. By this information, the contents may be specified. The <Publisher reading> of the seventh line states the name of the publishing company publishing the contents (name of the publishing company 1). The <<It:Label reading> states the issuing trademark provided by the publishing company publishing the contents.

In the four elements, out of the data stated on the first to eighth lines, namely the title stated in the <title reading> of the fourth line, the author name stated in the <Author reading> of the fifth line, the name of the publishing company stated in the <Publisher reading> of the seventh line and the label name stated in the <Label reading> of the eighth line, the reading attribute may be stated for imparting the meaning, because importance is attached to the expressions of the letters and characters for these four elements.

By imparting the reading attribute to these four elements, the user is able to re-array the titles, based on one or more of the titles, author's names, the names of the publishing companies and the label names. By setting for enabling the re-arraying by the plural information sorts, the user desirous to retrieve a book he/she desires is able to retrieve the book readily.

Moreover, by using the concept of [reading], the numerical figures stated in the portion [reading], stating the display sequence, may be allotted in keeping with the intention of the contents producer, even in the course of re-arraying, and hence the producer's intention may be reflected even in the course of the re-arraying.

The <Category> of the ninth line states which genre the contents in question belong to, and may be used as the information for the user to put the electronic books in order more readily. The <Classification> on the tenth line states which data is contained in the contents.

In the paper book, an appendix is sometimes attached to e.g. a magazine. In such case of the paper book, the user may estimate, from the shape, such as the swollen state, of the magazine, that the appendix is attached to the magazine. However, with the electronic information, such as the electronic book, it is not possible to make expressions for allowing the user to make estimations similar to those that may be made from the shape of the magazine. Thus, the <Classification> states the information indicating the fact of attachment of the appendix in order to set the information for allowing the user to recognize which data is included in the electronic book.

The <FreeText> of the 11th line states the summary of the contents. The so stated information is used as the information for allowing the user to recognize (understand) what is the substance of the contents in question. The <DocInfo> of the line 16 indicates that the document information is about to be stated in the ensuing passage. The <Language> of the line 17 states the main language of the contents in e.g. the language code specified in ISO639.

The <Creator> of the line 18 states the name of the creator of the contents and the name of the creating studio. The <CreationDate> on the line 19 states the date and time of creation of the contents. The <Producer> on the line 20 states the formulator or the producer. The <Page> on the line 21 states the apparent number of pages necessary for displaying the contents.

In an electronic book, the concept of the page cannot be definitely defined, in a manner different from the case of the paper book. For example, in the present embodiment, the letter or the character, demonstrated on the display 71, is configured for being enlarged to a size desired by the user.

If it is assumed that the contents displayed at a time on the display 71 of the user terminal 7 for a preset multiplication factor is one page, an enlarge command is issued for the page, and the page is enlarged responsive to the command, the contents sometimes cannot be displayed in one page and are displayed in e.g. two pages. That is, the number of pages depends on e.g. the multiplication factor, and is changed depending on the display situation even for the same contents. Moreover, the number of pages is changed depending on the manner of definition of the concept 'page'. Hence, the apparent number of pages is displayed on the <Page> of the line 21.

In the <Keyword> of the line 23, the language used when the user retrieves the contents is stated.

In the bibliological information part 131, these data are written from contents to contents. Meanwhile, the data shown in FIG. 9 are merely exemplary and other data may also be stated as necessary. Conversely, unneeded data may be deleted or omitted. This holds in the ensuing explanation (other data structure).

The data stated in the stream data part 132 is now explained. In the stream data part 132, the main substance of the contents, as the electronic book, is stated in the data display sequence. The contents usually displayed by the page feed function are stated in this stream data part 131.

With the paper book, there are roughly three sorts of the page expressing methods, that is, a method of acquiring a page as image data and bonding the page, as in a cartoon, a method of arraying a set of letters or characters at a suitable location for expressing a page, as in a magazine, and a method of forming the layout centered about the flow of letters or characters.

In order to use (or allow the use of) the same format, despite the difference in the expression, the concept of the virtual page (virtual image drawing area) is introduced in the present embodiment. The concept of the virtual page is such a one in which the substance stated in an area in the virtual page is handled as one page, however, when the substance is displayed actually on the display 71, only an area that may be displayed in the page is displayed. The virtual page is further explained by referring to the virtual page.

If an area that may be demonstrated on the display 71 is a displayable area 151, an area to be treated as one page (virtual page) is not necessarily demonstrated in the displayable area as one page (at a time). An upper part drawing of FIG. 10 indicates a state in which the displayable area 151 is the same area as a virtual image-drawing area 152-1. In the upper part drawing of FIG. 10, the displayable area 151 is shown as being a frame smaller in size than the virtual image-drawing area 152-1, only for explanation sake. In actuality, the two areas are co-extensive.

Figure 10:
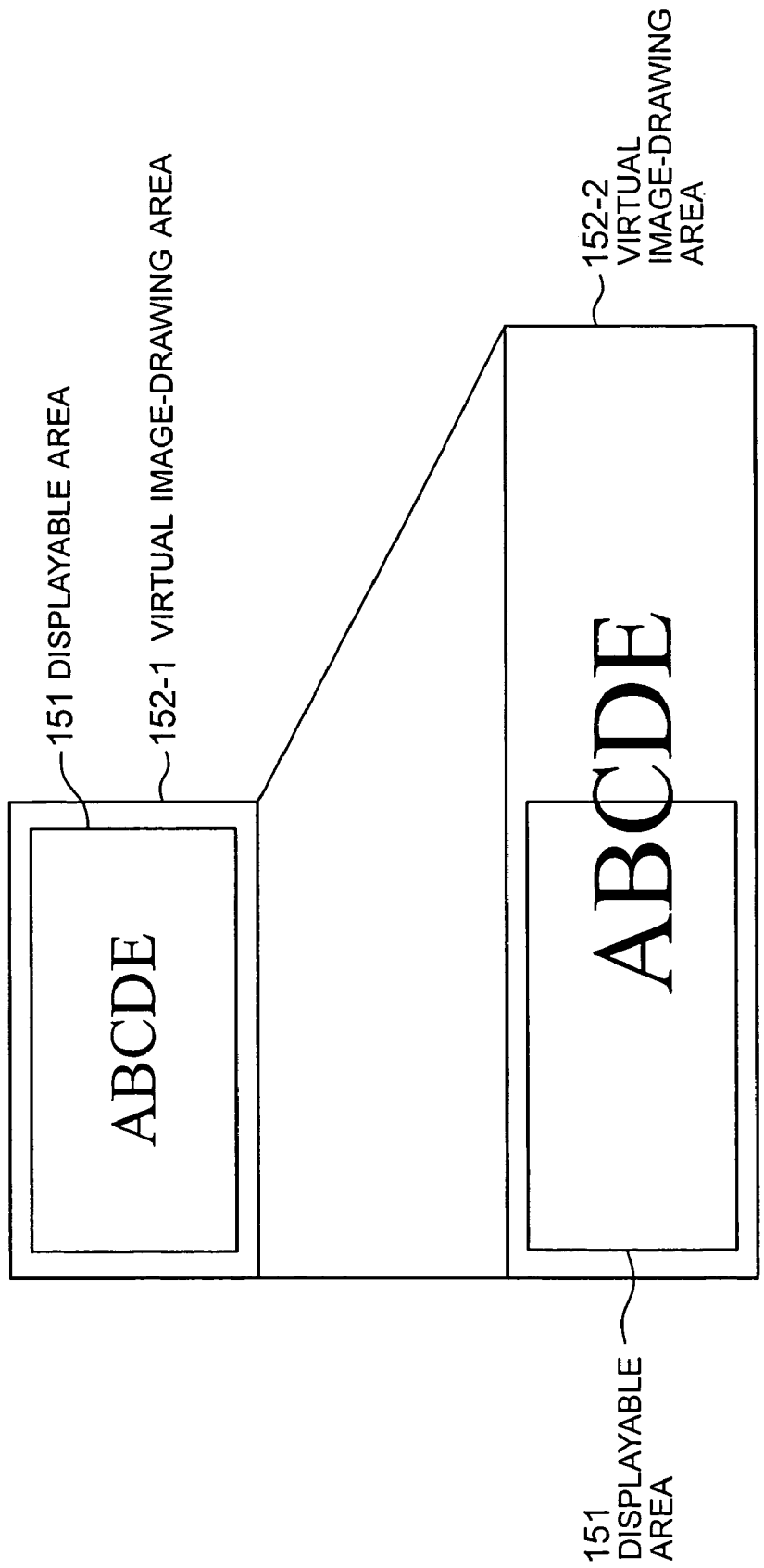
FIG. 10 illustrates an area.

The virtual image-drawing area 152-1, shown as a lower part drawing of FIG. 10, is twice as large in size as the virtual image-drawing area 152-1, shown as the upper part drawing in FIG. 10. If, in the user terminal 7 of the present embodiment, the letters or characters, demonstrated on the display 71, are small in size, these letters or characters may be enlarged to a desired size by the user. Thus, there are occasions where the enlargement of the letters or characters, demonstrated on the display 71, is specified by the user as being two, in terms of the multiplication factor. In such case, the state of display is changed from that shown in the upper part of FIG. 10 to that shown in the lower part of FIG. 10.

That is, in the state of display shown in the upper part of FIG. 10, the state in which alphabetical letters "ABCDE" are drawn in the virtual image-drawing area 152-1, that is, the state in which the alphabetical letters "ABCDE" are drawn as letters or characters for one page are drawn, is coincident with the displayable area 151 actually displayed on the display 71, so that the string of letters "ABCDE" is displayed on the display 71.

If, from this state, the display with the multiplication factor of two is indicated, the virtual image-drawing area 152-2 is enlarged in its transverse direction by a factor of two. The string of letters "ABCDE" is also enlarged to a size twice as large within the virtual image-drawing area 152-2. However, because of the limitation of the displayable area 151 being equal in size to the display 71, the displayable area 151 is not changed but remains to be of a fixed size. Thus, even though the string of letters "ABCDE" is displayed in its entirety in the display 71, in the state of the upper side drawing of FIG. 10, it is only "AB" and about one half of "C" that are displayed in the display 71 in the state of the lower side drawing of FIG. 10.

By the state of display being changed from the upper side drawing to the lower side drawing of FIG. 10, what has been displayed in one page is now displayed in two pages. Thus, in the data of the electronic book in the present embodiment, and in the user terminal 7, handling the data, in which the enlarging processing may be made, it is not possible to use the universal concept of a 'page'. Stated differently, even if book of 100 pages in a paper book is also set to 100 pages in an electronic book, the number of pages is increased in case an enlarging processing is commanded, such that the number of pages can not necessarily be processed as being 100 pages.

Thus, in the present embodiment, the concept of the 'virtual page' is introduced. With this virtual page, a page set as one page is handled as one page even in case a command for the processing such as enlarging processing is issued. The area in which the page is virtually developed is the virtual image-drawing area 152. In the virtual page, drawn in the virtual image-drawing area 152, the area actually demonstrated in the display 71 is the displayable area 151.

As for the displayable area 151 and the virtual image-drawing area 152, and the method for enlarging the image in case enlargement is commanded (Blockstyle or block rule as later explained), the method disclosed in the Japanese Patent Application 2002-280257, previously filed in the name of the present Assignee, may be applied.

The following explanation is added, using the concept of the virtual page (virtual image-drawing area).

Reverting to the explanation on the data stated in the stream data part 131, a cartoon, in which the location displaying an image or the text is fixed rigorously, is stated as image data in the stream data part 131. With the book, such as a cartoon, the substance tends to be changed if the layout is changed. The setting must be made so that, if enlargement is commanded, the enlargement is not such as to change the layout.

Figures 11, 12:
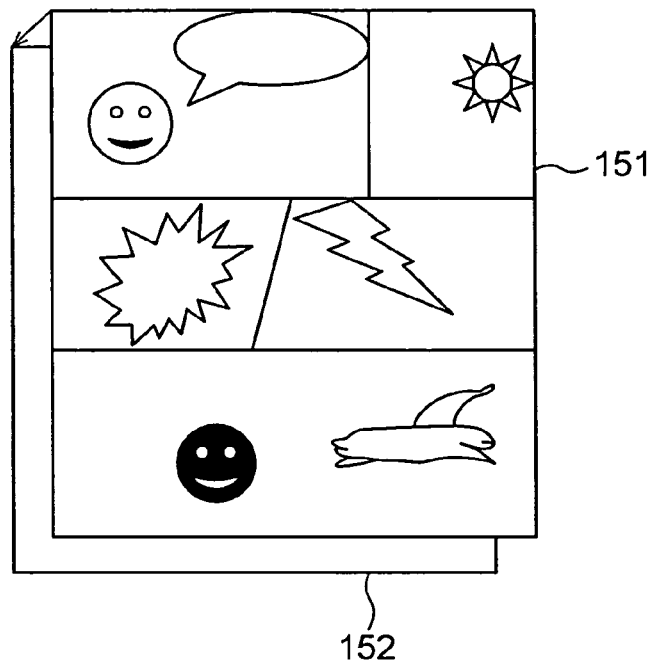
FIG. 11 illustrates an area.
FIG. 12 illustrates data contents.

The book for which the layout is not allowed, such as cartoon, is treated as image data. The setting is made so that the data portion corresponding to one page of the paper book is treated as one page, even in the electronic book, as shown in FIG. 11. The virtual image-drawing area 152 for one page is substantially of the same size as the displayable area 151.

Referring to FIG. 11, each page of e.g. a cartoon is formed by one page. Control is managed so that each page formed by plural frames is displayed as one page. If such page is commanded to be enlarged, the enlarging processing is not performed, or the page is enlarged with the same ratio in the vertical and horizontal directions. In any of these cases, the layout is not changed, so that there is no fear of the frustration of the intention of the creator of the book.

If, in the case shown in FIG. 11, the picture size (displayable area 151) and the image size (virtual image-drawing area 152) are set to be of the same size, and no other statement is made in the page stating part (data shown in FIG. 12), the actually displayed page is of the same size as the virtual page.

The data of the page shown in FIG. 11 (image data) is of the structure shown in FIG. 12. The illustrative data structure, shown in FIG. 12, indicates the substance of the statement of one virtual page employing the <Page> tag. The "objid" next following the <Page> tag of the first line is the information for discriminating the page (image data), and is the information used for specifying the page.

The "pagestyle" is a portion invoking an object stating the page layout information (a portion stating the information for invoking data stated in the object data part 133 (FIG. 7)). By this command, data pertinent to the page margin is read out and determined.

In the <ImageBlock> tag of the second line, there is stated the information for setting for the image being drawn. The "objid" in the <ImageBlock> tag states the information for discriminating the ImageBlock. Meanwhile, this tag declares for handling as the image block.

The next following information "x0, y0, x1, y1" indicates in which location of the original image lies the picture being drawn. The sliced image is indicated with a size specified by the xsize and ysize.

In the typical data, shown in FIG. 12, an image is specified to be displayed with a size of 600 transverse dots and with 800 vertical dots. With the size of the image surface of 600 transverse dots and 800 vertical dots, the image is displayed on the entire image surface. In another typical data, if the image size is 1000 transverse dots and 1200 vertical dots and the size of the image surface is 600 transverse dots and 800 vertical dots, the image corresponding to a part of the entire image, that is, an image of 600×800 dots, is actually displayed and supplied to the user.

In the "refobj", the information of the original data of the picture actually drawn (image data processed when an image is demonstrated on the display 71) refers to the stated portion. In the example shown in FIG. 12, it is indicated that the "objid" draws data of "201". The data of the destination of reference is stated in the object data part 133.

In the "blockstyle", reference is made to the information of the block where the image being drawn is stored. The real data of the "blockstyle" has been stated in the object data part 133. As explained with reference to FIG. 6, the images as well as the text are unexceptionally stated in this block, and the page layout is made for this block without dependency on the substance demonstrated in the block.

In the block information, there is stated the information such as the block size or indication as to framing or non-framing. In displaying an image, statement is made so that the block size and the image display size will be equal to each other.

The text data made up mainly of the text is explained. FIG. 13 shows an illustrative structure of data pertinent to the text stated in the stream data part 132. With the contents in which the page order is determined from the stream of letters and characters, such as a novel, the collection of sentences, such as chapter, is stated in an area demarcated by the <Page> tag, as shown in FIG. 13.

In the example shown in FIG. 13, the text information, specified by a tag <TextBlock>, is stated in an area delimited by the tag <Page>. The "Page objid" or "Pagestyle", stated in the first line, is the same as in the image block described above. With the "textstyle" in the <TextBlock> tag, the object stating the information pertinent to the text drawn is invoked. In this object, the setting for the vertical writing, horizontal writing or the size of letters or characters, is specified.

In the data of the text block, the text data is directly stated as real data, as shown in FIG. 13. Stated differently, with the data of the image block, explained with reference to FIG. 12, the real data is stated in the object data part 133, and the information of the destination of reference is stated in the stream data part 132. In the case of the data of the text block, the real data itself, instead of the information of the destination of reference, is stated in the stream data part 132.

The merit in such setting is now explained. Here, the case of a patent specification is taken as an example of the electronic book. The patent specification is accompanied with the drawings as necessary. The specification is treated as text data, while the drawing is handled as image data. In the specification, certain drawing(s) are referred to a number of times. Conversely, the same sentence in the specification is not referred to a number of times, such that, if the same sentence is present, it is in keeping with the flow of the substance of the text, without referencing the previous sentences.

In other words, the image data, such as drawings, may be used a number of times, while the text data, such as sentences, are utilized only once. Hence, real data of the text data are stated as data of the stream data part 132, while real data of the image data are stated in the object data part 133 and thereby set so that the data may be referenced any number of times under different situations.

FIG. 14 illustrates the text demonstrated on the display 71 as a result of the processing of the data shown in FIG. 13. If, as shown in FIG. 14, the text based on data shown in FIG. 13 is developed in the virtual image-drawing area 152, the size of the virtual image-drawing area 152 is four times as large as the displayable area 151. That is, the user is supplied with data as a number of pages which may be deemed to be 4 pages for a preset multiplication factor. Of course, if the processing, such as enlargement, is commanded, the number of pages is changed in accordance with the command.

Next, data of a book containing both the text and images, such as a magazine, are explained. FIG. 15 shows exemplary data stated in the stream data part 132. The contents, the pages of which are constructed by arranging a collection of sentences and images at intended locations, such as a magazine, are realized by plural block objects being drawn in areas delimited by <Page> tags, and by the distance thereof being specified by the <BlockSpace> tags (for example, the information stated on the second line in FIG. 15).

Out of the data shown in FIG. 15, the information stated on the first line is as described above. The information of the <BlockSpace> on the second and eighth lines is the information for specifying the relative distance between the previous Block and the next following Block.

By determining the relative positions among different blocks, the front-and-back relationship of the blocks may necessarily be maintained, even in case the processing, such as enlargement, is commanded to a preset block, such that the layout of the entire page including the block is marred. Since the front-and-back relationship of the blocks may be maintained, it becomes possible at all times for the user to browse the contents in the order intended by the creator of the contents. The result is the trim display by re-layout.

Figure 16:
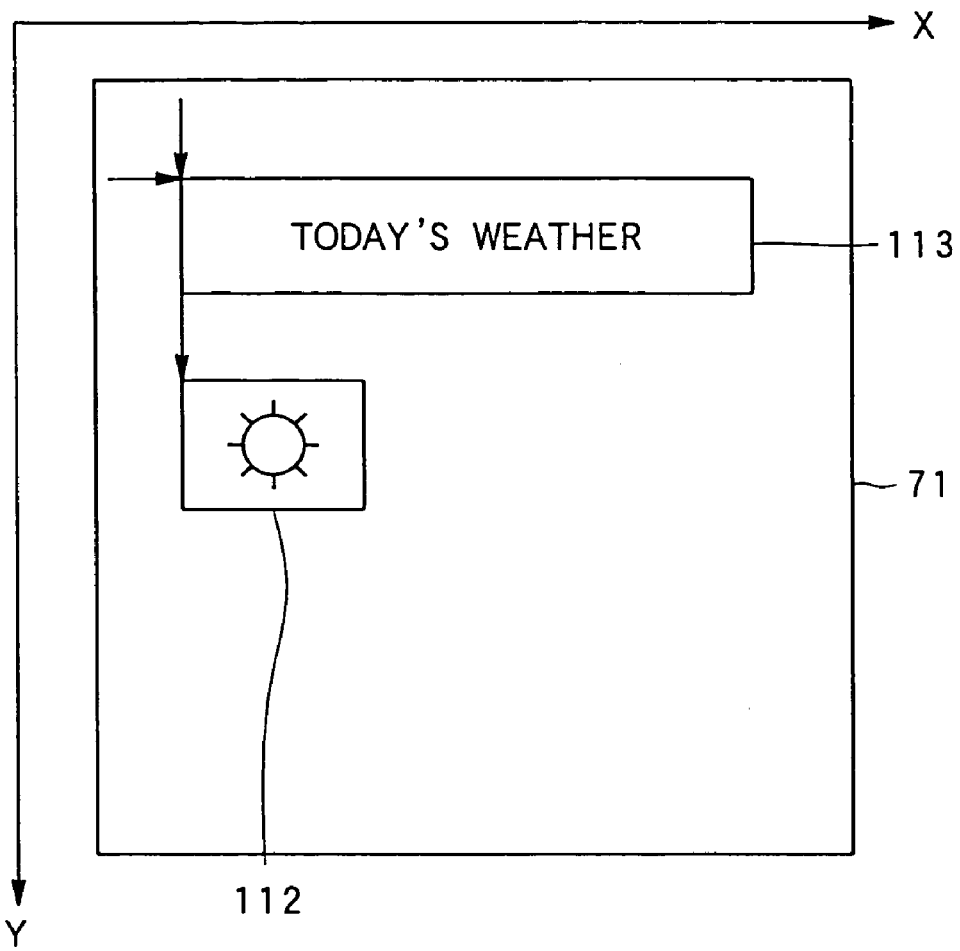
FIG. 16 illustrates display positions.

FIG. 16 illustrates the images or the text demonstrated on the display 71 as a result of the processing of the data shown in FIG. 15. Although the left-and-right direction and the up-and-down direction of FIG. 16 correspond to the X- and Y-axes in FIG. 16, respectively, this axis setting is stated as being a part of the data of the object data part 133, as later explained, and conforms to such statement, and hence the setting shown in FIG. 16 is not necessarily mandatory.

A text display block 113 is formed by data of the third to seventh lines shown in FIG. 15. The data positions are determined by the information of the <BlockSpace> of the second line. In the so determined position, "今日の天気" (today's weather, uttered as "kyouno tennki"), as text data, is displayed.

The image display block 112 is displayed below the text display block 113. The display position is the relative position from the text display block 113 and is derived from the information of the <BlockSpace> of the eighth line. That is, there is the statement: <BlockSpace x="20"> on the eighth line and the image display block 112 is displayed at a position spaced by 20 (preset units, such as 20 dots or 20 mm) from the text display block 113 along the X-direction.

The real data of the image displayed in the image display block 112 is acquired based on the information <ImageBlock objid="122"> on the ninth line. In this case, 122 is given as objid and is data stated in the object data part 133.

The size of the image (size of the image display block 112) is prescribed by <x0="0" y0="0" x1="300" y1="100" xsize="300" and ysize="100"> on the ninth and tenth lines. The former half information <x0="0" y0="0" x1="300" y1="100"> is the information specifying which portion of the image is to be acquired, while the latter half information <xsize="300" and ysize="100"> denotes the multiplication factor. It is shown that an area from (0, 0) to (300, 100) in terms of the coordinates is to be displayed and the area is displayed by 300×100, that is, with a multiplication factor of unity (1).

The data structure shown in FIG. 15 shows an example in which two blocks are displayed in one page, as shown in FIG. 16. However, plural blocks sometimes make up one page, as in the case shown in FIG. 6. In such case, the information of plural blocks is stated from block to block according to the format shown in FIG. 15.

Thus, in the present embodiment, the processing is carried out on the block basis, and the display position of a given block is prescribed as the relative position from the previous block. The fact that the display position of each block is determined by the relative position form the previous block means that the display order is determined among the respective blocks. Thus, it is only after a temporally previous block is displayed that a temporally posterior block, the relative position of which is relatively determined from the display position of the temporally previous block, is displayed, so that, as a result, the display order is determined.

The fact that the display position of each block is determined also means that, when the contents are supplied to the user, the order by which the user reads the contents is also prescribed, on the presupposition that the contents are usually read from above to below and from left to right. Hence, even in case the layout has been changed as a result of the processing for enlargement, the display order is not changed, so that, as a result, there is caused no change in the order the user reads the contents.

It is these data that are stated in the stream data part 132. Moreover, with the electronic book, different from the paper medium, the following is possible, and data for realization thereof is stated in the stream data part 132. First, what becomes possible due to the electronic book being different from the paper medium is explained with reference to FIG. 17.

With the paper book, all pages are consecutive. Stated differently, with the paper book, consecutive numbers are sequentially allocated to the respective pages. The relationship between the magazine in a paper book and an appendix attached to the magazine is scrutinized. First, if attention is directed to the magazine, consecutive numbers are sequentially allocated to the respective pages of the magazine itself. If attention is directed to the appendix, consecutive numbers are again sequentially allocated to the respective pages of the appendix itself.

Figure 17:
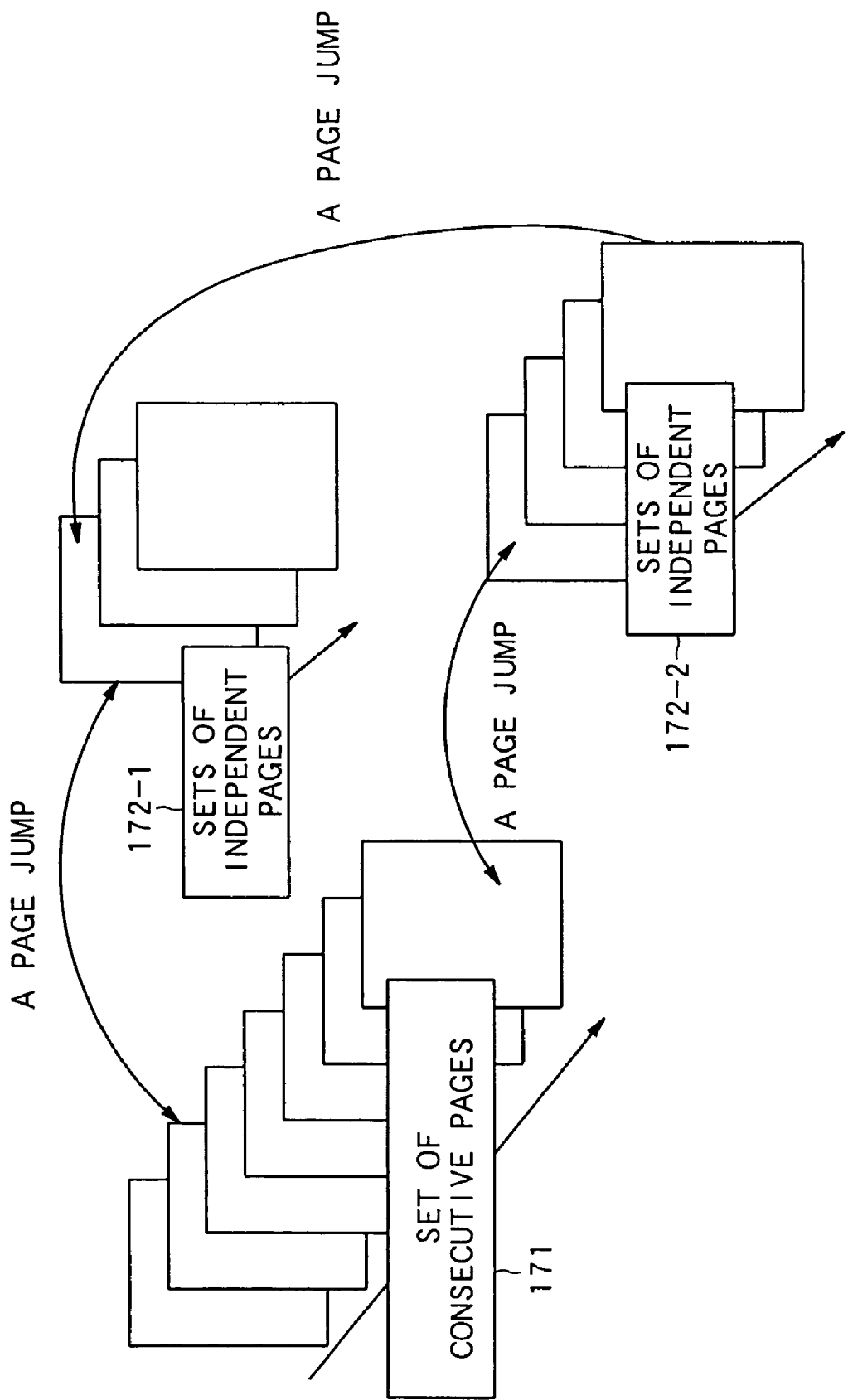
FIG. 17 illustrates a set of consecutive pages and a set of independent pages.

That is, consecutive page numbers are independently allocated to the magazine and the appendix. In FIG. 17, the set of pages for the magazine is the set of consecutive pages 171, while the sets of independent pages for appendices are 172-1 and 172-2. If, with the paper book, a reader shifts from a page of the magazine to a page of a given appendix, he/she sets the magazine aside and holds the appendix to fold over pages of the appendix to search the desired page. With the electronic book, the user may readily shift, by a function termed page jump, from the set of consecutive pages 171 to a desired page of the sets of independent pages 172.

It is assumed that the set of independent pages 172 is the set of pages that may be browsed by the jump function from the set of consecutive pages 171. After page jumping to the sets of independent pages 172, reversion may be made to the preset page of the original set of consecutive pages 171. It is also possible to jump from the set of independent pages 172-1 to the set of independent pages 172-2 or vice versa.

It is however not possible to browse only the preset page of the set of independent pages 172 without page jump from the set of consecutive pages 171, viz., it is not possible to specify only the sets of independent pages 172 as contents to be reproduced from the outset. The reason is that the master-slave relationship is set between the set of consecutive pages 171 and the set of independent pages 172.

The set of independent pages 172 is not identified from solely the set of independent pages 172, but is identified in conjunction with the set of consecutive pages 171. The set of independent pages 172 is intended for providing the subsidiary information for the set of consecutive pages 171. That is, if the set of independent pages 172 is provided in isolation from the set of consecutive pages 171, the set of independent pages 172 tends to be considered to be a set of meaningless pages.

What is stated in the respective pages (blocks) of the set of independent pages 172 is not relevant in substance, such that the pages may be present independently of one another. Stated differently, even if the pages (substance) are interchanged, there is no interchange of the substance on the whole, so that no problem is presented. That is, the articles stated in the set of independent pages 172 are respective independent articles, that is, there is no pertinence or sequencing among the respective articles.

Taking another specified example, the set of consecutive pages 171 is directed to e.g. a novel itself as the substance, while the set of independent pages 172 is directed to the explanation of the persons appearing in the novel or the background, as the substance. Hence, the explanation of the persons, stated in the set of independent pages 172, differs from one person of the novel to another, such that no problem is presented if the explanation is provided independently for each person of the novel, that is, if only the explanation of a specified person of the novel is provided to the user.

If a preset person of the novel appears in the set of consecutive pages 171, the name of the person may be clicked. If the name is clicked, display is changed over to the part of the set of independent pages 172 where there is the explanation of the person.

The user is able to keep on browsing the contents stated in the set of independent pages 172. The user is also able to keep on browsing the explanation on other than the person in question. The user is also able to revert to the preset page of the set of consecutive pages 171 from the preset contents of the set of independent pages 172.

It is also possible to provide two sets of independent pages 172, for example, a set of independent pages 172-1, which has collected only the explanation of the persons appearing in the novel, and a set of independent pages 172-1, which has collected only the explanation of the background, for the sole set of consecutive pages 171. In such case, movement may be made from the set of independent pages 172-1 to the set of independent pages 172-2 or from the set of independent pages 172-2 to the set of independent pages 172-1.

However, the user is unable to browse only the sets of independent pages 172. The user cannot browse the substance of the sets of independent pages 172 except from the state the user is browsing the set of consecutive pages 171. Stated differently, the contents data of the set of independent pages 172 may be browsed only from the contents data of the set of consecutive pages 171.

In light of the above, it may be said that the contents of the contents data of the set of independent pages 172 are of such a substance which provides the ancillary information to the contents of the contents data of the set of consecutive pages 171.

Since the master-slave relationship exists between the contents data of the set of consecutive pages 171 and the contents data of sets of independent pages 172, it is preferred that both contents data are distributed, and that measly contents data of the sets of independent pages 172 are not distributed. The contents data of the set of consecutive pages 171 and the contents data of sets of independent pages 172 may be formulated by the publishing company 1 and provided to the data formulating device 2, or may be formulated by the data formulating device 2 based on the data supplied from the publishing company 1.

The sets of independent pages 172 may be realized without specialized statement in the page by stating the set of independent pages 172 in isolation from the set of consecutive pages 171 stating the main contents. FIG. 18 shows an illustrative data structure.

Lines 1 to 8 are data for the set of consecutive pages 171, whilst lines 9 to 26 are data of the sets of independent pages 172. While the data of the set of consecutive pages 171 are stated in the lines 1 to 8, the data states an identifier <Page objid> discriminating the pages of the set of consecutive pages 171. If the <Page objid> is known, the page can be determined, so that it is sufficient if only the identifier is indicated as the data of the set of consecutive pages 171.

In the lines 10 to 26, the data of the sets of independent pages 172 are stated. As these data, the information <Pages objid>, as an identifier for identifying the sets of independent pages 172, is stated. If FIG. 18 is to be associated with FIG. 17, the set of independent pages 172-1 is the <Pages objid="1001"> of the line 10, while the set of independent pages 172-2 is the <Pages objid="1002"> of the line 18.

In the lines 11 to 17, there is stated the information of the identifiers of respective pages of the set of independent pages 172-1. Referring to FIG. 18, it is shown that, in the set of independent pages 172-1 (set of pages in which the Pages objid as the identifier is "1001"), <Page objid> is made up by "201", "202" and "203". In this manner, the information on the pages, making up the set of consecutive pages 171 and the sets of independent pages 172, is stated in the stream data part 132.

For example, if the user is browsing a certain page of the set of consecutive pages 171, and feels desirous to browse a certain page of the set of independent pages 172, he/she may browse the desired page of the sets of independent pages 172, only on pressing a preset button. The user may then keep on browsing the page of the set of independent pages 172 or, subject to a preset operation, revert to the page of the set of consecutive pages 171 he/she was browsing before the page jump.

Such data is also stated in the stream data part 132.

The data stated in the object data part 133 (FIG. 7) is now explained. In the object data part 133, there are stated data referenced by data stated in the stream data part 132. An example of such referenced data is the style information for decorating the contents as the electronic book. There are real data, as the image data and the speech data, these data being of the contents not directly stated in the stream data part 132.

In the object data part 133, there are stated data relevant to expressions innate to the electronic book, such as the window information or the button information. The window information is used for demonstrating the meaning of e.g. an abstruse word in the sentence indicated on the display 71 as a window on the sentence. The button information is a button demonstrated on the display 71. If the button is acted upon in a preset manner, as when it is clicked, the preset information is displayed.

An example of such button, demonstrated on the display 71, is a button for displaying an image when an article scrapped in a scrap book as later explained is set as an image and saved.

The data stated in the object data part 133 states the information for decorating the contents as the electronic book. Examples of the data include PageStyle, BlockStyle and TextStyle. Since the information (data) is invoked by "stylelabel" as owned by the information (data) as an identifier, the objects invoked by the same "stylelabel" are changed in a lump by changing the style information.

On the first line of the data of the image block shown in FIG. 12 and on the first line of the data of the text block shown in FIG. 13, the "Pagestyle" for prescribing how the block is demonstrated on the display 71 is stated along with the "Page objid" as the block identifier. The data stated in this "Pagestyle" and referenced is stated in the object data part 133.

The information referenced by this "Pagestyle" is first explained. FIG. 19 shows an illustrative data structure of the style information stated in the object data part 133. The Page Style is stated by the PageStyle tag.

In the "objid" attribute on the first line, the information for identifying the "PageStyle" is stated. In the "Stylelabel", there may be stated a label the name of which can be changed freely by the user. Since the object can be optionally named by the user, herein mainly an editor, the object of this style may, of course, be used for an electronic book being edited. Moreover, if the object of this style is used later for another electronic book, the object of the style can be identified with the name (label) afforded by the user, so that the desired object can be searched readily.

The "stylelabel" shown in FIG. 19 is "Honbun". Referring to FIG. 12 or 13, "Honbun" appears in the "Pagestyle" in the first 1 of the data shown in FIGS. 12 and 13.

Thus, if, in this case, the image block, shown in FIG. 12 or 13 is drawn, the data of FIG. 19 is read out (referred to) as "Pagestyle" from the object data part 133. In this manner, the data of the sole "Pagestyle" is sometimes referred to from plural data.

By commonly using the data, referenced from plural data, the capacity of the overall contents data of the electronic book can be diminished. By so doing, the display pertinent to plural blocks can be re-written in a lump by simply rewriting the information of the "Pagestyle" shown in FIG. 19. This means that the processing, such as editing, may be facilitated.

Still dwelling on the explanation of the data structure of "Pagestyle" shown in FIG. 19, in "evenfooterid", "evenheaderid", "oddfooterid" and in "oddheaderid", of the second to fifth lines, the objid of the header object and the footer object, used in even or odd pages, is stated in view of the spread display. Meanwhile, the page in the explanation of FIG. 19 means the displayable area 151 (FIG. 10), in which the size of the display 71 is one page.

The spread display means not the display having one display face on the display 71 as in the case of the user terminal 7 shown in FIG. 4, but the double face display on the display 71 or pseudo-double face display.

In the "pageposition" on line 6, there is stated the command for specifying on which side the page is demonstrated (in which position the page is displayed) in case of spread display. By this command, if the letters or characters are commanded to be enlarged, such that the layout in the non-enlarged state is marred, it is possible to maintain the intended page design.

In the "setemptyview" on line 7, there is stated the information which, if an empty page needs to be drawn between a certain page and the page to be displayed next, because of the processing of enlarging the letters or characters, gives a command whether or not a header or a footer is to be drawn in the empty page. For example, if the 'show' is specified, the header or the footer is drawn, whereas, if the 'empty' is specified, a completely empty page, free of the header or the footer, is displayed.

The layout in the page (e.g. margin) is determined, based on the information of the "topmargin", "headheight", "headsep", "oddsidemargin", "evensidemargin", "textheight", "textwidth", "footspace" or "footheight", in the line 8 to line 16. Moreover, by designating the "layout" on line 17, it is determined whether the coordinate system in the page is that for vertical writing or that for horizontal writing.

Referring to FIG. 20, the data pertinent to Textstyle, out of the data stated in the object data part 133, is explained. The data of the Textstyle, shown in FIG. 20, is read out based on the statement on the second line in the data shown in FIG. 13. On the second line of the data shown in FIG. 13, there is a statement <Textstyle="tategaki">. The data identified by this label "tategaki", indicating vertical writing, is read out from the object data part 133. In this case, the data so read out is data shown in FIG. 20.

The "Textstyle" is stated by a TextStyle tag. The information for identifying the "Textstyle" is stated in the attribute "objid" on line 1, whilst a label, the name of which can be freely changed by the user, may be stated in the "stylelabel". In the "frontsize" on the second line, the information for specifying the size of the letters or characters drawn is stated.

In the "fontescapement" and "fontorientation" on lines 3 and 4, there is stated the information for specifying how the letters or characters drawn are rotated and in which orientation the letters or characters drawn are advanced. The above two information depends in whether the text is formed by vertical writing or horizontal writing. In the "fontfacename" on line 5, the information on the font face name of the letters or characters drawn is stated. For example, in the case of FIG. 20, the "Ming Dynasty" is specified as the font face name.

In the "textcolor" on line 6, the information for specifying the color of the letters or characters drawn is stated. By this information, the drawing may be made with the color conforming to the taste of the user. In the "wordspace", "letterspace" and "charspace" of lines 7 to 9, there is stated the information for specifying the spatial distance between the English words, the spatial distance between the English letters (alphabetical letters) and the spatial distance between the characters or kana letters.

In the "baselineskip" on line 10, there is stated the information for specifying the line-to-line spacing and, in the "linespace" on line 11, there is stated the information for specifying the minimum spacing that is to be maintained between the neighboring lines. By the information on the "linespace", the minimum spacing that is to be maintained even if the layout is marred, is specified, thus allowing for fine re-drawing.

Referring to FIG. 21, the data pertinent to the BlockStyle, out of the data stated in the object data part 133, is explained. The BlockStyle data, shown in FIG. 21, is data read out (referenced) based on the statement on line 2 of the data shown in FIG. 13. On line 2 of the data shown in FIG. 13, there is a statement: <BlockStyle="textblock" >>. The data identified by this label "textblock" is read out from the object data part 133. In this case, the so read out data is the data shown in FIG. 21.

The "BlockStyle" is stated by the "BlockStyle" tag. The attribute "objid" on line 1 states the information for identifying the "BlockStyle" and, in the "stylelabel" there may be stated a label the name of which can be freely changed by the user. In the "blockheight" on line 2, there is stated the information for specifying the information for specifying the height of the block to be secured for drawing.

Within the data, shown in FIG. 21, the "blockheight" specifies the block height. However, the transverse width of the block is not specified. The transverse width of the block is specified by the "blockwidth". The data shown in FIG. 21 is for a case where the text is stated in vertical writing style within the block (that is, for a case of the data read out by the text block shown in FIG. 13). In such case, the transverse width is changed with the number or the size of the letters or characters, so that it is meaningless or not possible to specify the transverse width of the block with "blockwidth". Hence, the information specifying the transverse width of the block is not stated in the data shown in FIG. 21.

In the "blockrule" on line 3, there is stated the information for specifying how the block is drawn. This "blockrule" is the information in case the enlargement is commanded. In the example shown in FIG. 21, the "vert-fixed" is commanded. This "vert-fixed" means that, in case enlargement is commanded, the size in the vertical direction of the block is fixed, while only that in the horizontal direction is enlarged. As other rules, a rule for enlarging the vertical direction and the horizontal direction with the same proportion may be set. Such rule in keeping with the substance displayed in the block (image or text) is to be set.

In the "layout" on line 4, the information for specifying the coordinate system in the block and the direction of the set is stated. In the example shown in FIG. 21, "TbR1" is stated. This "TbR1" is used when the upper right part of the text block is a point of origin and the text is drawn with the vertical writing. The "LrTb" is used when the left upper part of the text block is a point of origin and the text is drawn with the horizontal writing.

In the "topskip", "sidemargin" and "footskip" on lines 5 to 7, the information for setting the layout in the block is stated.

Such data is stated in the object data part 133. Meanwhile, the data explained with reference to the drawings is merely illustrative and is not intended for limitation. That is, data other than the above data may be stated as data, such as real data of the image, not shown. Even the above data may be deleted (omitted) if there is data unneeded for the application being considered.

The above data may be changed, that is, may be edited and changed, extremely readily, because the stream data part 132 and the object data part 133 are separated from each other. The separation of the stream data part 132 and the object data part 133 gives rise to the following merits:

Usually, the manuscript of a book is formulated without dependency on the layout. If the manuscript formulated by the author (creator) is to be exploited efficaciously, the part dependent on the page layout and the sentence part need to be trimly separated from each other. The format used in the present embodiment (that is, the above data) separates the sentence part (stream data part 132) and the layout part (object data part 133) from each other.

Moreover, since the contents can be stated without interrupting the sentence flow, the stream data part 132 can also be utilized as the digital data inputting system. Thus, if the manuscript is formed using the format of the present invention, the manuscript may be used as usual manuscript data without the necessity of converting the data as is required in formulating the contents of the electronic book.

Figure 7:
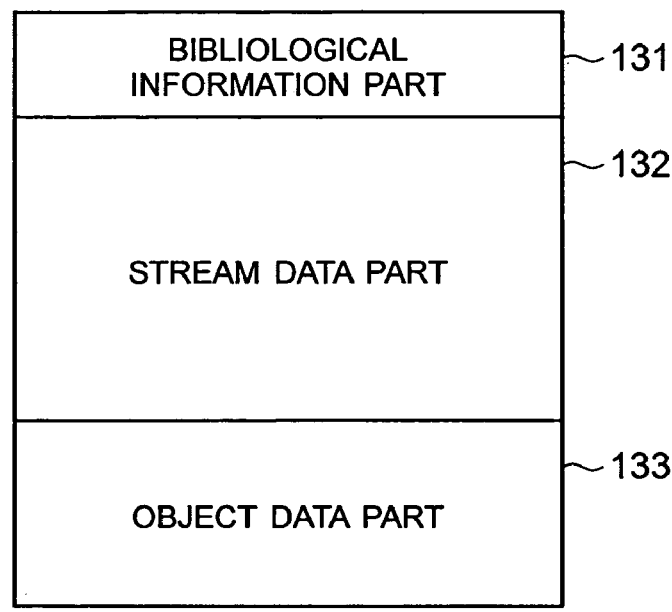
FIG. 7 shows an illustrative structure of data prepared by the data formulating apparatus.

The XML converter 21 (FIG. 2) converts the data, supplied from the publishing company 1, into data containing data explained with reference to FIGS. 8 to 21, in the data structure shown in FIG. 7. The so converted data in this case is the XML format data. The processing for converting the data into binary data (binary file data) supplied to the user terminal 7 is carried out in the data converter 22.

Figure 22:
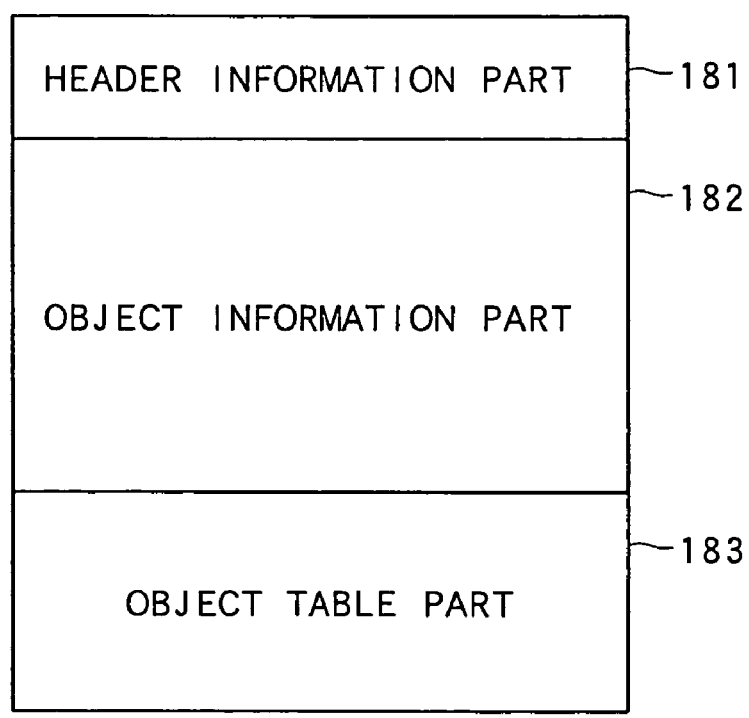
FIG. 22 shows an illustrative data structure.

The processing carried out by the data converter 22 is hereinafter explained. FIG. 22 shows the structure of a file generated as a result of conversion by the data converter 22 (data distributed to the user terminal 7). As shown in FIG. 22, the data converted by the data converter 22 is converted into a binary file, that is, into a data structure in which the totality of the contents information is supervised as an object. Since the data may now be managed as an object, data may be accessed speedily. Moreover, since the compression and encryption may be applied from object to object, data can be utilized efficiently.

Since the data can be accessed speedily, the user does not recognize the time involved in data processing as latency time and hence does not feel stressed.

Moreover, since the compression and encryption may be applied from object to object, it is unnecessary to encrypt the entire contents, but it is sufficient if certain objects are encrypted, in which case the effect as if the entire contents data are encrypted may be obtained. As will be explained in detail subsequently, the objects reference one another. If one of the referencing objects is encrypted, the other does not have to be encrypted and, as a result, the encrypted object cannot be exploited, so that the object may be reproduced.

Thus, there is no necessity of encrypting the entire contents data and the encryption needs to be applied only to the least extent. Since the time needed in encryption or decryption may be reduced, and the capacity needed may be minimized, the redundant capacity may be allocated to the other processing.

Referring to FIG. 22, the distributed data is made up by a header information part 181, stating the information pertinent to the distributed data itself, an object information part 182, indicating the substance of the contents, and an object table information part 183 specifying the object positions.

In the header information part 181, the information of the file format, a flag indicating whether or not the data has been encrypted, or the size of a screen on which the contents are presumed to be displayed, such as the size of the display 71 of the user terminal 7 (FIG. 4). The screen size information is the information stated in order to permit the contents to be properly displayed on a terminal other than the user terminal 7.

The reference material information is also stated as necessary, whether it is contained in the header information part 181 or formed as a part discrete from the header information part. The reference material information is the information containing the information stated in the bibliological information part 131, shown in FIG. 7, and is the information made up by the titles of the contents or data of thumbnail pictures.

In the object information part 182, handling the information necessary for displaying the substance of the contents, in terms of an object, as a unit, the information of the objects are stated. In the object table information part 183, the information necessary for accessing the respective objects is stated.

Directly ahead of the object information part 182 and directly ahead of the object table information part 183, some or other data may be inserted for formulating a document. It is also allowed as necessary to insert data for formulating a document.

In the object table information part 183, the object number, the start address of object data and the size of the object data are stated as a set. If the object is to be acquired, the number stated in the object table information part 183 is retrieved, its start address is acquired, and a memory area needed for reading-in an object (such as RAM 103 of the user terminal 7 (FIG. 5)) is secured.

The statement method within the object differs, depending on the object type, from one object to another. The object type is as shown in FIG. 23.

The "PageTree" is an object for representing (managing) the page order by a tree structure. The "Page" is an object stating the substance of a page. The "Header" is an object stating the substance of a footer part of the page. The "PageAtr" is an object stating the attribute of the Pageobject.

The "Block" is an object stating the substance of a block arranged in a page (text or images). The "BlockAtr" (block attribute) is an object stating the attributes of the Block object. The "MiniPage" is an object specifying an area in the page where the layout information is strong, and also stating the substance in the area.

The "BlockList" is an object stated when listing the blocks. The "Text" is an object stating the contents of the text when the text is displayed in the block. The "TextAtr" (text attribute) is an object for displaying an image in the block, while the "Image" is an object for displaying an image in a block. The "Canvas" is an object specifying an area for holding the layout in a page, and stating the substance in the area.

The "paragraphAtr" (paragraph attribute) is an object stating the attributes of the substance of the paragraph. The "ImageStream" (Image data) is an object stating image data. The "Button" is an object stating the button information. The "Window" is an object stating the substance displayed as the Window. The "PopUpWin" is an object stating the contents displayed in a popup window.

The "Sound" is an object stating the information when a speech file produces the sound. The "SoundStream" is an object stating the speech file information. The "Font" is an object stating the font information. The "ObjectInfo" (Object information) is an object stating the ancillary information of the invoking source object. The "BookAtr" (book information) is an object for initializing a book. The "TOC" is an object stating the Table of Contents.

Figure 25:
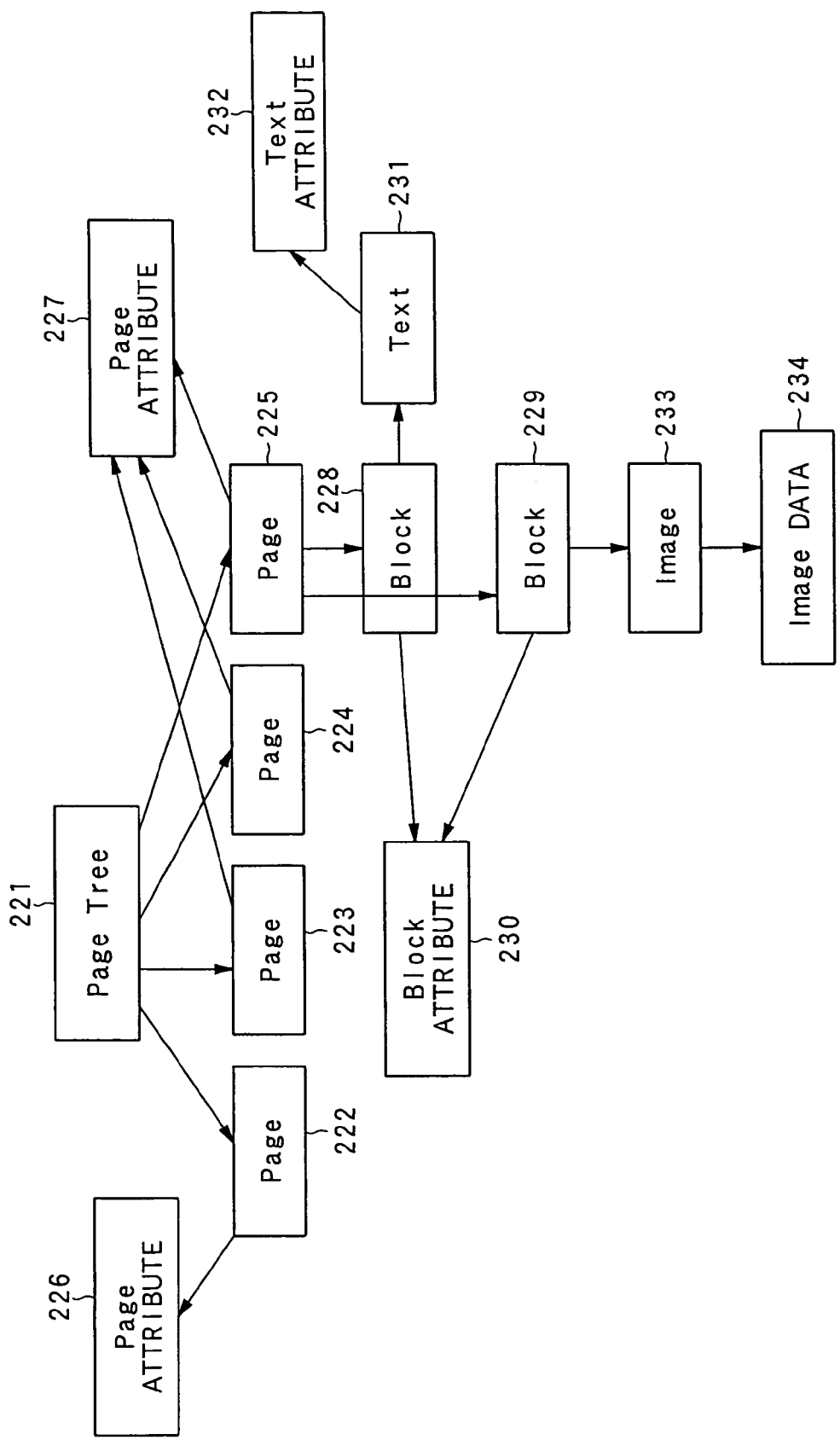
FIG. 25 illustrates objects.

By these objects of different types referencing one another, the contents of an electronic book are represented. The data converter 22 (FIG. 2) converts the data of the XML format, supplied thereto, into an object stating the substance. Referring now to FIG. 25, the relationship between the data of the XML format and the objects is explained, by taking a specified example. The element of the data of the XML format is referred to below as XML document.

Figure 24:
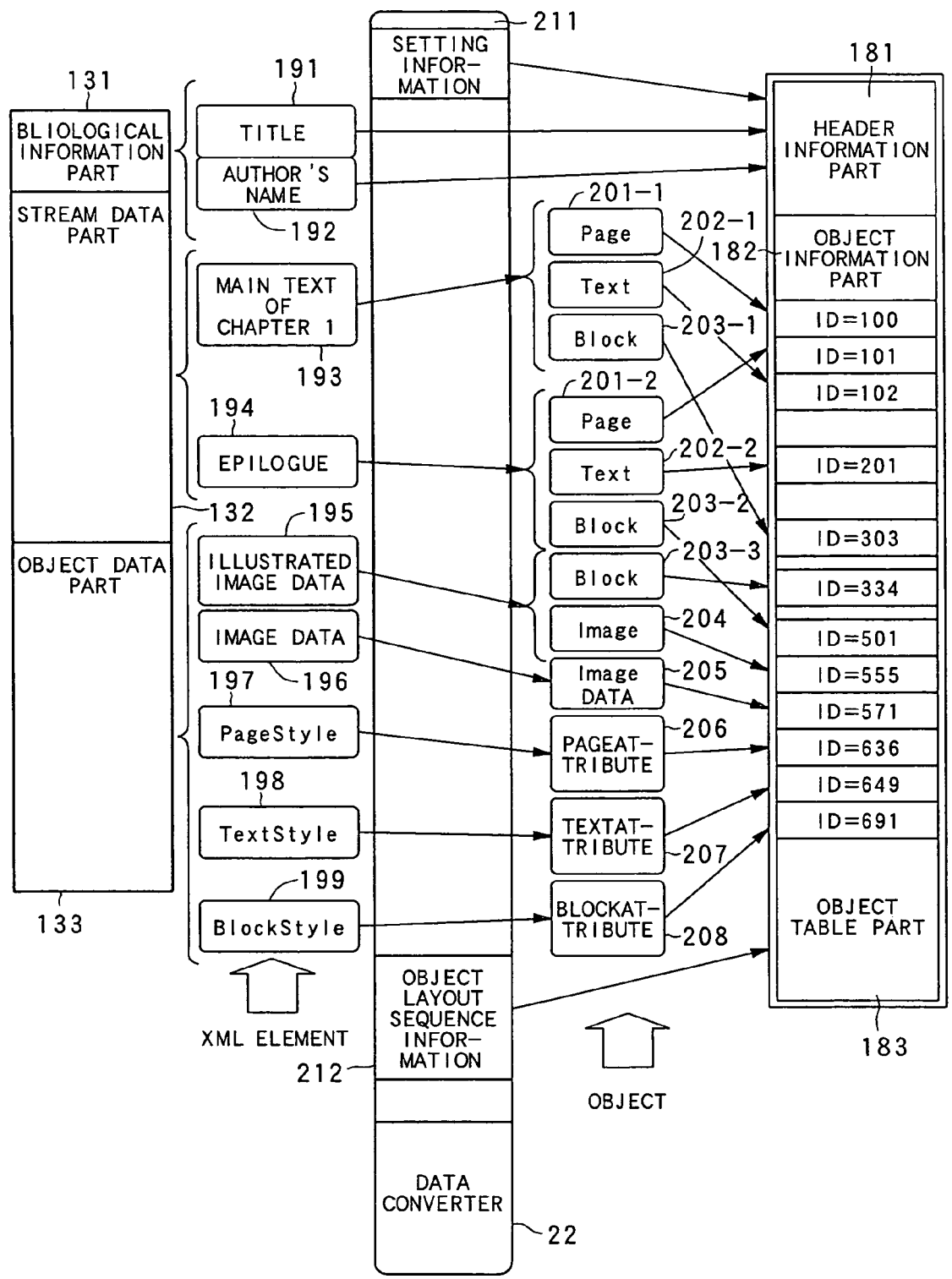
FIG. 24 illustrates the relationship between data of the XML format and data of the binary format.

Referring to the left side part of FIG. 24, the data of the XML format, supplied to the data converter 22, is made up by the bibliological information part 131, stream data part 132 and the object data part 133. As to the data structure and the substance stated in each part, reference is to be made to the explanation of FIG. 7. In the example shown in FIG. 24, the "title", an XML element 191, the "author's name" and an XML element 192, are stated. These data are stated in the header information part 181 by the data converter 22. In the header information part 181, the setting information, formulated by the data converter 22, is written as necessary.

In the example, shown in FIG. 24, "main text of chapter 1" XML element 193 and "epilogue" XML element 194 appear in the stream data part 132. First, the "main text of chapter 1" XML element 193 is converted by the data converter 22 into a Pageobject 201-1, a Text object 202-1 and a Block object 203-1. In similar manner, the "epilogue" XML element 194 is converted by the data converter 22 into a Pageobject 201-2, a Text object 202-2 and a Block object 203-2.

The substance of the "main text of chapter 1" XML element 193 and the substance of the "epilogue" XML element 194 are expressed by the text, and hence are converted into Text objects 202-1 and 202-2. The Text objects 202-1 and 202-2 are objects stated in displaying the text in the block. The information on the block, in which to demonstrate the text, is stated in Block objects 203-1 and 203-2. Additionally, the information on e.g. the positions in a preset page of the blocks, based on these Block objects 203-1 and 203-2, is stated in the Pageobject 201-1 and in the Text object 201-2.

In this manner, each XML element is converted into plural objects.

Still dwelling on the explanation, the "illustrated image data" XML element 195, stated in the object data part 133, out of data supplied to the data converter 22, is converted into a Blockobject 203-3 and an Imageobject 204. Since the "image data" XML element 195 is data for referencing image data, it is converted into an Imageobject 204.

The "illustrated image data" XML element 195 is not image data per se, but is data for referencing corresponding image data. The image data per se is stated in the object data part 133 as "image data" XML element 196. This "image data" XML element 196 is converted by the data converter 22 into an Image data object 205. An image derived from the Image data object 205 is displayed in the block in accordance with the substance stated in an Image object 204, while being displayed in a preset page in accordance with the substance stated in a Block object 203-3.

In an example shown in FIG. 24, there are, in the object data part 133 of the XML format, supplied to the data converter 22, a "PageStyle" XML element 197, a "TextStyle" XML element 198 and a "BlockStyle" XML element 199. These XML elements are converted by the data converter 22 into a Page-attribute object 206, a Textattribute object 207 and a Block-attribute object 208. These objects, referred to by the Pageobject 201-1, Text object 202-2 and the Block object 203, state the respective attributes.

In this manner, the data converter 22 analyzes data of the input XML format, and converts the data into plural objects, in accordance with a preset conversion rule. The preset rule is such a one in which e.g. the XML element "main text of chapter 1" XML element 193, pertinent to the text, is converted into three objects, namely a Pageobject, a Textobject and a Blockobject.

In converting the XML format data into an object, the data converter 22 verifies in which area the object (binary data) is to be stored. During this conversion, the data converter 22 supervises the objects with the identification number, termed the object number (object ID). For example, the object ID of the Pageobject 201-1 in FIG. 24 is "100". The data converter 22 also formulates the object layout sequence information 212, in which the object ID, the address of the area in which is stored the object supervised by the object ID, and the size of the object managed by the object ID, are correlated with one another.

The data converter 22 states the so formulated object layout sequence information 212 in the object table part 183.

In storing objects in the object information part 182, the storage areas are controlled (desirably) by the data converter 22 so that the objects of the same sort are stored in proximate areas. An example is taken for explanation with reference to FIG. 24. The Pageobject 201-1 and the Pageobject 201-2 are objects of the same sort, termed the Pageobjects, and hence are controlled to be stored in upper proximate areas of the object information part 182 in the drawing.

By the data converter 22 carrying out the conversion and control as described above, the binary format data, having the structure shown in FIG. 23, are formed. The so formed binary format data prove the data distributed to the user.

A further example of the object is now taken for explanation. In FIG. 25, schematically depicting the formulation of a page of an electronic book by exploiting these objects, each quadrangle denotes an object.

A PageTree object 221 is an object stating a page structure of a book as an electronic book. The page structure, indicated by this PageTree object 221, indicates that, in the example shown in FIG. 25, the book is made up by Pageobjects 222 to 225. The Pageobjects 222 to 225 state the information on how the layout of the contents actually demonstrated on the display 71 is formed.

The Pageobject 222 refers to a Pageattribute object 226, while the Pageobjects 223 to 225 refer to a Pageattribute object 227. The Pageattribute objects 226, 227 state the information, such as the page margin, header or the footer. The PageStyle information, explained with reference to FIG. 19, in the above explanation, is stated in these Pageattribute objects.

There are occasions where a Pageattribute object is set so as to be referenced by plural Pageobjects. However, the information that may be referenced common may be used common for thereby simplifying the data structure for reducing the data quantity of the entire contents data. Additionally, the editing operation, for example, may be facilitated.

The Pageobject 225 refers to a Blockobject 228 and a Blockobject 229. In the Blockobjects 228 and 229, there is stated the information which is arranged in e.g. the main text area of the page, which secures an area for the text or an image drawn in the inside and which prescribes the operation in case of enlarging the size of the letters or the characters.

The Blockobjects 228 and 229 both refer to a Block attribute object 230. This Block attribute object 230 states the formulating method in case a command for the block size or enlargement is issued. The Blockstyle information, explained in the foregoing with reference to FIG. 21, has been stated in this Block attribute object 230.

The Block object states the information pertinent to the text or the image placed in a page. The Block object 228, shown in FIG. 25, is the information for demonstrating the text in the page, and hence refers to a Text object 231. In this Text object 231, there is stated the information for stating the text in a block.

The Textobject 231 refers to a Textattribute object 232. In this case, the Textattribute object 232 states the attributes of the Text object 231, and more specifically, the font information or the initial values for the line-to-line spacing. The Blockstyle information, explained in the foregoing with reference to FIG. 20, is stated in this Text attribute object 230.

On the other hand, a Blockobject 229, shown in FIG. 25, is the information for demonstrating an image in a page, and hence refers to an Imageobject 233. The Imageobject 233 states the information for stating an image in a block (the information on e.g. the location and the size).

In the embodiment, shown in FIG. 25, when an image is drawn on a page, a Block object 229 is formulated, and invokes the Image object 233. Actual image data are acquired as a result of referencing of Image data 234.

By the data being objects, as described above, the relationship of inter-referencing among the objects becomes definite, while the format expansion is facilitated. Taking a concrete example for illustrating that the format extension is facilitated, if, in the embodiment shown in FIG. 25, the Imageobject is changed into a Movieobject (object for displaying a moving picture), so that moving pictures may be handled, there is no necessity of changing the Pageobject 225 stating the page layout.

That is, the still image (Image) may readily be converted to moving pictures (Movie). Of course, the still image (Image) may be exchanged by another still Image.

Moreover, since the totality of the elements representing preset contents are managed by the objects, a book may be represented using the objects of other contents. For example, data prepared for representing preset contents (book) may be diverted to data for similarly representing other contents (books).

This may be utilized to take out only needed objects. A concrete example is now taken in this connection. The foregoing description is the processing in the data formulating device 2. Here, the processing operations carried out by the user terminal 7, handling the data formulated by the data formulating device 2, is explained. Among these processing operations, there is the operation of formulating a scrapbook.

In connection with the processing operation of formulating the scrapbook, the merit of handling the data as objects is further explained.

The scrapbook is a book in which a user is to save the favorite sentences or images in a preset book. In the case of a newspaper of the paper medium, the user cuts off a favorite article from the newspaper and bonds the so cut-off article on a notebook for later referencing. This notebook is herein termed a scrapbook and the function of formulating the scrapbook as an electronic book is termed a scrapbook function.

The so formed scrapbook may be handled similarly to the other electronic books. The basic operations to be carried out by the user preparing a scrapbook include selecting the part to be saved (scrapped) and adding (saving) the so selected part in the scrapbook.

Figure 26:
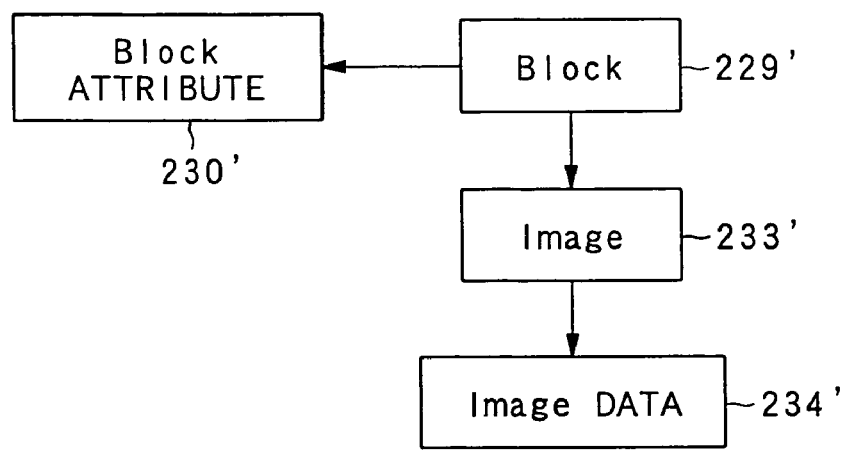
FIG. 26 illustrates objects of a scrapped article.
Figure 27:
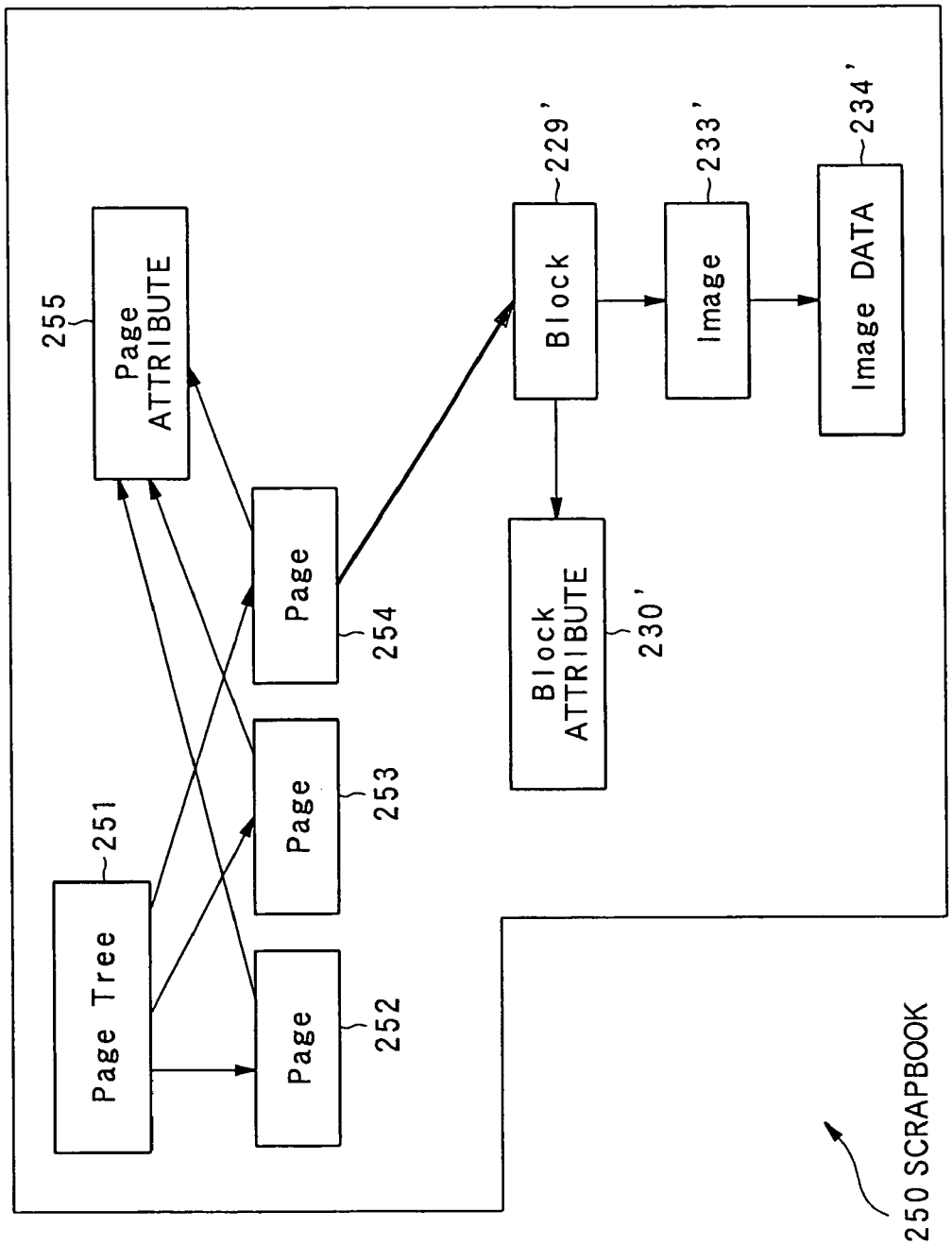
FIG. 27 shows an illustrative structure of a scrapbook.

Referring to FIGS. 26 and 27, the scrapbook is further explained. It is assumed that the user browsing an electronic book, configured as shown in FIG. 25, at the user terminal 7, is desirous to scrap an image in the electronic book, displayed by processing the Image data objects, and has performed preset processing for scrapping, as will be explained subsequently.

By the preset processing, the data shown in FIG. 26 is copied (a branch as a part of the data of a tree structure shown in FIG. 25 is cut off). FIG. 27 shows an example of the scrapbook added by the so cut-off branch portion. A scrapbook 250, shown in FIG. 27, is an electronic book stated in a PageTree object 251

The scrapbook 250 is made up by Pageobjects 252 to 254. If the number of scrapped articles (scrapped branches) is increased, the number of pages of the scrapbook itself is increased. Hence, Pageobjects are formulated in keeping with the increase in the number of pages. In the embodiment shown in FIG. 27, the Pageobjects 252 to 254 all refer to the Page attribute object 255.

By so doing, the book provided as the scrapbook 250 to the user is easy to see and is of a uniform page style. Since the scrapbook 250 is formed by the text and images, scrapped from variable books, there is a risk that, if the as-scrapped state is kept at the bonding step, the horizontal writing style text is laid out next to the vertical writing style text.

Such page may lack in unity and hence may be awkward to see for the user. Hence, unity is to be imparted to the page-based style. This is realized in the present embodiment by the totality of the Pageobjects referencing the same Page attribute object.

In the embodiment shown in FIG. 27, the Pageobject 254 is set so as to be the last page in the scrapbook 250. Thus, a branch (data) as cut off, shown in FIG. 26, is bonded to the Pageobject 254, as the last page. By so doing, the so bonded branch becomes data referenced from the Pageobject 255.

The technique of taking out a needed part, such as a scrapbook, in the electronic book, not embodying the present invention, is taking out the text data in a format for a scrapbook. However, in the present format, in which all data are objects, as described above, the scrapped part may be added without changing the format style, That is, in the present invention, data cut/paste may be facilitated.

The scrapbook formulation is further explained. Referring to the flowchart of FIG. 28, the processing pertinent to selection of the scrapping part by the user is now explained. In a step S11, the user causes desired contents (main text) to be demonstrated on the display 71 of the user terminal 7. If there is any part, desired to be scrapped, in the so displayed text, the user performs preset processing operations to cause a menu picture to be demonstrated on the display 71 (step S12).

The preset operation is carried out by acting on e.g. the jog dial 79 (FIG. 4) of the input unit 106 (FIG. 5). The user selects, from the displayed menu, an item 'clip letter or character' for carrying out the scrapping. It is noted that any item may be provided in the displayed menu, which is not illustrated nor explained.

If the item 'clip letter or character' for carrying out the scrapping processing is selected in a step S13, the leading end frame is selected in a step S14. FIG. 29 shows the state in which such leading end frame 270 is demonstrated on the main text demonstrated on the display 71. The leading end frame 270 is a frame showing the possible range of designation of the leading end letter or character (location) of the part for scrapping.

This leading end frame 270 is set so as to be movable within a page prescribed by the Pageobject (virtual page). Reverting to the explanation of the page, a page is prescribed by the Pageobject, and if a page, prescribed by the Pageobject, is one page, it may be set to be equivalent to 100 pages in terms of actual pages (pages when the contents are in the form of a paper book or the range displayed at one time on the display 71 for a preset multiplication factor).

As for the page prescribed by the Pageobject, what is drawn in the virtual image-drawing area 152 (FIG. 10) is set as being one page. Thus, in case what is demonstrated on the display 71 (drawn in the displayable area 151) is comprehended as being one page, the contents displayed over several pages is treated as being one page, even if the contents displayed are demonstrated over several pages, in case the contents are displayed within a page prescribed by one Pageobject.

Thus, in case the displayable area 151 and the virtual image-drawing area 152 are coincident with each other, as shown in the upper side part of FIG. 10, the leading end frame is not moved to outside the main text demonstrated on the display 71. However, if the displayable area 151 and the virtual image-drawing area 152 are not coincident with each other, as shown in the lower side part of FIG. 10, the leading end frame 270 may be comprehended by the user as being movable over several pages.

At any rate, the leading end frame 270 is set so as not to be moved to outside the page prescribed in the Pageobject. It is because the data are handled as objects in the present embodiment. In this case, processing is carried out for one Pageobject and not for plural Pageobjects.

By so doing, that is, by not performing the processing on plural Pageobjects (processing for scrapping), it is possible to prevent the totality of one-volume data containing plural Pageobjects from being executed by one scrapping processing. Stated differently, with the above processing, it is possible to prevent illicit copying.

It may be an occurrence that, in light of the copyright, the copying of the part of the contents, commanded to be scrapped, is not allowed. It is assumed that a book is formed by plural Pageobjects, and at least one of the Pageobjects is set for copy inhibit. If a book is to be copied in its entirety, the user has to carry out the scrapping operation repeatedly, from one Pageobject to another, by a laborious operation. Hence, the user possibly gives up the copying at this time point.

Moreover, even if the user does not give up the repeated scrapping operations, at least one of the Pageobjects in the book about to be copied, is not allowed for copying, so that, as a result, the book in its entirety cannot be copied. Thus, at least two-stage protection against copying is provided in effect, thus enabling prevention of illicit copying.

Figure 28:
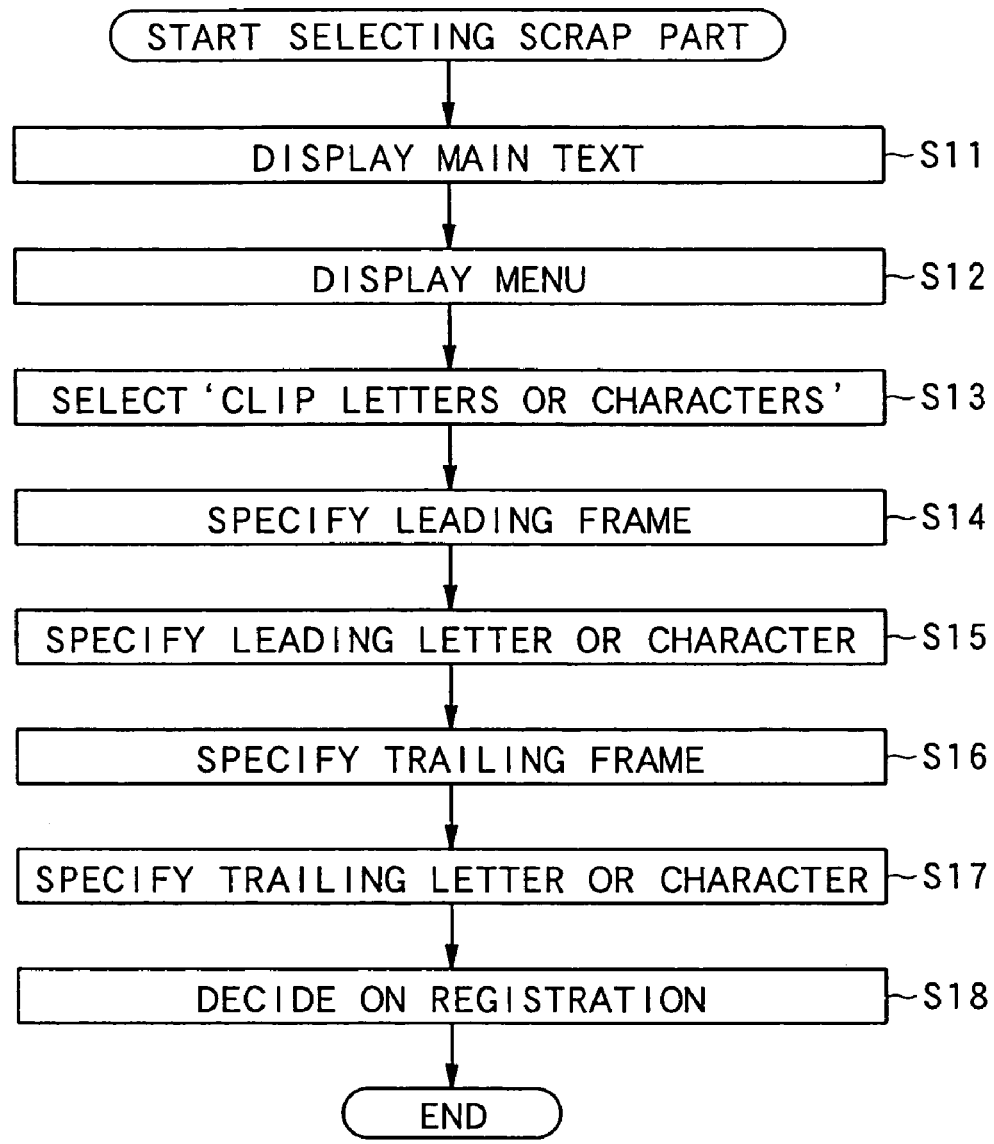
FIG. 28 is a flowchart for illustrating the processing of scrapping.

Reverting to the explanation of the flowchart of FIG. 28, when the leading end frame 270 has moved in a step S14 to a part desired by the user, the leading end letter or character is specified in a step S15. Meanwhile, this movement of the leading end frame 270 is carried out by acting on e.g. the jog dial 79 (FIG. 4) as the input unit 106 (FIG. 5). The position is set by acting on a decision button 81. The operation pertinent to selection of the leading end letter or the trailing end letter, as later explained, is basically the same, that is, the movement is commanded by e.g. the jog dial 79 and a decision is commanded by the decision button 81.

Referring to FIG. 30, when the leading end letter is specified, a letter/character designating frame 271 is demonstrated on the display 71, within the leading end frame 270. The letter/character designating frame 271 is displayed when the first letter or character (position) of the sentence (image) to be scrapped, is specified. The letter/character designating frame is movable in the up-and-down direction and in the left-and-right direction, within the leading end frame 270, subject to the actuation by the user.

When the leading end letter or character is selected (specified), the trailing end frame basically the same frame as the leading end frame) is specified in a step S16. The trailing end letter or character is specified in a step S17 (basically, the same frame as the letter/character designating frame 271 is used and specified). Since the processing in the step S16 and in the step S17 is basically the same as the processing in the step S14 and in the step S15, no detailed explanation is made for avoiding the redundancy.

In the above explanation, the frame for specifying the range of the letters/characters selected is specified, and subsequently the letter/character is selected from within the frame. Alternatively, the letter/character may also be directly selected. However, with the use of the frame for specifying the range of selection, it may possibly be indicated clearly to the user whether the image is in the range of selection or the text is in the range of selection, in case a part to be scrapped is to be selected from a page in which the image and the text co-exist.

In this manner, the part to be scrapped is selected. If the selected part is satisfactory, the user in a step S18 decides on registration on a scrapbook. Meanwhile, in each step, the user is able to revert to the original processing, and to execute the desired step.

The above processing, pertinent to the registration in the scrapbook, is commanded by the user acting on the input unit 105 (FIG. 5). In the user terminal 7, the CPU 101 verifies the substance, indicated by the signals from the input unit 106, and accordingly executes the processing, such as movement of the leading end frame 270, based on data or programs unfolded on the RAM 103.

Figure 31:
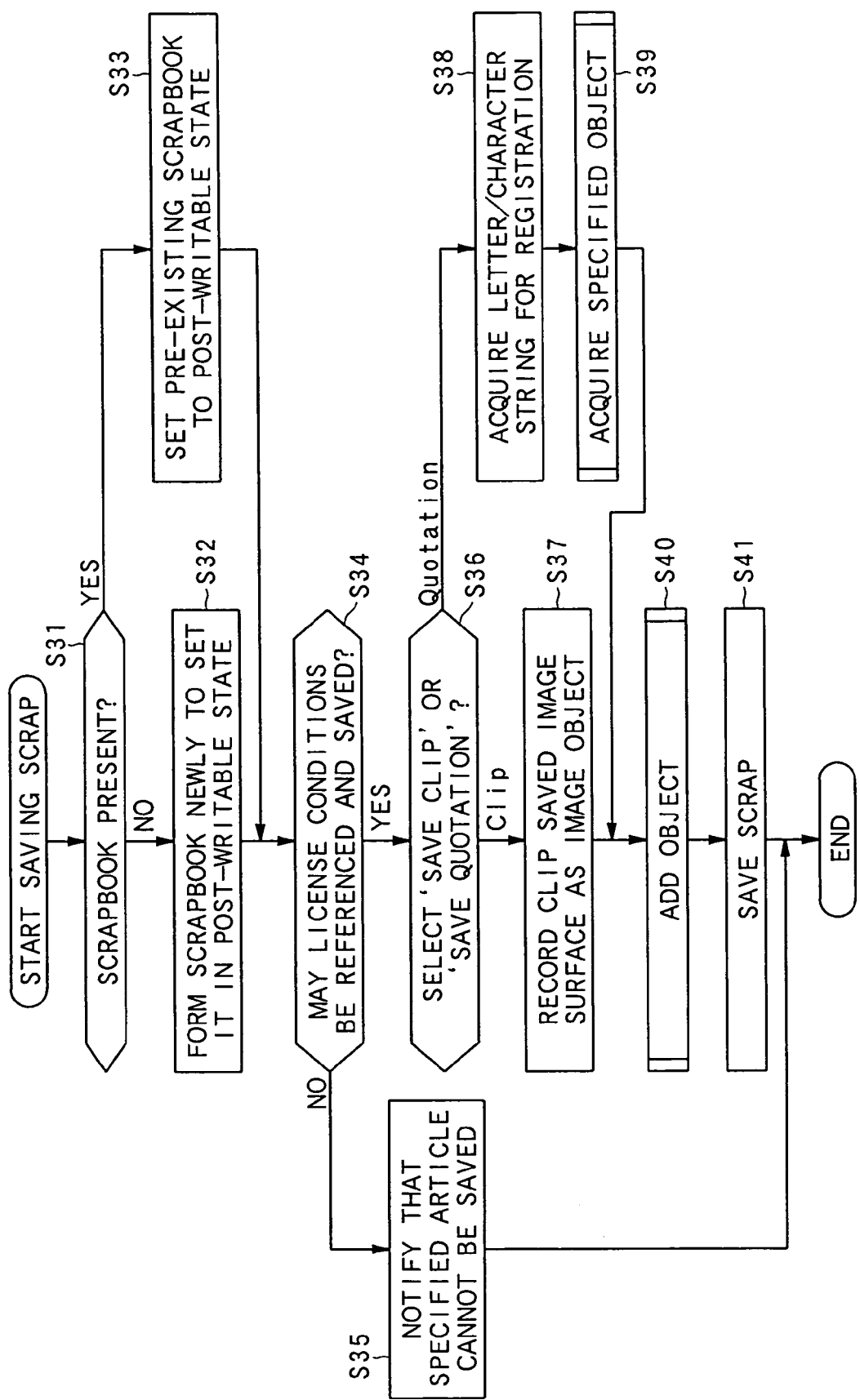
FIG. 31 is a flowchart for illustrating the processing of scrap saving.
Figure 32:
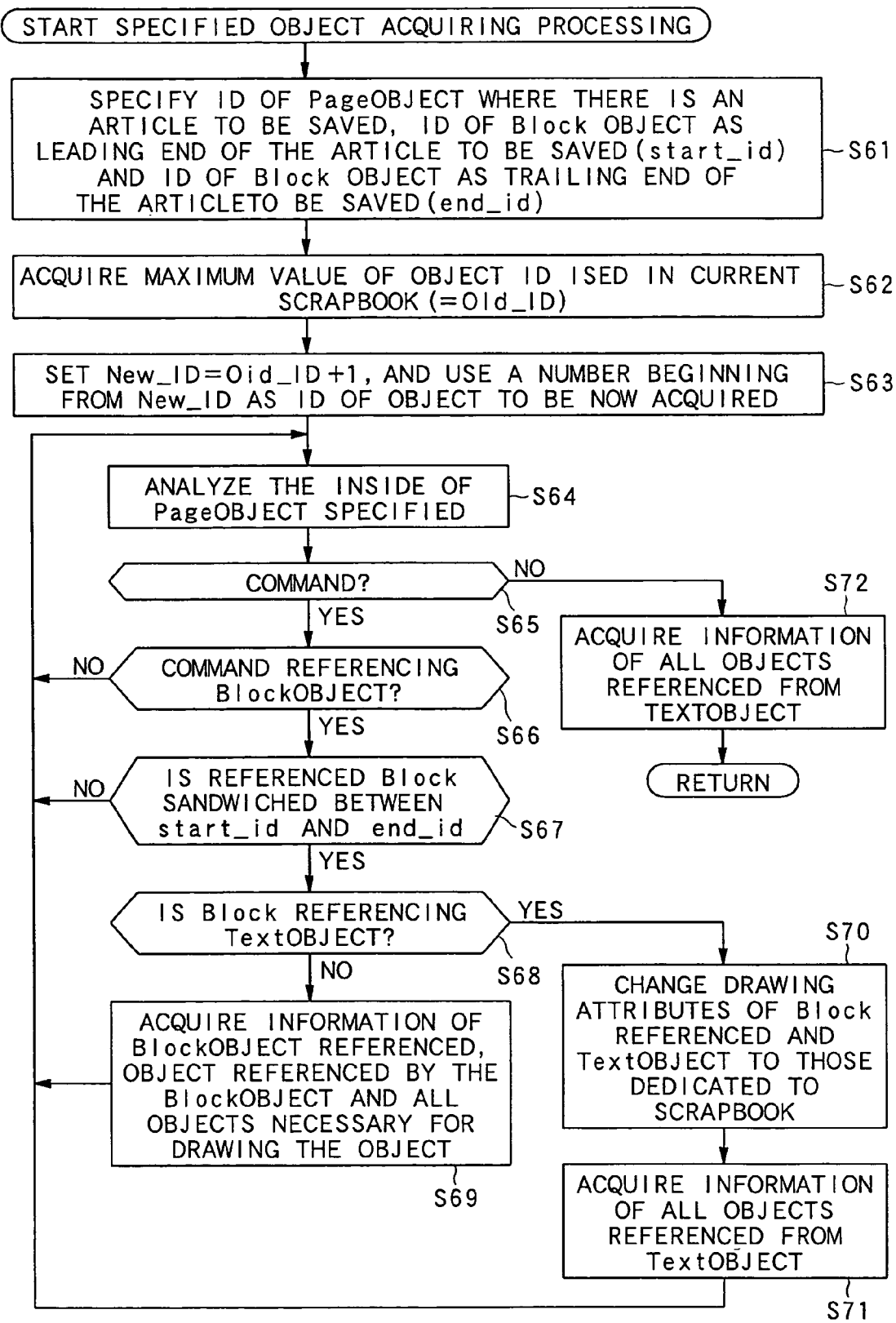
FIG. 32 is a flowchart for illustrating the processing of acquiring an object.
Figure 33:
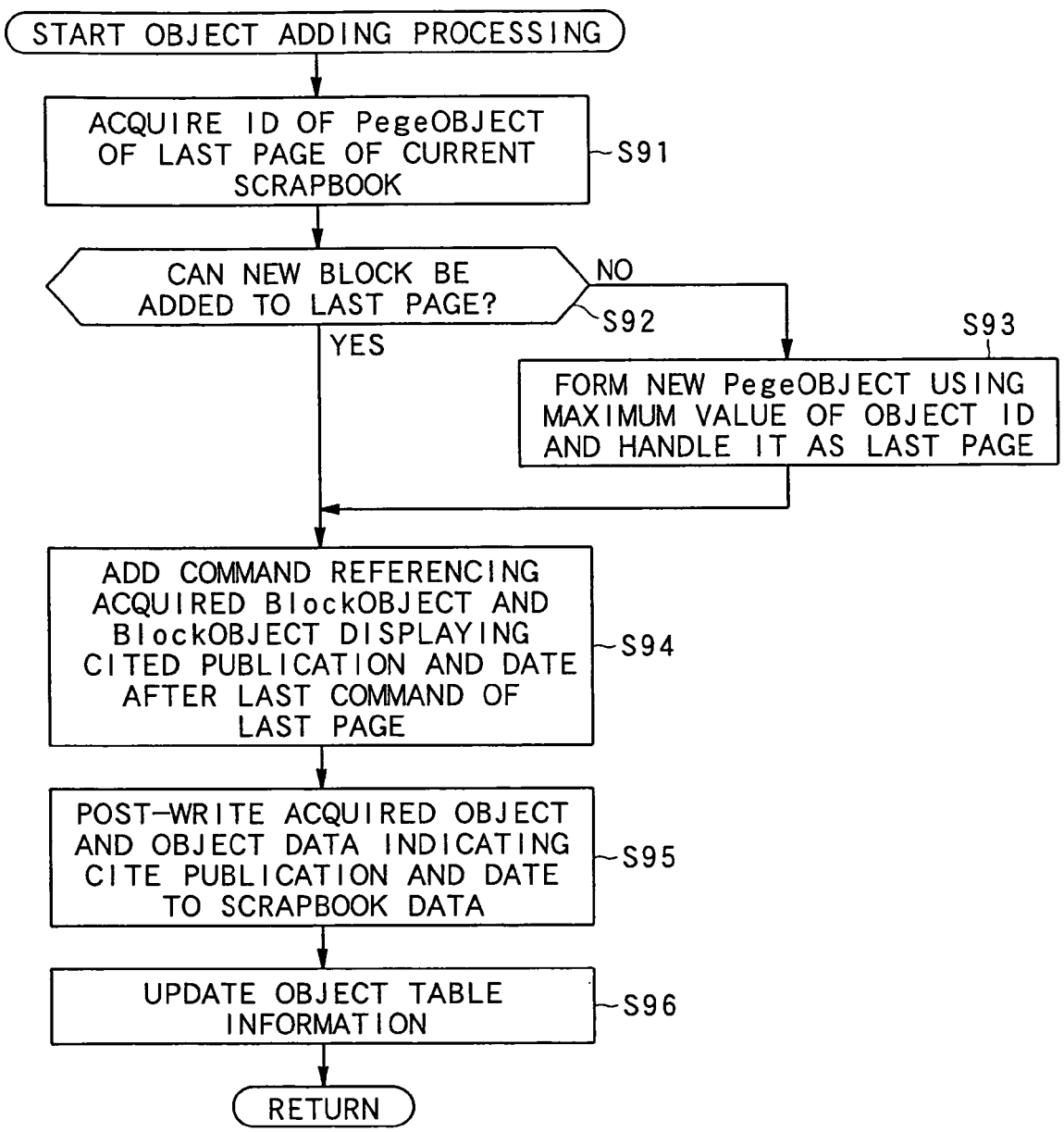
FIG. 33 is a flowchart for illustrating the processing of adding an object.

Referring to the flowchart of FIGS. 31 to 33, the processing carried out on the side of the user terminal 7 in registering in the scrapbook, is now explained. If, in a step S31, registration of a new article (text or image as a part of the contents) in the scrapbook is commanded, it is verified whether or not there is any scrapbook already formulated. For example, the CPU 101 determines whether or not the scrapbook 250, having a structure as shown for example in FIG. 27, has already been stored in the storage unit 107 (FIG. 5).

The scrapbook 250 is set so as to be recorded in a recording medium removable from the user terminal 7. Alternatively, if the recording medium is recordable, the recording medium may be set on the drive 74, and hence the CPU 101 executes the processing of the step S31, as it refers to data recorded on a recording medium as set on the drive 74. The recording medium may also be the package medium 5.

At any rate, if it is verified in the step S31 that there is no scrapbook being formulated, the CPU proceeds to a step S32 and, if otherwise, the CPU proceeds to a step S33. If the CPU has proceeded to the step S32, that is, if it is verified that there is no scrapbook, a scrapbook is newly prepared, and such a state is set in which an article commanded to be newly registered can be entered in a page 1 of the scrapbook.

If the CPU has proceeded to the step S33, that is, if it is verified that there is a scrapbook, such a state is set in which an article commanded to be newly registered can be entered in the last page of the scrapbook verified to be present (a page prescribed by the Pageobject 254 in the case of FIG. 27).

If, in the processing in the step S32 or step S33, such a state is set in which a new article can be entered to the scrapbook, the CPU proceeds to a step S34. In this step S34, it is verified whether or not the article commanded to be registered in the scrapbook is an article allowed for registration (saving). If copying of an article, the saving of which has been commanded, is allowed limitlessly, copyright-related problems may be undesirably be produced.

The contents data state licensing conditions for copying for purchasers, such as allowing for copying only once, limitless copying or copying of only a portion of a page. These licensing conditions are the information contained in e.g. the header information part 181 of FIG. 22, or the information added by the copyright protection processing unit 23 of the data formulating device 2 (FIG. 2). The processing in the step S34 is executed by referencing these licensing conditions.

If, as a result of referencing the license information in the step S34, it is found that the saving is not allowed, the processing transfers to a step S35 and, if otherwise, processing transfers to a step S36.

In the step S35, such a message is demonstrated in the display 71 by means of which the user may recognize that the article commanded for registration in the scrapbook is not allowed for copying and hence cannot be saved. The processing of the flowchart shown in FIG. 31, that is, the processing pertinent to the scrapbook, comes to a close.

In this manner, the article not allowed for copying cannot be saved and hence no subsequent processing is carried out. Thus, the processing in the step S34 may be carried out before the step S31 such that no wasteful processing occurs.

For the same reason, in case the item 'clip letter or character' for carrying out the registration processing in the scrapbook is selected in a step S13 of the flowchart of FIG. 28, and the article (main text) displayed at the time of the selection is verified to indicate copying inhibition, with the processing in the step S34 being executed at this time point, a message advising the user of the fact that the article displayed indicates the impossibility of copying, may be displayed, that is, the processing of the step S35 may be carried out, at this time point.

Stated differently, the processing for the user to recognize that the article selected cannot be scrapped may be carried out at a time point when such fact has been recognized. It is noted that the sequence of the respective steps including the step S34 described above may be interchanged as necessary.

Reverting to the explanation of the flowchart shown in FIG. 31, if, as a result of referencing the license conditions in the step S34, it is determined that the selected article is the article allowed for copying (saving), processing transfers to a step S36. In this step S36, it is verified whether the registration in the scrapbook is the clip saving or quotation saving. The clip saving is the saving what is seen with an eye and the quotation saving is the direct copying of data in a document.

The data saved as a result of selection of clip saving is set so that the data will be displayed on actuation of a button demonstrated on the display 71. The data saved as a result of selection of quotation saving is set so as to be drawn to a standard writing style (the writing style as set in the scrapbook). The clip saving and the quotation saving are used mainly for scrapping an image and mainly for scrapping the text, respectively.

The reason for using these two saving systems is as follows: First, in a text, the processing load for display is rather light, while plural texts may be displayed as a scrap page by one operation on the display 71, such display not being awkward to a viewer.

In an image, the processing for display is rather heavy, such that, if plural pictures are displayed in one page, a not short time tends to elapse until the page is displayed. On the other hand, if plural images are demonstrated on the display 71 simultaneously, each image is of a small size and is likely to be awkward to the viewer. Moreover, the necessity for displaying the image at all times is low, such that it is only necessary for the image to be displayed in case of necessity, that is, when the user has desired to view the image.

Thus, in the present embodiment, the two saving systems are used, and the user may select the desired one of the two systems. Although it is assumed here that the user selects one of the two systems, it may be the user terminal 7, instead of the user, which makes the decision, such that, if it is verified that a picture is selected, or the text is selected, the clip saving or the quotation saving will be selected, respectively.

If, in the method for saving an article, newly commanded to be registered in the step S36, the processing transfers to a step S37 if the saving is determined to be the clip saving. If clip saving is commanded, the so commanded (scrapped) article is saved (recorded) as an image object.

If, in the method for saving an article, newly commanded to be registered in the step S36, the processing transfers to a step S38 if the saving is determined to be the quotation saving. In case the quotation saving is commanded, a letter/character string of the commanded article is acquired. The acquired letter/character string is a letter/character string from the leading end to the trailing end as selected by the user by the processing explained with reference to FIGS. 28 to 30.

When the processing up to the step S37 or the processing up to the step S39 has been carried out, the article specified by the user has been formulated as an object newly added to the scrapbook. Thus, the processing of adding the object is carried out in a step S40. This processing of adding the object in this step S40 is explained later with reference to FIG. 33.

In a step S41, the scrapbook, now containing the newly added object, is recorded (stored) in a recording medium, not shown, as set in the storage unit 107 (FIG. 5) or in the drive 74 (FIG. 5). In this manner, the scrapbook is updated.

Referring to the flowchart of FIG. 32, the processing of acquiring the specified object in the step S39 is explained. In a step S61, three IDs are acquired. The first ID is an ID of a Pageobject pertinent to an article specified to be added to and saved in the scrapbook. For example, referring again to FIG.

25, if a portion of the text prescribed by the Text object 231 is specified as an article for scrapping, the ID of the Pageobject 225 is acquired.

Figure 34:
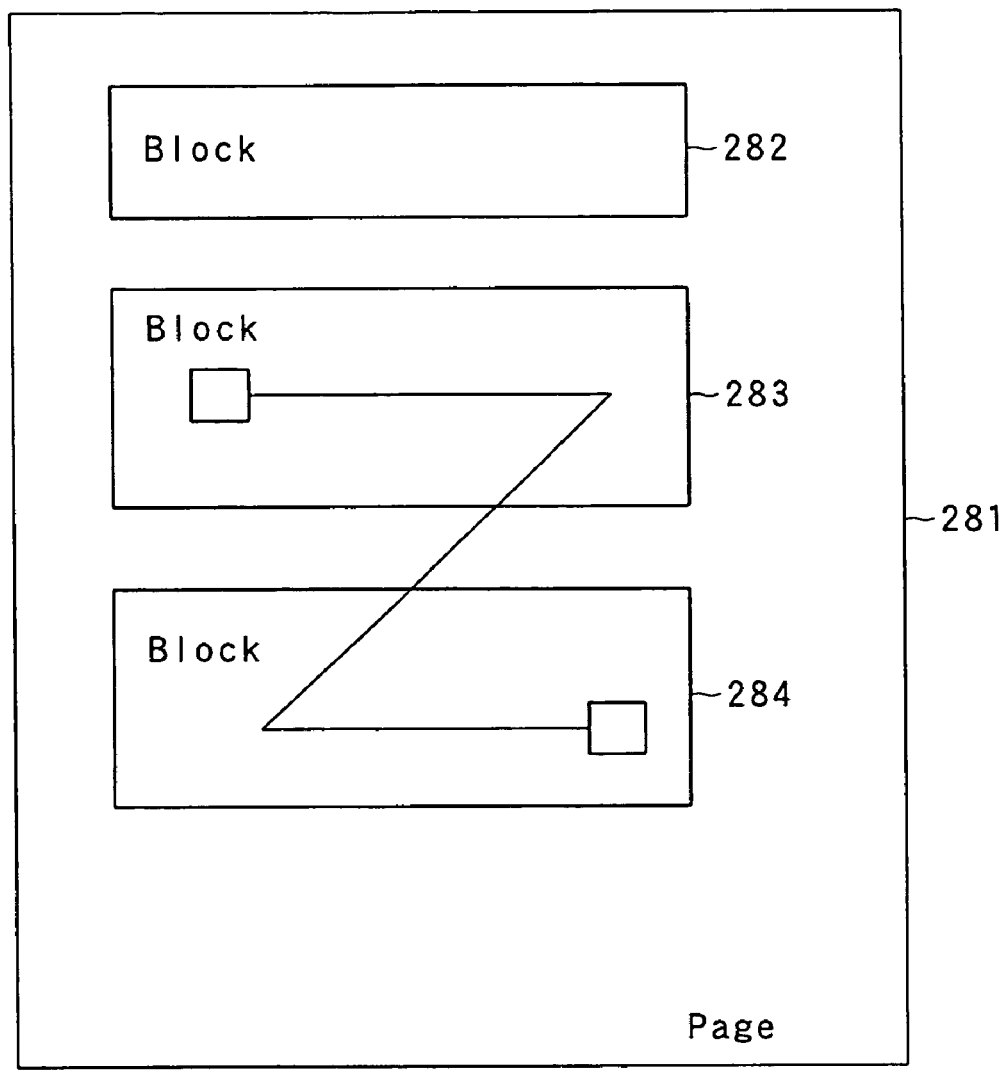
FIG. 34 illustrates the object acquisition.

The second ID is an ID of the Blockobject which is to be the leading end of the article to be saved. This ID is here termed start_id. The third ID is an ID of the Blockobject which is to be the trailing end of the article to be saved. This ID is here termed end_id. Referring to FIG. 34, start_id and end_id are explained. FIG. 34 shows a preset page and a block contained in the page.

A Page 281 is made up by three blocks 282 to 284. If the user selects a preset letter/character in the Block 283 as a leading letter/character (that is, selects a preset letter/character as processing of the steps S14 and S15 of FIG. 28), while selecting another preset letter/character in the Block 284 as a trailing letter/character (that is, selects the preset letter/character as processing of the steps S16 and S17), the string of letters/characters lying therebetween is a range selected as being an article.

As explained with reference to FIGS. 28 to 30, the user is able to shift the frame 270 if within one page, and to select the leading letter or the trailing character if within the frame 270. Thus, it may be an occurrence that the article specified as a scrap is astride plural blocks.

In the case shown in FIG. 34, the ID of the Block object of the Block 283 where there lies the leading end letter/character is start_id, while the ID of the Block object of the Block 284 where there lies the trailing end letter/character, is end_id. If both the leading end letter/character and the trailing end letter/character are present in e.g. the Block 283, although such is not shown in FIG. 34, the ID of the Block object of the Block 283 is set in each of start_id and end_id.

On the other hand, if the Page 281 is formed by solely one Block, such as Block 282, both the leading end letter/character and the trailing end letter/character are necessarily contained in the block, and hence start_id is the same as end_id.

These three IDs are acquired in the step S61. If the IDs have been acquired, processing transfers to a step S62. In this step S62, the maximum value of the object ID, used in the scrapbook at the time point, is acquired. This maximum value of the object ID, thus acquired, is here set as Old_ID.

Referring again to FIG. 25, assuming that the codes attached to the respective objects (221 to 234) shown in FIG. 25 are the IDs of the objects, and the book configured as shown in FIG. 25 is the scrapbook, it is the Image object 234, among the objects of the scrapbook, which carries the maximum value. Hence, Old_ID is set to "234" in this case.

Meanwhile, the reason the ID having the maximum value of the scrapbook at the time point is detected is that, in newly adding (saving) an object, the ID of the maximum value must not be the same as the ID carried by the newly added object. Thus, in a step S62, the ID given to the, new object is set. This setting is Old_ID incremented by unity (1). This ID is set as being new_ID.

If an article is selected, plural objects are added. For example, if an image by the Image data 234 has been selected as an article to be scrapped, as explained with reference to FIG. 26, four objects are added to the scrapbook. It is not clear, at a time point of the step S63, how many objects are added newly. Thus, the New_ID is an ID given to one of newly added objects, and numbers beginning from the New_ID are sequentially given to the added other objects.

If New_id is set in the step S63, processing transfers to a step S64. In this step S64, analysis of the specified Pageobject (Pageobject corresponding to the first ID acquired by the step S61) begins. The data stated in the Pageobject are analyzed row by row (each processing unit).

In a step S65, it is verified whether or not data stated in the row being analyzed is a command. Meanwhile, in this step S65, it is simultaneously verified whether or not there is any command not as yet analyzed in the Pageobject, that is, whether or not current row is the last row of data stated in the Pageobject.

If it is determined in the step S65 that the data being analyzed is a command, processing reverts to the step S64 to repeat the processing as from this step. If it is verified in the step S66 that the command is a command instructing the referencing to the block object, processing transfers to the step S65. In this step S65, it is verified whether or not the ID of the Block object referenced by the command being analyzed is an ID of a number sandwiched between the start_id and the end_id.

Referring again FIG. 34, it is assumed that the codes given to the Blocks 282 to 284 are the IDs of the Block objects corresponding to the Blocks 282 to 284.

In the case shown in FIG. 34, there is a command for referencing the block object corresponding to the Blocks 282 to 284, among the commands stated in the Pageobjects corresponding to the Page 281.

If the command being analyzed is such a command instructing the referencing to the Block object corresponding to the Block 282, the ID of the Block object is "282". Since start_id in this case is 283, which is younger than the start_id, the result of judgment in a step S67 is NO. That is, since the Block object is a Block object irrelevant to an article to be scrapped, there is no necessity for performing the processing as from the step S67. Thus, processing is returned to the step S64.

If conversely the command being analyzed instructs the referencing to the Block object corresponding to the Block 283, the ID of the Block object is "283". On the other hand, if the command being analyzed instructs the referencing to the Block object corresponding to the Block 284, the ID of the Block object is "284".

In such case, start_id is 283 and end_id is 284, and hence the ID "283" and the ID "284" are sandwiched between start_id is 283 and end_id is 284. Since the equal relationship is valid in this case, the result of decision is YES. That is, since the Block object is relevant to the article to be scrapped, the processing as from the step S67 is carried out.

If, in the step S67, the ID of the Blockobject, referenced by the command to be analyzed, is determined to be not the ID of the number sandwiched between start_id is 283 and end_id, processing is returned to the step S64. The subject of analysis at this time is data stated in the next row (data of the next processing unit).

On the other hand, if, in the step S67, the ID of the Block object, referenced by the command being analyzed is determined to be an ID of the number sandwiched between start_id and end_id, in other words, if the ID is determined to be an ID of the Block object of the block containing the article being scrapped, processing transfers to a step S68 to verify whether or not it is the Text object that is being referenced by the Block object.

For example, there may be such a case where it is the text that is displayed in the Block 283 but it is an image that is displayed in the Block 284. It is therefore determined in the step S68 whether or not it is the Text object that is being referenced by the Block object being processed. If it is determined in the step S68 that it is not the Text object that is being referenced by the Block object being processed, processing transfers to a step S69.

In the step S69, the information on the Block object being processed, the object being referenced by the Block object and the information on all of the objects needed for drawing (processing) the objects, are acquired. The processing in this step S69 is now explained, again with reference to FIG. 25. Such a case is scrutinized in which the Block object 229 in the Pageobject 225, out of the book having a structure shown in FIG. 25, is the subject of the processing.

The objects referenced by the Block object 229 being processed are the Imageobject 233 and the Blockattribute object 230. The totality of the objects, required for drawing the objects, are the Image data object 234 for drawing an Image of the Imageobject 233.

Thus, in the present case, the information acquired in the step S69 is the information pertinent to the Blockobject 229, Block attribute object 230, Image object 233 and the Image data objects 234. In this manner, the information on the needed objects is sequentially acquired.

Reverting to the explanation of the flowchart of FIG. 32, if it is verified in the step S68 that the Block object as the subject of the processing is referencing the Text object, processing transfers to a step S70. In this step S70, the drawing attributes of the Blockobject and the Textobject being referenced (processed) are changed to those dedicated to a scrapbook.

In the scrapbook, various articles tend to be scrapped, as described above. If the article is assumed to be formed solely by the text, there may be a variety of texts, such as the text of vertical writing style, text of the horizontal writing style, fonts of the letters or characters, and colors of the letters or characters. If these variable styles of articles are directly bonded to the sole scrapbook, the scrapbook is awkward to view.

Thus, the articles, bonded to the scrapbook, need to be of drawing attributes exhibiting unity for ease in viewing. Specifically, the writing style is unified to the horizontal (or vertical) writing style and the fonts as well as colors are also unified. In a step S71, the information of all objects, referenced by the Text object, is acquired.

In this manner, the information pertinent to the objects commanded to be registered in the scrapbook is acquired. By repetition of the processing as from the step S64 to the step S71, the contents of the Pageobject are sequentially analyzed, and the information of e.g. the Block object pertaining to the scrapped article is acquired. When the analysis of the totality of the lines in the Pageobject has come to a close, it is determined in the step S65 there is no unanalyzed command in the Pageobject. Hence, processing transfers to a step S72.

In the step S72, an object for displaying the cited publication (the information for identifying or showing the publication) and the date is formed. The reason for formulating an object for displaying the cited publication and the date in this step S72 is to prevent illicit copying and to prevent the an illicit copy from being circulated over the Internet as well as to keep e.g. the name of the copyright owner unclear even though the illicit copy is circulated.

The objects, thus formulated, are added to the scrapbook in the step S40 (FIG. 31). Meanwhile, the numbers as set in the step S63 for commencing at the New_ID are allocated as IDs to the objects, formulated as described above.

FIG. 33 depicts a flowchart for illustrating the processing of adding objects in the step S40 (FIG. 31). In a step S91, the ID of the Pageobject corresponding to the last page of the scrapbook at the time point is acquired. For example, if there exists at such time point the scrapbook 250 of the structure shown in FIG. 27, the Pageobject corresponding to the last page is the Pageobject 254, and the ID of the Pageobject is acquired as the processing of the step S91.

When the ID of the Pageobject is acquired in the step S91, processing transfers to a step S92, where it is determined whether or not a new block may be added to the page (last page) where an image is drawn by the Pageobject corresponding to the acquired ID. This decision may be given by setting a condition that e.g. only three blocks are allowed to be present in one page and by verifying whether or not the condition is met. Or, the decision may be given by setting the size of the image-drawing area for one page and by verifying whether or not a new block area may be secured in the image-drawing area.

Or, a decision may be given by other suitable methods. Although any of the suitable methods may be used, plural objects may be limitlessly added to the Pageobject, as mentioned previously, so that it is necessary to make some setting such that only a preset number of blocks will be registered in one Pageobject. If it is verified in the step S92 that no new block can be added to the last block, processing transfers to a step S93 to formulate a page in which to add a new block.

That is, when the program has proceeded to the step S93, a Pageobject is created anew, and an ID for identifying the object is allocated to the newly formulated Pageobject. The so allocated ID is a number equal to the largest value of the ID, forming the scrapbook, incremented by one. The Pageobject provided with such number as the ID, is handled as the last page in the scrapbook in the processing as from a step S94.

If conversely it is determined in the step S92 that a new block can be added to the last page, no new page needs to be formulated, so that the processing of the step S93 is omitted and processing transfers to the step S94. In this step S94, such a command for causing the Blockobject acquired, and an object, formulated as the processing of the step S72 (FIG. 32) for displaying the cited publication and the date, to be referenced, is appended after the last command of the Pageobject corresponding to the last page.

In a step S95, the acquired object and data of the object for displaying the cited publication and the date, are added to the data of the scrapbook. Since the object has been added, in this manner, the data on the so added object (object table) is updated in a step S96.

The object is added in the manner described above. Since such processing is carried out in the user terminal 7, the user is able to formulate a scrapbook formed by desired articles.

Thus, with an electronic book, a processing corresponding to a processing which would be painstaking with a paper book, can be carried out with an extremely simple operation. However, it may be conjectured that, while the user is able to roughly reckon e.g. the number of days consumed in reading through the paper book by merely checking the thickness of the book, such is difficult with the electronic book, in which thickness of the book is not visible.

Stated differently, the user may fold over pages to comprehend e.g. the letter size and the number of pages to estimate the number of days needed in reading through the book. On the other hand, the user is able to comprehend, through the sense of the number of pages, where the word or letter he/she desires to check is stated.

However, with an electronic book, the letter can be displayed to an enlarged size, which is not possible with the paper book. Consequently, the number of pages of the same book is changed, depending on the ratio of multiplication. Thus, with an electronic book, it is difficult to fold over pages (by continuing to act on a button) to comprehend the letter size or the number of days for the user to read through the book, while it is also difficult, in case the electronic book is a dictionary, to roughly comprehend the number of pages.

Specifically, with a dictionary of a paper medium, a word appearing on page 10 always appears (by printing) on page 10, a user desirous to check for the word may get a feeling that the word of interest is present roughly on page 10 and may resort to the sense that the word roughly appears on page 10 when he/she desires to check the same word again subsequently.

However, in the electronic book, in which the ratio of multiplication is liable to be changed, a word of interest, found on page 10, is not necessarily found on page 10 next time. In addition, since the paper thickness of 10 pages or the page number feeling which depends on the page fold-over rate may not be acquired, it may be more difficult to consult the dictionary for a word.

If the feeing innate to a paper book, to which the user was accustomed for long, may be acquired in a similar manner in the case of an electronic book, the electronic book as well as the user terminal 7 may be accepted more widely.

Thus, in the present embodiment, the concept of an anchor is introduced to realize the feeling obtained with a user by roughly folding over pages in the case of an electronic book as in the case of a paper book. If this is realized, not only the outlook of the market for electronic books is more promising, but also the concept of the page in an electronic book can be more definite.

In an electronic book, the page is changed due e.g. to the enlarging of the size of the letters/characters. Moreover, in the present embodiment, what is stated in the Pageobject is one page, so that the length of the page is not fixed, but is variable. Additionally, what is displayed at a time on the display 71 of the user terminal 7 may not be said to be one page.

In case what is demonstrated on the display 71 is e.g. a novel, there are occasions where scrolling is made line-by-line, that is, the sentence displayed on the line 2 is scrolled to a line 1 and other lines are scrolled line-by-line in association with the scrolling of the line 2. In such case, the sense of the page is not obtained, while it may be difficult to comprehend where in the entire text there exists the page partition.

In this consideration, the concept of a page in an electronic book may be said to be indefinite. This gives demerits as well as merits. However, it is felt that, by introducing the concept of the anchor, the concept of the page may be definite, while the problems ascribable to the indefinite page concept may simultaneously be resolved.

Figure 35:
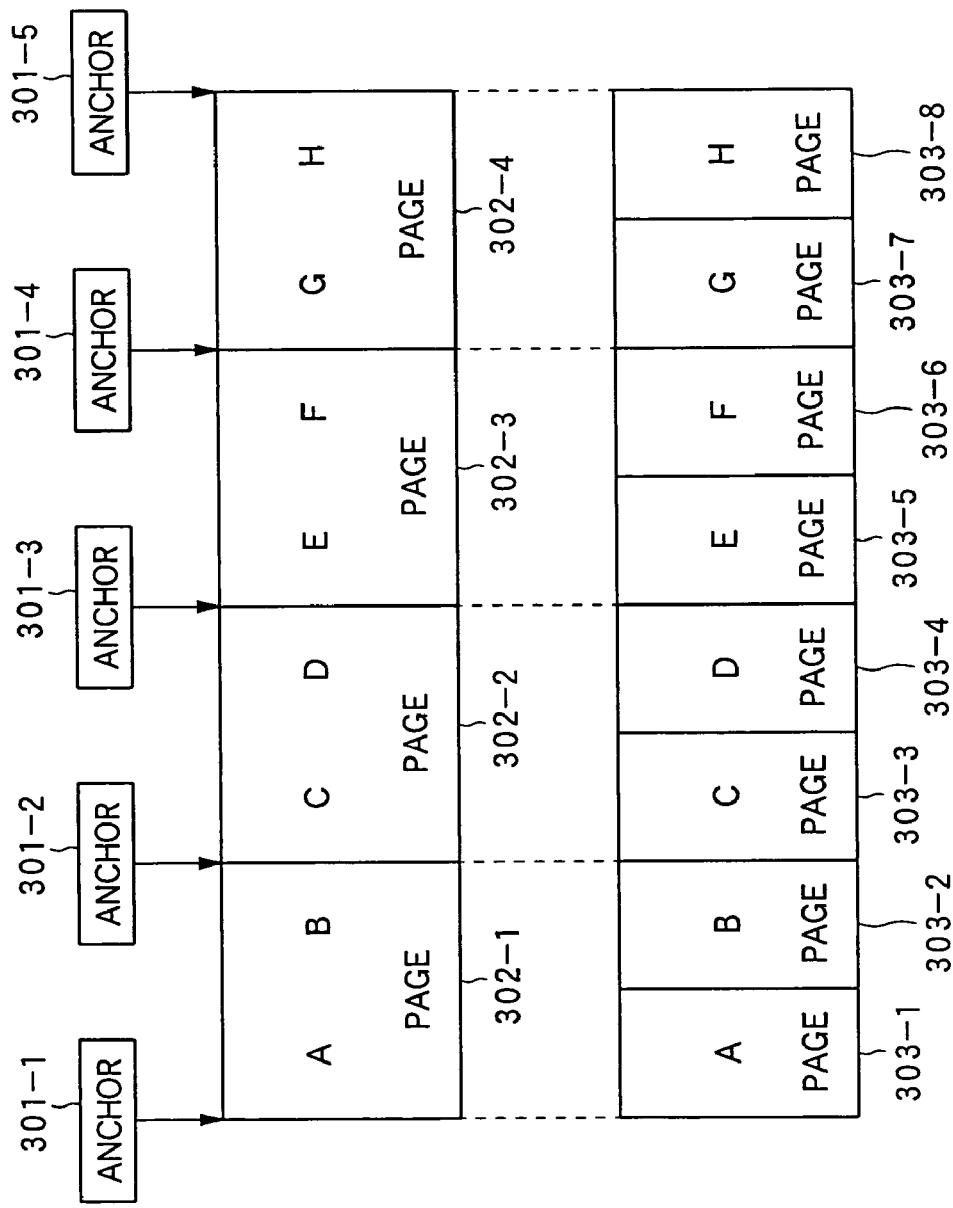
FIG. 35 illustrates an anchor.

The anchor, having such merit, is now explained. FIG. 35 illustrates the relationship between the anchor and the pages. It is assumed that, in FIG. 35, pages 302-1 to 302-4 represent the data volume demonstrated on the display 71 at a time when the 100% display is indicated. Stated differently, the pages 302-1 to 302-4 are assumed to be each a page drawn in the virtual image-drawing area 152-1 (FIG. 10) and coincident in size to the displayable area 151, as shown in an upper part drawing of FIG. 10.

If a command for enlarging the size of the letter/character is issued to the pages 302-1 to 302-4 (four pages) or if the enlargement ratio is two (200%), the display is changed to an 8-page structure for pages 303-1 to 303-8, as shown in a lower part drawing of FIG. 35 that is, when the letter/character size is doubled, the number of pages is also doubled.

The state of the pages 303-1 to 303-8 is that shown as shown in a lower part drawing of FIG. 10. The respective pages 303-1 to 303-8 are each of the same size as the displayable area 151, while two pages, namely the pages 303-1 and 303-2 are drawn in for example the virtual image-drawing area 152-2.

If, when the user is browsing with a 100% display, the page feed is carried out, the pages may be browsed sequentially, such that, for example, the page 303-2 is displayed next to the page 301-1 and the page 303-3 is displayed next to the page 301-2. The user acquires the feeling that, for shifting from the page 302-1 to 302-4, movement may be made to a page three pages ahead.

Stated differently, when movement is to be made from a letter "A" (of course, the letter is meant to include an article or a word) displayed on the page 302-1 to a letter (article) "H" displayed on the page 302-4, the user sensorily comprehends that the target letter "H" is present on a page three pages (pages 302-2, 302-3 and 302-4) ahead the page 302-1. The meaning of the sensory comprehension is e.g. the time the operator is acting on e.g. a page feed button, such as feed button 57 of FIG. 4.

Or, if a bar, for example, is displayed on the display 71 for indicating the approximate position of the displayed page in the entire pages, the user may grasp the approximate position by referring to the bar position. The comprehension of the page location by recognizing the bar location also may be comprised within the expression of the sensory comprehension.

It is assumed that the same thing is carried out when browsing is made with the 200% display. That is, if movement is made from the letter "A" displayed on the page 303-1 to letter "H" displayed on the page 303-8, and the page moves to a page three pages ahead, with the same sensory comprehension as that in 100% display, movement is to the page 303-4, but not to the targeted page 303-8.

The reason is that, for each multiplication factor, movement processing is carried out with the number of pages for the prevailing multiplication factor. In more detail, if, with 100% display, page feed is carried out, page feed occurs in the order of the page 302-1→page 302-2→page 302-3→page 302-4. If, with 100% display, page feed is carried out, page feed occurs in the order of the page 303-1→page 303-2→page 303-3→page 303-4→303-5→page 303-6→page 303-7→page 303-8.

Referring to FIG. 35, anchors 301-1 to 301-5 are entered at the leading ends of the pages when display is made with 100% display. Specifically, the anchors 301-1, 301-2, 301-3 and 301-4 are entered at the leading ends of the pages 302-1, 302-2, 302-3 and 302-4, respectively.

The anchor, as the information indicating the leading end of each page, is used in executing the page feed processing. If, with 100% display, with the page 303-1 being demonstrated, the page feed processing is commanded, the anchor information is used to execute the page feed processing. That is, since the page 303-1 is being displayed, the anchor 303-2 is read out and the page 302-2 specified by the anchor 301-2 is demonstrated as being the destination for page-feed.

If the button keeps on to be pressed such that the page feed command is continued, the information of the anchor 301-3 is read out and the page 302-3 indicated by the anchor 301-3 is displayed as being the next destination for page-feed. This page-feed processing, employing the anchor information, is carried out repeatedly as long as the page feed is commanded.

The case in which 200% display is made is now explained. If the page 303-1 is demonstrated on the display 71, and the page feed is commanded, the information of the anchor 301-2 is read out. The anchor 301-2 is the information indicating the leading end of the page 303-3. In this manner, the anchor information is the information not dependent on the multiplication factor, that is, the information which depends on the 100% display as the reference display and which does not depend on the other multiplication factors.

If the button keeps on to be pressed such that the page feed command is continued, the information of the anchor 301-3 is read out and the page 303-5 pointed out by the anchor 301-3 is displayed as being the destination of the next page feed.

Thus, in such case, page feed is by two pages at a time. The page-feed processing, employing the anchor information, is carried out repeatedly as long as the page feed is being commanded.

In case the page-feed, employing the anchor information, is carried out, it is sufficient if the user commands movement over three pages, if the user desires to move from the letter "A" displayed on the page 303-1 to the letter "H" displayed on the page 303-8. Thus, the user may perform the page feed with the same feeling as in 100% display, whereby the movement may be made to the same page, so that processing may be carried out with the same sense, without dependency on the multiplication factor.

In the absence of the anchor information, the electronic book may be read (handled). However, in the presence of the anchor information, it may be comprehended with which number of pages the contents of the electronic book of interest are expressed. Moreover, the pages may be moved linearly without dependency upon the size of the Pageobject. That is, the sensorial handling, possible with the paper book, may be provided with the electronic book.

Meanwhile, if, with the 100%. display, as explained with reference to FIG. 35, it is one page that is demonstrated at a time on the display 71, and such one page is the one page prescribed in the Pageobject, in other words, the displayable area 151 and the virtual image-drawing area 152-1 are of the same size, as indicated in the upper side drawing of FIG. 10, it may be efficacious if the page feed is carried out as described above.

However, if what is demonstrated at a time on the display 71 is expressed as being one page, there are occasions where the page demonstrated corresponds to 100 pages. Such setting is possible. Thus, there are desirably provided plural anchor information in the page defined by one Pageobject and, if the page demonstrated corresponds to 100 pages, page feed is desirably by 100 pages, if such is possible.

Figure 36:
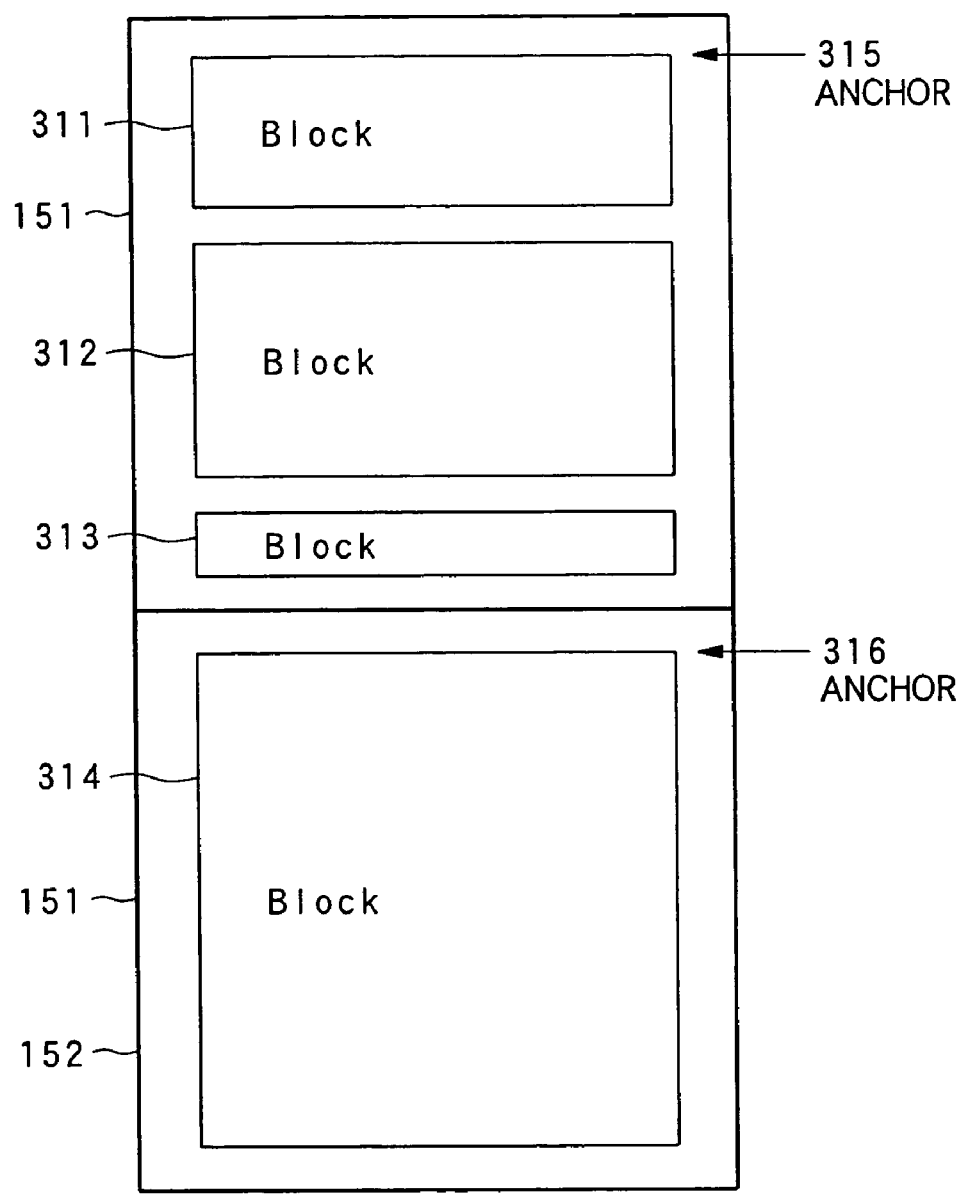
FIG. 36 illustrates block fractionation.
Figure 37:
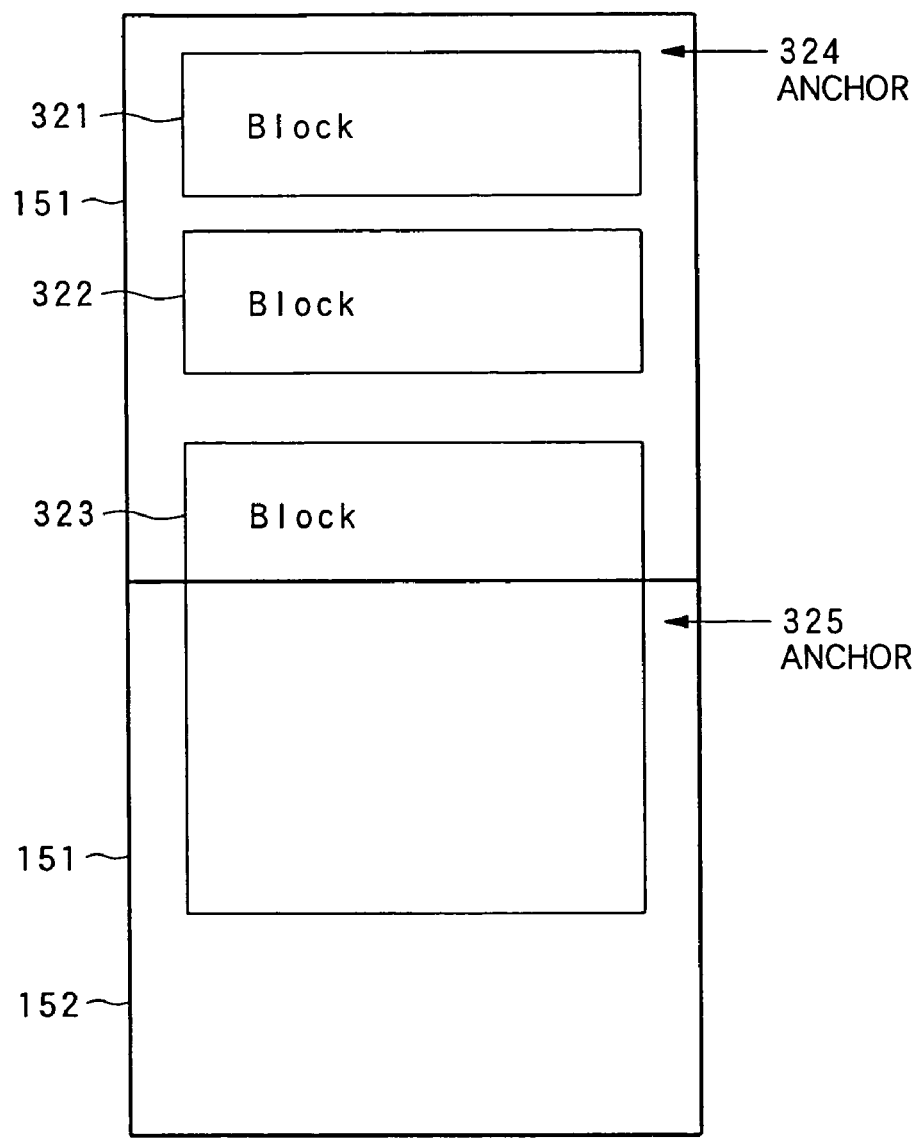
FIG. 37 illustrates block fractionation.

Referring to FIGS. 36 and 37, the anchor is further explained. In FIGS. 36 and 37, the virtual image-drawing are 152 is made up by two displayable areas 151. In FIGS. 36 and 37, the two displayable areas 151 are arrayed vertically with respective one sides contacting with each other, for convenience in illustration. In the example shown in FIG. 36, there are four blocks, namely Blocks 311 to 314, in the virtual image-drawing are 152. Stated differently, there are positively provided areas defined by the four objects in the page defined by the Pageobject.

In FIG. 36, the Blocks 311 to 313 are included in the displayable area 151, shown on the upper part drawing, while the Block 314 is included in the displayable area 151, shown on the lower part drawing. If the contents displayed in the block are an image, such display in which the image is severed partway is not desirable. Thus, control is managed so that the entire area in the block will be contained in the displayable area 151.

The state shown in FIG. 36 is such a one in which the virtual image-drawing are 152 is divided between a Blockobject, corresponding to the Block 313, referenced from the Pageobject, and a Blockobject, corresponding to the Block 314.

In the status shown in FIG. 37, the Blocks 321 and 322 are included in the upper displayable area 151, while the Block 323 is included in the displayable area 152, shown in both the upper and lower parts. That is, the Block 323 is fractionated. Such a state may occur in case the contents shown in the Block 323 are a text. In the state shown in FIG. 37, the virtual image-drawing area 152 is fractionated partway in the Blockobject referencing the Textobject.

Thus, the fractionation may occur between different Blocks or within the same Block. In the case shown in FIG. 36, an anchor 315 is entered at a Block 311, and an anchor 316 is entered at a Block 314. In similar manner, in the case shown in FIG. 37, an anchor 324 is entered at a Block 321, and an anchor 325 is entered partway in a Block 323.

By entering the anchors in this manner, the number of anchors is the same, no matter whether fractionation occurs between different Blocks or partway in the same anchor, and hence it becomes possible to equate the apparent number of pages, herein two pages.

In the states shown in FIGS. 36 and 37, each Page object has two anchor information. Thus, one Pageobject has plural anchor information. Moreover, it is possible for the anchor information to specify the present position in the Block, rather than indicating the leading position of a preset Block.

Figure 38:
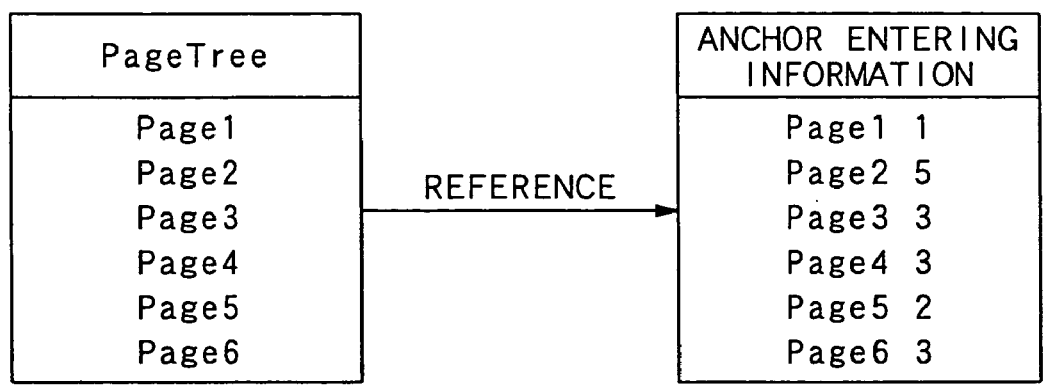
FIG. 38 illustrates the anchoring information.

FIG. 38 illustrates the relationship between the anchor information and the information stated in the PageTree object when the above is taken into consideration. As shown in FIG. 38, the PageTree object states the information on the Pageobject it references. In the embodiment shown in FIG. 38, the PageTree object references the Pageobjects 1 to 6 (Pages 1 to 6). As the anchor entering information, for such case, in the embodiment shown in FIG. 38, it is 1, 5, 3, 3, 2 and 3 for the Pages 1 to 6, respectively.

These numerical figures denote how many anchor information a page in question has, that is, how many anchors have been entered in the page in question. For example, one anchor is entered in Page 1 and five anchors are entered in the Page 2.

Since the PageTree object plays the role of indicating the forward-backward relationship or the compactness of each page, it is managed how many virtual pages (pages fractionated by the anchors) are owned by the respective pages supervised by the PageTree object. That is, the anchor entering information shown in FIG. 38 is supervised. By so doing, linear page movement becomes possible even in case of moving over pages.

By cumulatively converting the number of pages, fractionated by the anchors, it is possible to find the total number of the virtual pages of the electronic book. This total number of the virtual pages may be said to be the number of pages of the electronic book it is desired to have the user comprehend as being the number of pages of the electronic book. For example, in the embodiment shown in FIG. 38, 17 (=1+5+3+3+2+3) pages, from the anchor entering information, is the number of pages it is desired to have the user comprehend as being the number of pages of the electronic book, and is the number of pages in case of linear page movement.

Figure 39:
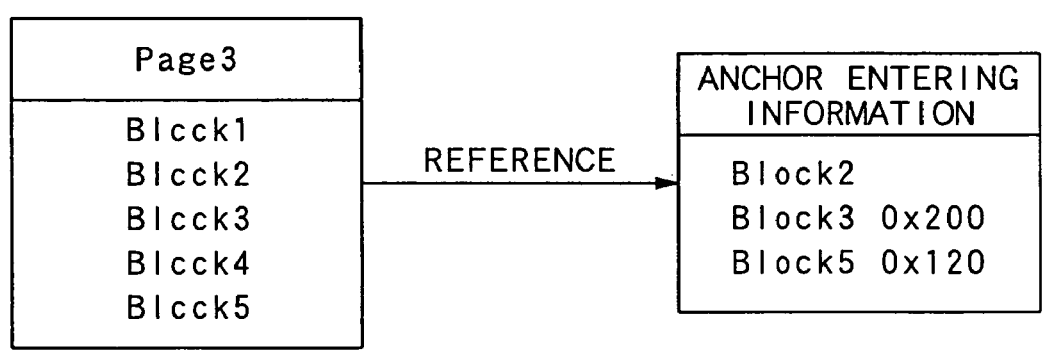
FIG. 39 illustrates the anchoring information.

While the PageTree object refers to the anchor entering information, shown in FIG. 38, the Pageobject, referred to by the PageTree object, refers to the anchor entering information, shown in FIG. 39. First, in the embodiment, shown in FIG. 39, the Page 3 (Pageobject) is configured to contain the Blocks 1 to 5, that is, to refer to the Blockobject corresponding to the Blocks 1 to 5.

In the anchor entering information, referred to by the Page 3, there are included three anchor entering information, as shown in FIG. 39. The three anchor entering information, present in this Page 3, may also be confirmed from the statement in the anchor entering information, referred to by the PageTree object shown in FIG. 38.

The first anchor entering information indicates that the anchor has been entered in the Block 2. In this case, the anchor is entered in a leading part of the Block 2. The second anchor entering information indicates that the anchor has been entered in the "Block 3 0x200". In this case, the anchor is entered in a location indicated by "0x200" within the Block 3. This "0x200" may be a value specifying a preset coordinate represented by the X-Y coordinate system or the number of bytes indicating the letter in the page where fractionation occurs.

The third anchor entering information indicates that the anchor has been entered in the "Block5 0x200". In this case, the anchor is entered in a location indicated by "0x120" within the Block 5.

In this manner, there is provided the anchor entering information for indicating the position of fractionation in the page. Since the Pageobject supervises what information is stated in the Page, the Pageobject is caused to supervise at which Block in the Page the virtual page is fractionated. That is, the Pageobject is caused to supervise the anchor entering information shown in FIG. 39. In case the fractionation occurs in a Block referencing the Text, the Pageobject specifies, with e.g. the number of bytes, in which letter in the Text the fractionation occurs. By this statement, it may be seen from which position in the page the drawing is to occur.

The information pertinent to the anchors is not contained in data supplied from the publishing company 1 (FIG. 1) to the data formulating device 2. Thus, the anchor information is the data added by the data formulating device 2. Billing may be made by adding data not contained in the data supplied from the publishing company 1. Furthermore, such data addition enables the electronic book to be differentiated from the electronic book published by other companies.

The timing for addition of the anchor information is the timing when the processing by the data converter 22 (FIG. 2) is carried out. That is, the anchor information is the information that is newly added in preparing distribution data to the user.

Although it is assumed for explanation sake that the anchor information is not contained in source data supplied from the publishing company 1 and is illustrative of the information added by the data formulating device 2, it is noted that the information other than the anchor information may similarly be added by the data formulating device 2.

Figure 40:
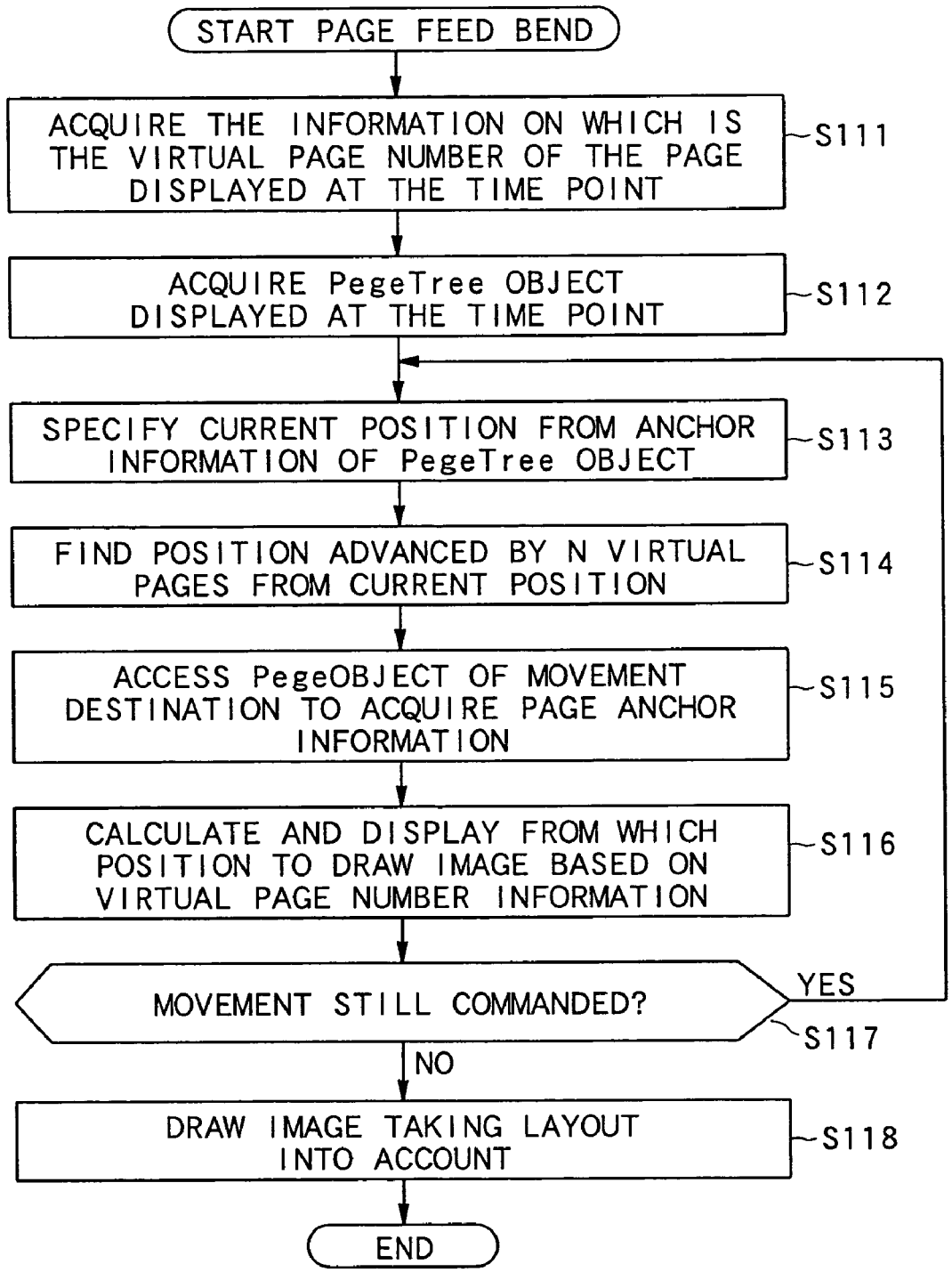
FIG. 40 is a flowchart for page feed processing.

Referring to the flowchart of FIG. 40, the processing carried out in the user terminal 7 when the page feed is commanded is explained. When the page feed is commanded, the information of the concept, termed the anchor, having the above feature, is used. It is when the feed button 75 (77) or the return button 76 (78) (FIG. 4) as the input device 106 (FIG. 5) is actuated, and the CPU 101 (FIG. 5) has verified that these buttons have been actuated, that the processing of the flowchart shown in FIG. 40 commences.

At a time point the button is actuated, in a step S111, the information as to which number virtual page is the page demonstrated on the display 71 is acquired. Referring again to FIG. 37, if, at a time point when the button is actuated, the page demonstrated on the display 71 is the page demonstrating e.g. the blocks 321 to 323, it is determined that the first virtual page is displayed, and the information of the first page is acquired. In the state shown in FIG. 37, the first virtual page is made up of two virtual pages, with an upper part being a page 1 and a lower page being a page 2.

In a step S112, the PageTree object, demonstrated at the time point, is acquired. For this acquisition, the information acquired in the step S111 is used. In case the PageTree object is acquired by this processing in the step S112, the current position is specified from the anchor information of the Page Tree object. By the processing up to this step S113, the information shown in FIG. 38 is acquired.

That is, the total number of pages is determined from the anchor entering information referred to by the PageTree object. On the other hand, by the processing of the step S111, the information on the page at the time point has been acquired, and hence it becomes possible to determine the approximate position of the page at the time point in the pages in their entirety. Thus, the current position can be determined.

In a step S114, the position advanced by N virtual pages from the current position is found. By the position advanced by N virtual pages from the current position is meant the position lying ahead of the current position (page bearing a senior number) when the feed button 75 (77) is acted on, or the position lying in rear of the current position (page bearing a junior number) when the return button 76 (78) is acted on.

The reason the number of page feed of N is used here is that there is no necessity of moving (that is, feeding or returning) the pages one at a time every anchor information. With a book with a small number of pages, the page feed may be one page at a time, However, with a book with a large number of pages, it is presumably more convenient if plural pages (N pages) are fed than if only one page at a time.

Hence, it is here assumed that N pages are fed at a time. Turning to the manner of setting the N of the N pages, it may be set as the total number of pages of the book is taken into consideration. For example, the number of page feed may be set to 5% of the total number of pages. Moreover, the total number of the pages and the current position may be taken into account, such that the number of pages lying in the indicated direction from the current position is calculated and a preset percent value, such as 5%, of the so calculated number of pages, is set to N. For example, if the total number of pages is 100, the current position is the page 30 and the indicated direction is the page feed direction, the number of pages lying in the indicated direction from the current position is 70 pages. The percent value itself may be varied in dependence up on the number of pages.

The number N may be of a fixed value. Meanwhile, the number N of the pages is the number of pages fed per preset number of seconds, such as one second.

The number N may be set by any suitable system. In a step S114, the location fed by N pages in the indicated direction from the current position is found. In a step S115, the Pageobject, corresponding to the position, as found as the destination of movement, is accessed, and the anchor information corresponding to the page is acquired. Referring to FIG. 39, if the Pageobject of the destination of movement is e.g. the object corresponding to Page 3, the anchor entering information, shown in FIG. 39, is acquired.

In a step S116, it is calculated, based on the information on the number of virtual pages, from which position the image is to be drawn, and the image drawing from the calculated position is performed on the display 71. This drawing is simple display. When the user is feeding pages in a paper book, he/she is not browsing the page deliberately, but is only browsing a portion of a page, such as an edge or the beginning part of the page. Thus, in the case of an electronic book, with the displayed contents being e.g. a novel, it is presumably sufficient if only the beginning few lines of each page are displayed.

This decreases the processing load imposed on image drawing as well as the processing time. Thus, the demonstration on the display 71 can be changed over continuously. Such simplified image drawing is repeatedly carried out as long as the button is actuated, that is, as long as page feed is commanded. Hence, it is checked in a step S117 whether or not the page feed is commanded continuously.

If it is determined in the step S117 that the page feed is commanded continuously, processing is returned to the step S113 so that processing as from thus step is carried out repeatedly. If conversely it is determined in the step S117 that page feed is not commanded continuously, in other words, if the termination of page feed is commanded (button actuation is terminated), processing transfers to a step S118.

In this step S118, the image drawing, taking e.g. the layout into account, is carried out. The fact that page feed has been terminated presumably means that the user is desirous to browse the page of the destination of the page feed. In such case, usual display is desirable, and hence the display is set to usual display. That is, the processing in the step S118 is the processing for display under the usual state of the page of the destination of page feed.

The processing for page feed or page reversion is carried out as described above. The user may fold over pages quickly, that is, many pages at a time, or fold over pages slowly, that is, on the page-by-page basis. Moreover, the user may grasp how many pages may be fed during the button pressing time, with the same sensory feeling, without dependency on the multiplication factor.

Thus, according to the present invention, in which the format of contents data of an electronic book is turned into an object and in which the concept of the Block is introduced into the layout system, it becomes possible to improve the format extensibility.

Since the format is turned into an object, new contents may be added without substantially changing the preexisting contents. It becomes possible in this manner to realize the function of formulating a scrapbook with the same format as that of the purchased electronic book.

It is also possible to presuppose the possible marring of the layout caused by letter/character size enlargement and to use the anchor information to cause linear page feed.

The above-described sequence of operations may be executed by the hardware having respective functions, or by the software. In case the sequence of processing operations are carried out by the software, a computer on the dedicated hardware of which has been built the program corresponding to the software, or the software is installed on e.g. a routinely used personal computer capable of executing various functions when a variety of programs have been installed thereon.

The recording medium may be constituted not only by a package medium, such as a magnetic disc 61 (inclusive of a flexible disc), an optical disc 62, inclusive of a CD-ROM (Compact Disc-Read-Only Memory) and a DVD (Digital Versatile Disc), a magneto-optical disc 63 (inclusive of an MD (Mini-Disc) (trademark)), having a program recorded thereon, and which is distributed for providing the user with a program, apart from the personal computer (data formulating device 2), but by a hard disc provided to the user as it is pre-built into a computer and including a ROM 42 having a program recorded thereon or a storage unit 48.

In the present specification, the steps stating the program supplied by the medium include not only the processing carried out chronologically in accordance with a stated sequence but also the processing which is not necessarily carried out chronologically but carried out in parallel or individually.

Moreover, in the present specification, a system means the entire apparatus constituted by plural devices.

What is claimed is:

1. An information processing system comprising:
    a memory for storing contents data, as supplied;
    first conversion means for converting the contents data into XML contents data of an XML system and for adding ordering information to provide for the order of the XML contents data;
    second conversion means for analyzing the XML contents data and converting the XML contents data into binary contents data of a binary system in accordance with a preset conversion rule, as data for an electronic book including the ordering information; and
    distribution means for distributing the binary contents data;
    wherein the binary contents data comprises a first object and a second object, the first object and the second object each being at least one of the following object types:
    a PageTree object for managing the binary contents data object in accordance with a tree structure,
    a Pageobject, formed for each page of the electronic book, and stating the contents of the page,
    a Blockobject for managing an area within the page managed by the Pageobject,
    a Textobject for managing the text stated in the area managed by the Blockobject,
    an Imageobject for managing an image stated in the area managed by the Blockobject,
    a Pageattribute object stating the attributes of the Page object,
    a Blockattribute object stating the attributes of the Blockobject,
    a Textattribute object stating the attributes of the Text object, and
    an Imageattribute object stating the attributes of the Image object,
    wherein the second conversion means stores the first object and the second object proximately to one another if the first object and the second object are of the same object type.

2. The information processing system according to claim 1 further comprising copyright protection means for executing processing pertinent to copyright protection on the binary contents data.

3. The information processing system according to claim 1, wherein the binary contents data comprises a Pageobject, a Textobject, and a Blockobject.

4. The information processing system according to claim 1, wherein the binary contents data comprises a PageTree object, a Pageobject, a Blockobject, a Textobject, an Image object, a Pageattribute object, a Blockattribute object, a Text attribute object, and an Imageattribute object.

5. An information processing method for an information processing apparatus, including means for exchanging contents data, the method comprising:
    a first converting step including converting as-supplied contents data into XML contents data of an XML system and adding ordering information to provide for the order of the XML contents data;
    a second converting step including analyzing the XML contents data and converting the XML contents data into binary contents data of a binary system in accordance with a preset conversion rule, as data for an electronic book including the ordering information; and
    distributing the binary contents data;
    wherein the binary contents data comprises a first object and a second object, the first object and the second object being at least one of the following object types:
    a PageTree object for managing the binary contents data in accordance with a tree structure,
    a Pageobject, formed for each page of the electronic book, and stating the contents of the page,
    a Blockobject for managing an area within the page managed by the Pageobject,
    a Textobject for managing the text stated in the area managed by the Blockobject, an Imageobject for managing an image stated in the area managed by the Blockobject, a Pageattribute Object stating the attributes of the Page object, a Blockattribute object stating the attributes of the Blockobject, a Textattribute object stating the attributes of the Text object, and an Imageattribute object stating the attributes of the Image object, wherein the second converting step includes storing the first object and the second object proximately to one another if the first object and the second object are of the same object type.

6. The information processing method according to claim 5, further comprising executing copyright protection processing on the binary contents data.

7. The information processing method according to claim 5, wherein the binary contents data comprises a Pageobject, a Textobject, and a Blockobject.

8. The information processing method according to claim 5, wherein the binary contents data comprises a PageTree object, a Pageobject, a Blockobject, a Textobject, an Image object, a Pageattribute object, a Blockattribute object, a Text attribute object, and an Imageattribute object.

9. A computer recording medium storing a computer program for causing a computer to execute a method, the computer including means for exchanging contents data, the method comprising:

a first converting step including converting as-supplied contents data into XML contents data of an XML system and adding ordering information to provide for the order of the XML contents data;

a second converting step including analyzing the XML contents data and converting the XML contents data into binary contents data of a binary system in accordance with a preset conversion rule, as data for an electronic book including the ordering information; and distributing the binary contents data;

wherein the binary contents data comprises a first object and a second object, the first object and the second object being at least one of the following object types:

a PageTree object for managing the binary contents data in accordance with a tree structure, a Pageobject, formed for each page of the electronic book, and stating the contents of the page, a Blockobject for managing an area within the page managed by the Pageobject, a Textobject for managing the text stated in the area managed by the Blockobject, an Imageobject for managing an image stated in the area managed by the Blockobject, a Pageattribute object stating the attributes of the Page object, a Blockattribute object stating the attributes of the Blockobject, a Textattribute object stating the attributes of the Text object, and an Imageattribute object stating the attributes of the Image object, wherein the second converting step includes storing the first object and the second object proximately to one another if the first object and the second object are of the same object type.

10. The computer recording medium according to claim 9, further comprising executing copyright protection processing on the binary contents data.

11. The computer recording medium according to claim 9, wherein the binary contents data comprises a Pageobject, a Textobject, and a Blockobject.

12. The computer recording medium according to claim 9, wherein the binary contents data comprises a PageTree object, a Pageobject, a Blockobject, a Textobject, an Image object, a Pageattribute object, a Blockattribute object, a Text attribute object, and an Imageattribute object.

* * * * *